US008595065B2

(12) United States Patent
Grimes

(10) Patent No.: US 8,595,065 B2
(45) Date of Patent: *Nov. 26, 2013

(54) OFFER PLACEMENT SYSTEM AND METHODS FOR TARGETED MARKETING OFFER DELIVERY SYSTEM

(75) Inventor: Scott Grimes, Atlanta, GA (US)

(73) Assignee: Cardlytics, Inc., Atlanta, GA (US)

( * ) Notice: Subject to any disclaimer, the term of this patent is extended or adjusted under 35 U.S.C. 154(b) by 818 days.

This patent is subject to a terminal disclaimer.

(21) Appl. No.: 12/486,140

(22) Filed: Jun. 17, 2009

(65) Prior Publication Data

US 2010/0106596 A1 Apr. 29, 2010

Related U.S. Application Data

(60) Provisional application No. 61/108,332, filed on Oct. 24, 2008.

(51) Int. Cl.
*G06Q 30/00* (2012.01)
(52) U.S. Cl.
USPC .................... 705/14.4; 705/14.15; 705/14.49; 705/14.53
(58) Field of Classification Search
USPC .................. 705/14, 14.4, 14.15, 14.49, 14.53
See application file for complete search history.

(56) References Cited

U.S. PATENT DOCUMENTS

| 4,732,212 A | 3/1988 | Fraser, III |
| 4,910,672 A | 3/1990 | Off et al. |
| 5,173,851 A | 12/1992 | Off et al. |
| 5,220,501 A | 6/1993 | Lawlor et al. |
| 5,612,868 A | 3/1997 | Off et al. |
| 5,689,100 A | 11/1997 | Carrithers et al. |

(Continued)

FOREIGN PATENT DOCUMENTS

| EP | 1 259 947 B1 | 10/2004 |
| EP | 1 257 992 B1 | 2/2007 |

(Continued)

OTHER PUBLICATIONS

Fitzgerald, U.S. Bank Launches Merchant-Funded Rewards Program with FreeMonee, http://www.freemonee.com/wp-content/uploads/PaymentsSource_4_12_2012.pdf, Apr. 12, 2012, 2 pgs.

(Continued)

*Primary Examiner* — Michael Bekerman
*Assistant Examiner* — Mario Iosif
(74) *Attorney, Agent, or Firm* — Morris, Manning & Martin, LLP; John R. Harris

(57) ABSTRACT

A system and methods for an offer placement system for delivering targeted marketing offers to consumers during a session with an online (web-based) Internet portal, such as an online banking portal of a financial institution. A component receives advertising campaign data from an advertiser including a plurality of targeted marketing offers for delivery to consumers in response to a particular condition (e.g. an offer-triggering event), and stores the campaign data in a database. A component determines the occurrence of an offer-triggering event caused by a consumer during an online session with the online portal, for example, viewing a list of banking transactions. A component identifies a predetermined targeted marketing offer stored in the database that corresponds to the offer-triggering event. A component delivers information corresponding to the targeted marketing offer to the consumer during the online session with the portal.

70 Claims, 24 Drawing Sheets

TARGETED MARKETING SYSTEM OVERVIEW

(56) References Cited

U.S. PATENT DOCUMENTS

| | | | |
|---|---|---|---|
| 5,823,457 | A | 10/1998 | Jahn et al. |
| 5,870,724 | A | 2/1999 | Lawlor et al. |
| 5,892,827 | A | 4/1999 | Beach et al. |
| 5,915,007 | A | 6/1999 | Klapka |
| 5,918,014 | A | 6/1999 | Robinson |
| 5,926,795 | A | 7/1999 | Williams |
| 6,028,370 | A | 2/2000 | Lamm et al. |
| 6,067,524 | A | 5/2000 | Byerly et al. |
| 6,202,054 | B1 | 3/2001 | Lawlor et al. |
| 6,216,129 | B1 | 4/2001 | Eldering |
| 6,240,394 | B1 | 5/2001 | Uecker et al. |
| 6,278,979 | B1 | 8/2001 | Williams |
| 6,282,516 | B1 | 8/2001 | Giuliani |
| 6,304,849 | B1 | 10/2001 | Uecker et al. |
| 6,307,958 | B1 | 10/2001 | Deaton et al. |
| 6,321,210 | B1 | 11/2001 | O'Brien et al. |
| 6,327,574 | B1 | 12/2001 | Kramer et al. |
| 6,332,126 | B1 | 12/2001 | Peirce et al. |
| 6,344,108 | B1 | 2/2002 | Von Medvey et al. |
| 6,351,735 | B1 | 2/2002 | Deaton et al. |
| 6,377,935 | B1 | 4/2002 | Deaton et al. |
| 6,424,949 | B1 | 7/2002 | Deaton et al. |
| 6,424,951 | B1 | 7/2002 | Shurling et al. |
| 6,434,747 | B1 | 8/2002 | Khoo et al. |
| 6,484,146 | B2 | 11/2002 | Day et al. |
| 6,560,578 | B2 | 5/2003 | Eldering |
| 6,604,085 | B1 | 8/2003 | Kolls |
| 6,795,809 | B2 | 9/2004 | O'Brien et al. |
| 6,885,994 | B1 | 4/2005 | Scroggie et al. |
| 7,024,374 | B1 | 4/2006 | Day et al. |
| 7,058,591 | B2 | 6/2006 | Giuliani et al. |
| 7,076,458 | B2 | 7/2006 | Lawlor et al. |
| 7,136,875 | B2 | 11/2006 | Anderson et al. |
| 7,228,285 | B2 | 6/2007 | Hull et al. |
| 7,292,999 | B2 | 11/2007 | Hobson et al. |
| 7,309,001 | B2 | 12/2007 | Banfield et al. |
| 7,310,609 | B2 | 12/2007 | Middleton et al. |
| 7,386,485 | B1 | 6/2008 | Mussman et al. |
| 7,392,224 | B1 | 6/2008 | Bauer et al. |
| 7,415,426 | B2 | 8/2008 | Williams et al. |
| 7,430,521 | B2 | 9/2008 | Walker et al. |
| 7,580,856 | B1 * | 8/2009 | Pliha .................. 705/14.26 |
| 7,693,790 | B2 | 4/2010 | Lawlor et al. |
| 8,160,921 | B2 | 4/2012 | Gebhardt et al. |
| 2002/0069115 | A1 | 6/2002 | Fitzpatrick |
| 2002/0091566 | A1 | 7/2002 | Siegel |
| 2002/0123928 | A1 | 9/2002 | Eldering et al. |
| 2002/0147639 | A1 | 10/2002 | Williams et al. |
| 2003/0033199 | A1 | 2/2003 | Coleman |
| 2003/0040959 | A1 | 2/2003 | Fei et al. |
| 2003/0055723 | A1 | 3/2003 | English |
| 2003/0069808 | A1 | 4/2003 | Cardno |
| 2003/0088466 | A1 | 5/2003 | Fitzpatrick |
| 2003/0101454 | A1 * | 5/2003 | Ozer et al. .................. 725/42 |
| 2003/0158844 | A1 * | 8/2003 | Kramer et al. .................. 707/6 |
| 2004/0122736 | A1 | 6/2004 | Strock et al. |
| 2004/0159700 | A1 | 8/2004 | Khan et al. |
| 2006/0212350 | A1 * | 9/2006 | Ellis et al. .................. 705/14 |
| 2007/0219865 | A1 | 9/2007 | Leining |
| 2007/0265948 | A1 | 11/2007 | Maiorino et al. |
| 2008/0052153 | A1 | 2/2008 | Cook |
| 2008/0086365 | A1 | 4/2008 | Zollino et al. |
| 2008/0091535 | A1 * | 4/2008 | Heiser et al. .................. 705/14 |
| 2008/0103887 | A1 | 5/2008 | Oldham et al. |
| 2008/0205655 | A1 * | 8/2008 | Wilkins et al. .................. 380/279 |
| 2008/0221986 | A1 | 9/2008 | Soicher et al. |
| 2009/0006212 | A1 | 1/2009 | Krajicek et al. |
| 2009/0037264 | A1 * | 2/2009 | Del Favero et al. .................. 705/14 |
| 2009/0099931 | A1 * | 4/2009 | Aaltonen et al. .................. 705/14 |
| 2009/0106368 | A1 | 4/2009 | Padveen et al. |
| 2009/0287562 | A1 | 11/2009 | Bosch et al. |
| 2011/0137717 | A1 | 6/2011 | Reuthe et al. |
| 2011/0161150 | A1 | 6/2011 | Steffens et al. |
| 2011/0238469 | A1 | 9/2011 | Gershman et al. |
| 2011/0288918 | A1 | 11/2011 | Cervenka et al. |
| 2012/0150611 | A1 | 6/2012 | Isaacson et al. |
| 2012/0191525 | A1 | 7/2012 | Singh et al. |

FOREIGN PATENT DOCUMENTS

| | | |
|---|---|---|
| WO | WO99/50775 | 10/1999 |
| WO | WO01/22374 | 3/2001 |
| WO | WO 2010016778 | 2/2010 |

OTHER PUBLICATIONS

Dowling, et al., Do Customer Loyalty Programs Really Work?, http://www.royalloyalties.com/case_study.pdf, 1997, pp. 1-24 (28 pgs. total), Centre for Corporate Change—Australian Graduate School of Management, Australia.

Wibowo, et. al., Loyalty Program Scheme for Anonymous Payment Systems, http://ittf.vlsm.org/bebas/v01/OnnoWPurbo/contrib/aplikasi/e-commerce/loyalty-program-scheme-for-anonymous-payment-systems-1999.pdf, 2000, pp. 1-2, National University of Singapore, Singapore.

* cited by examiner

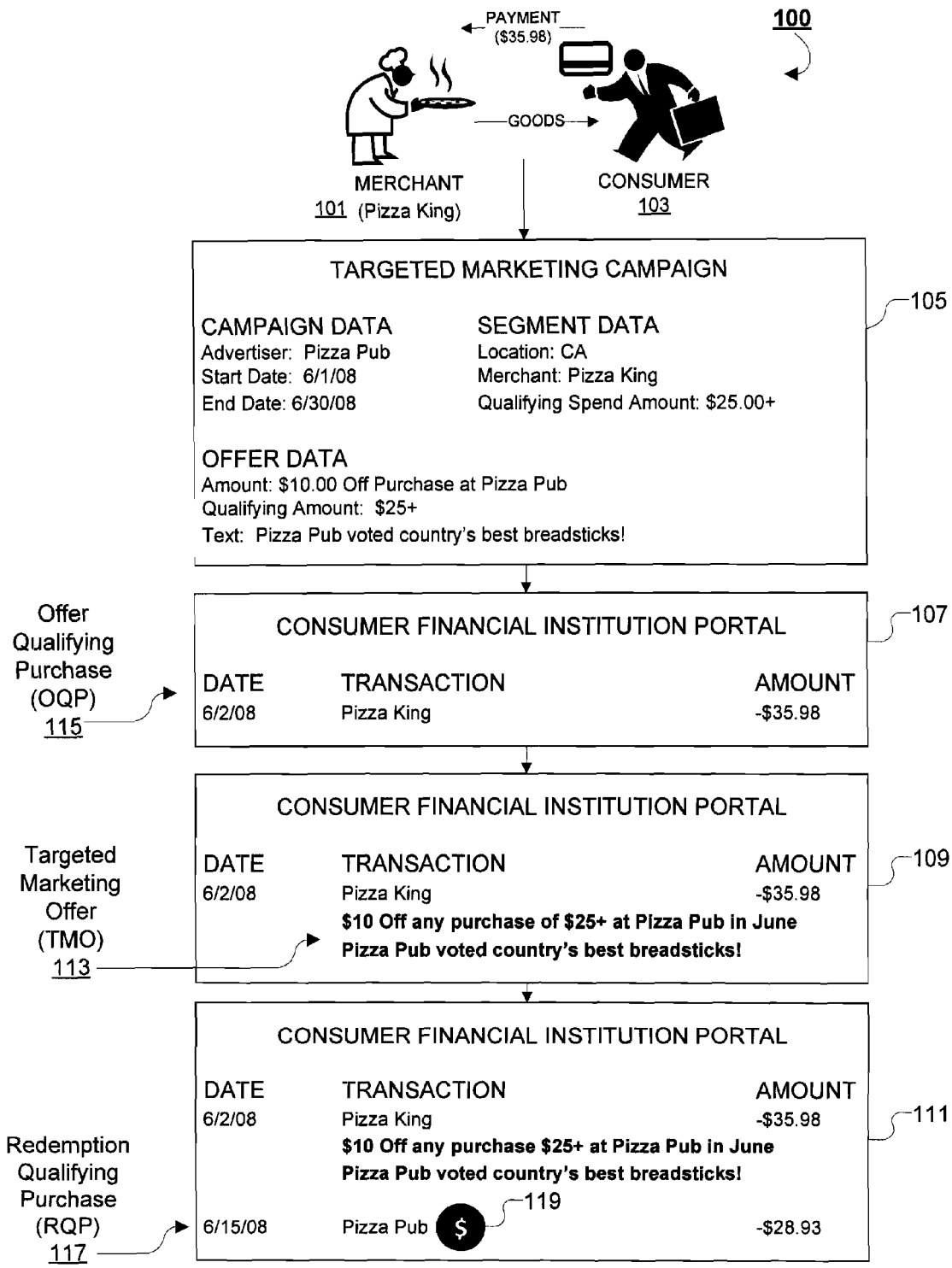
FIG. 1  EXEMPLARY TRANSACTION-OFFER-REDEMPTION LIFECYCLE

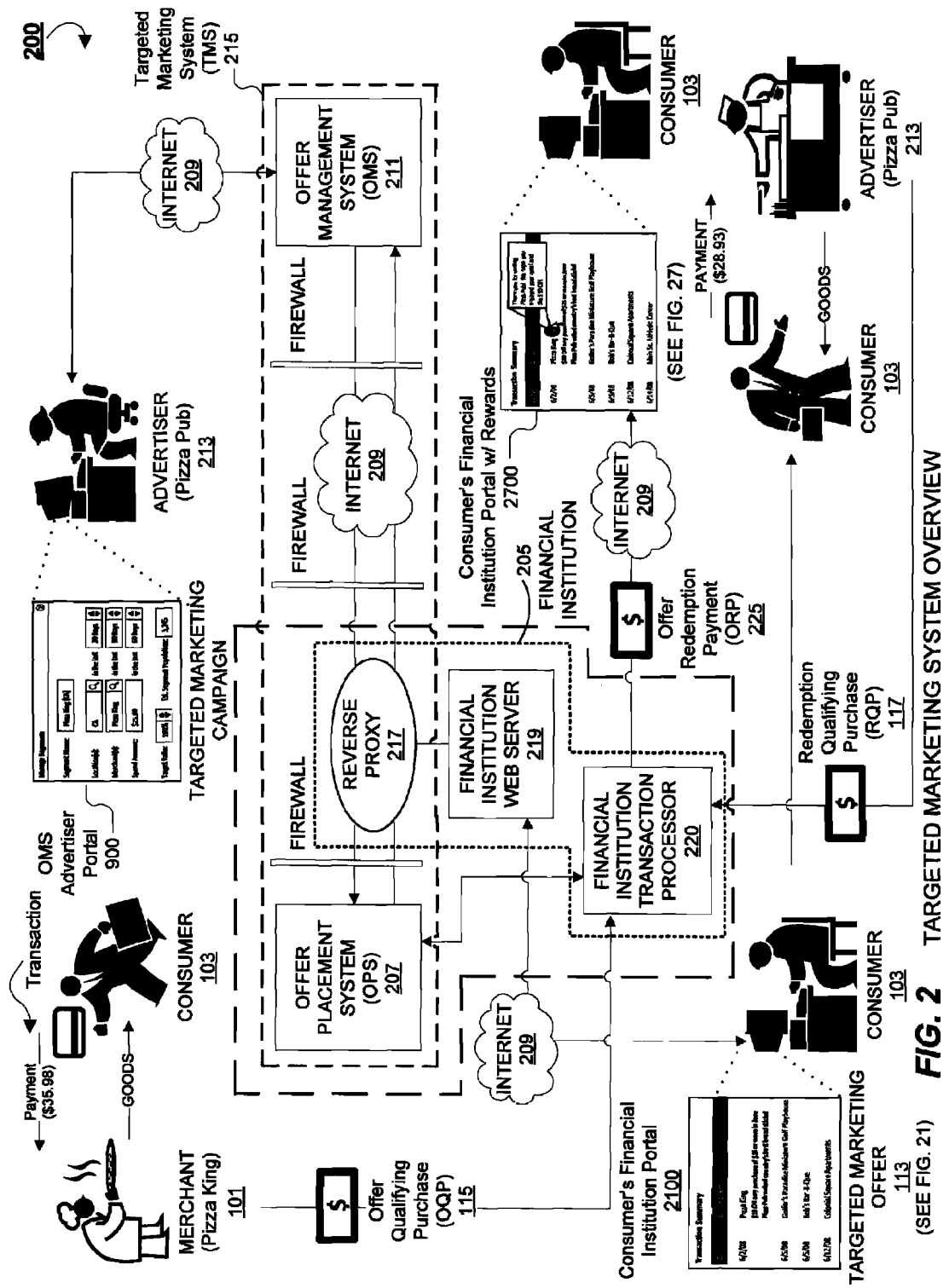
FIG. 2 TARGETED MARKETING SYSTEM OVERVIEW

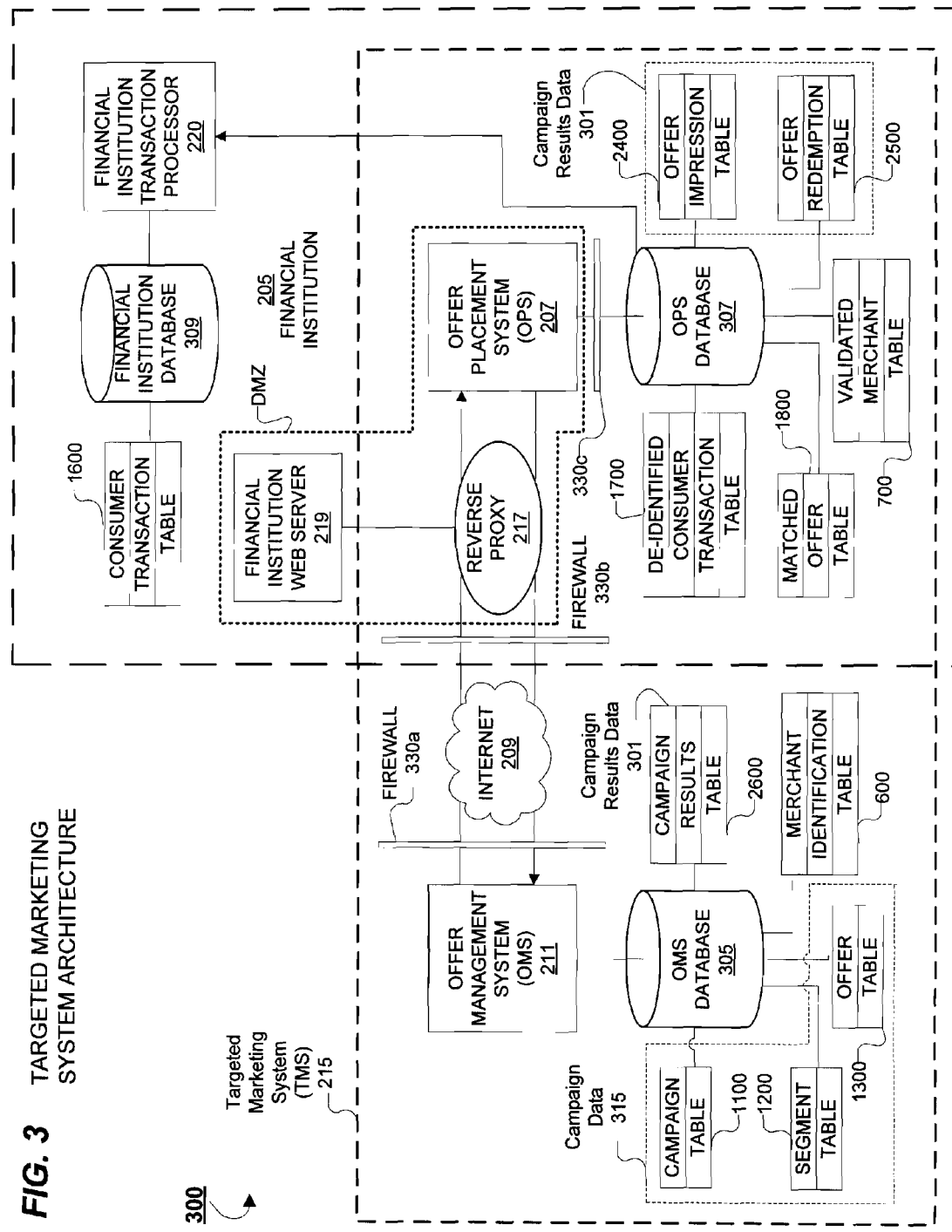
FIG. 3   TARGETED MARKETING SYSTEM ARCHITECTURE

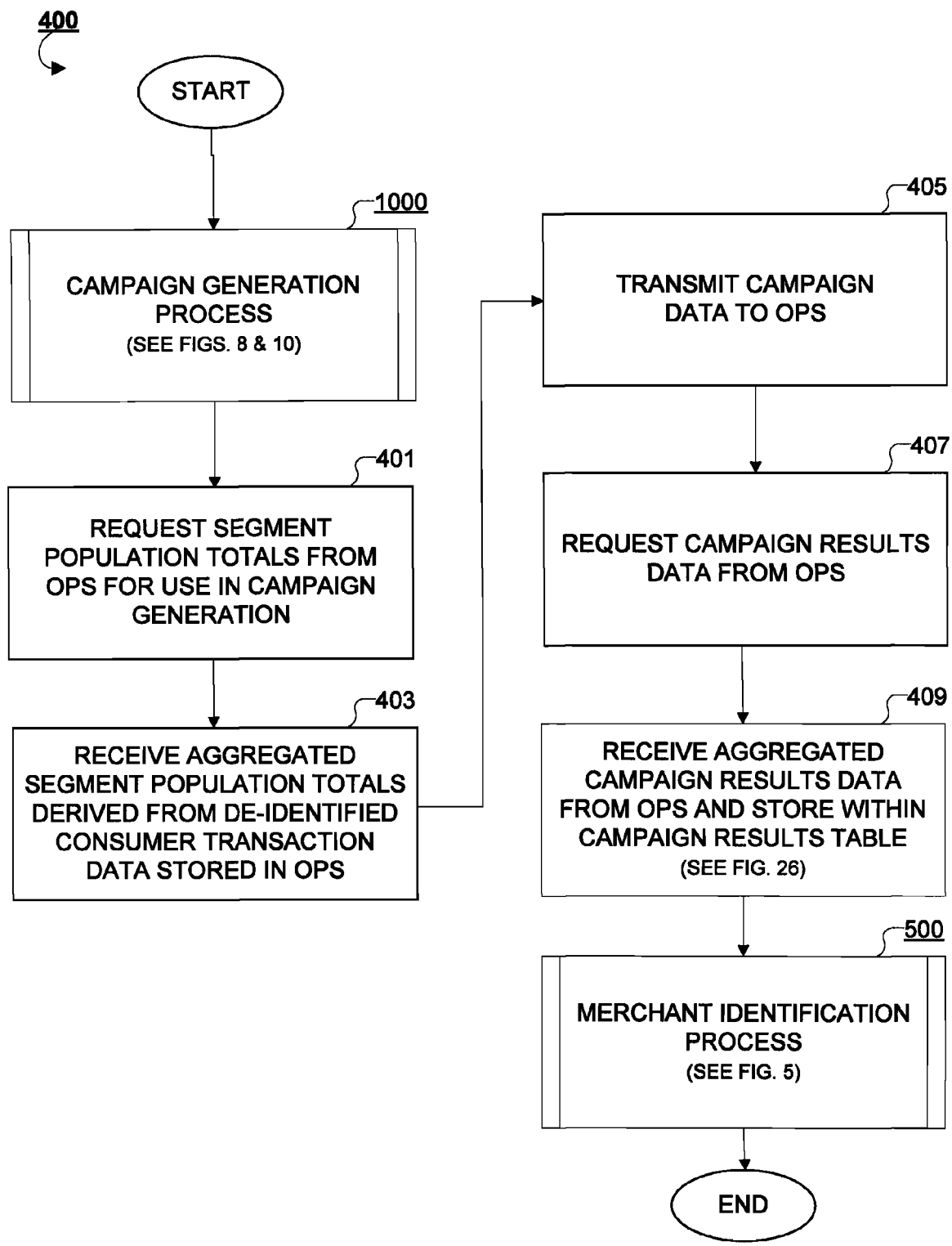
FIG. 4   OVERALL OMS PROCESSES

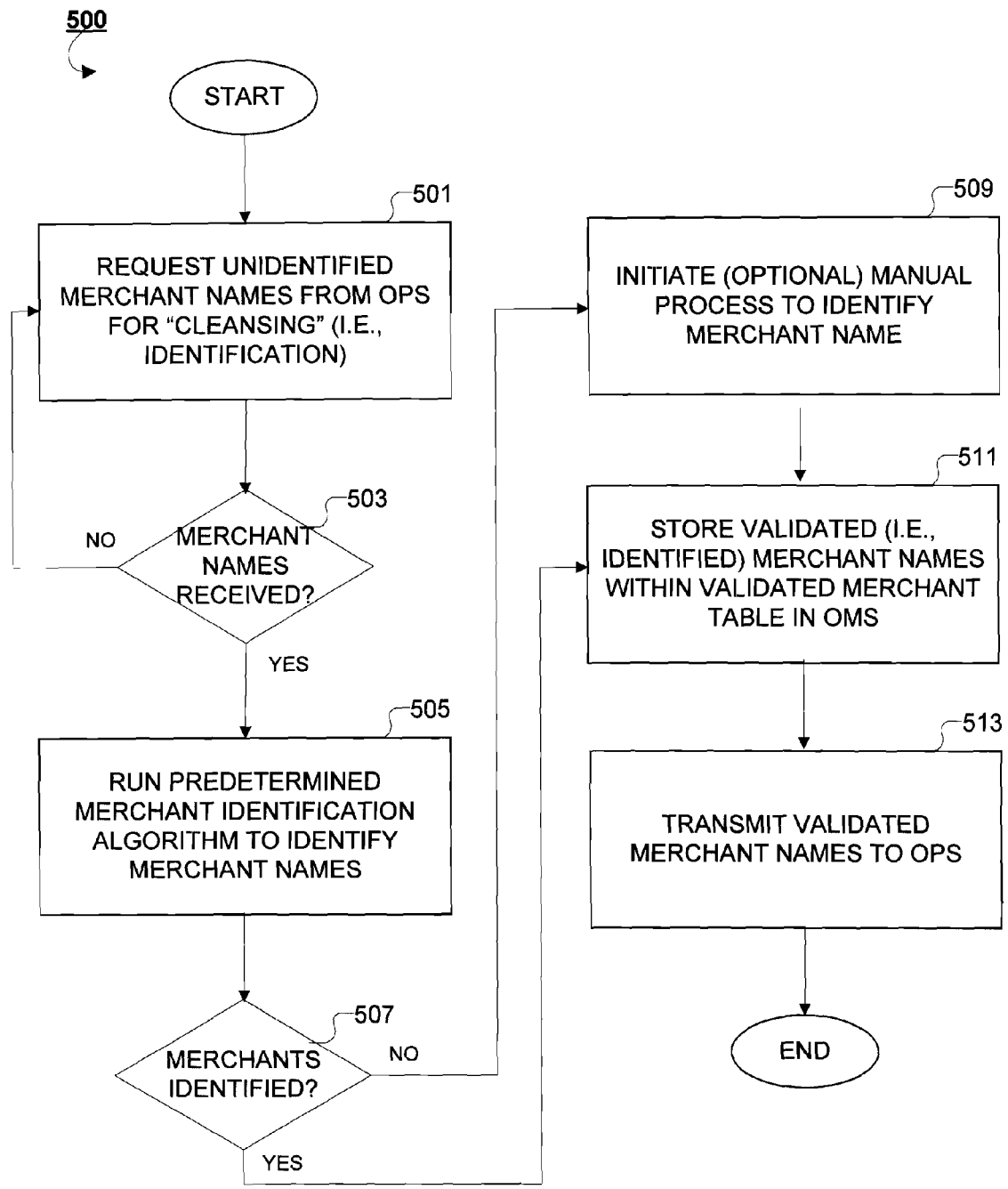
*FIG. 5* MERCHANT IDENTIFICATION PROCESS

600

| UNIDENTIFIED MERCHANT KEY 601 | UNIDENTIFIED MERCHANT NAME 603 | VALIDATED MERCHANT KEY 605 | VALIDATED MERCHANT NAME 607 | MERCHANT CATEGORY 609 | IDENTITY ASSURANCE RATING 611 |
|---|---|---|---|---|---|
| 349 | PIZZA KING #32 | 54 | PIZZA KING | FOOD & BEVERAGE | 100% |
| 103 | SKATE ESCP | 23 | SKATE ESCAPE | ENTERTAINMENT | 90% |
| 184 | S ESCAPE HOUSTON | 23 | SKATE ESCAPE | ENTERTAINMENT | 70% |
| 785 | TIRE TOWN INC | 78 | TIRE TOWN | RETAIL & SHOPPING | 100% |
| 293 | BOOK BARN 2049 | 49 | THE BOOK BARN | RETAIL & SHOPPING | 100% |

*FIG. 6*    MERCHANT IDENTIFICATION TABLE

700

| UNIDENTIFIED MERCHANT KEY 601 | UNIDENTIFIED MERCHANT NAME 603 | VALIDATED MERCHANT KEY 605 | VALIDATED MERCHANT NAME 607 | MERCHANT CATEGORY 609 | IDENTITY ASSURANCE RATING 611 |
|---|---|---|---|---|---|
| 349 | PIZZA KING #32 | 54 | PIZZA KING | FOOD & BEVERAGE | 100% |
| 785 | TIRE TOWN INC | 78 | TIRE TOWN | RETAIL & SHOPPING | 100% |
| 293 | BOOK BARN 2049 | 49 | THE BOOK BARN | RETAIL & SHOPPING | 100% |

*FIG. 7*    VALIDATED MERCHANT TABLE

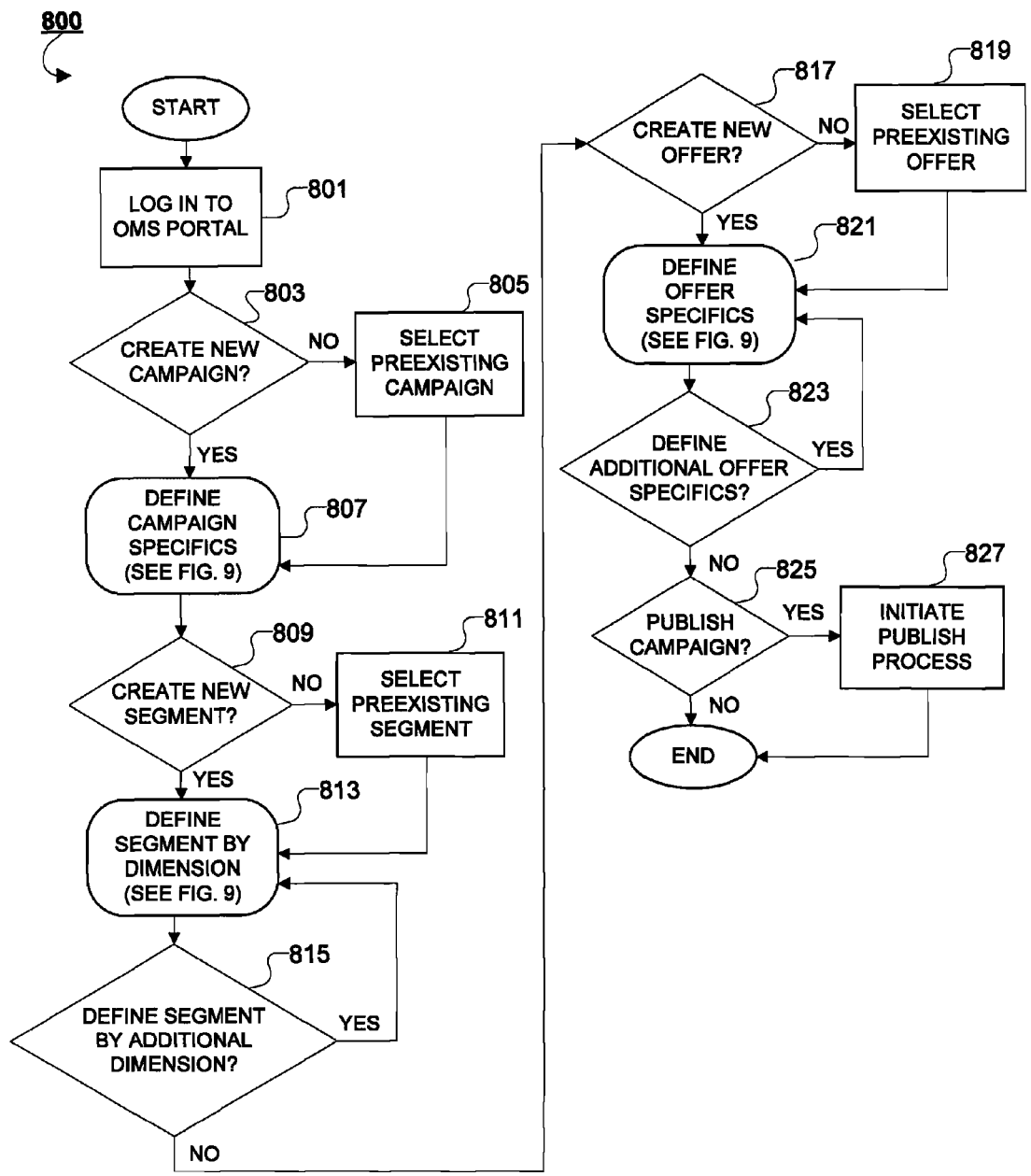
FIG. 8  CAMPAIGN GENERATION PROCESS (ADVERTISER PERSPECTIVE)

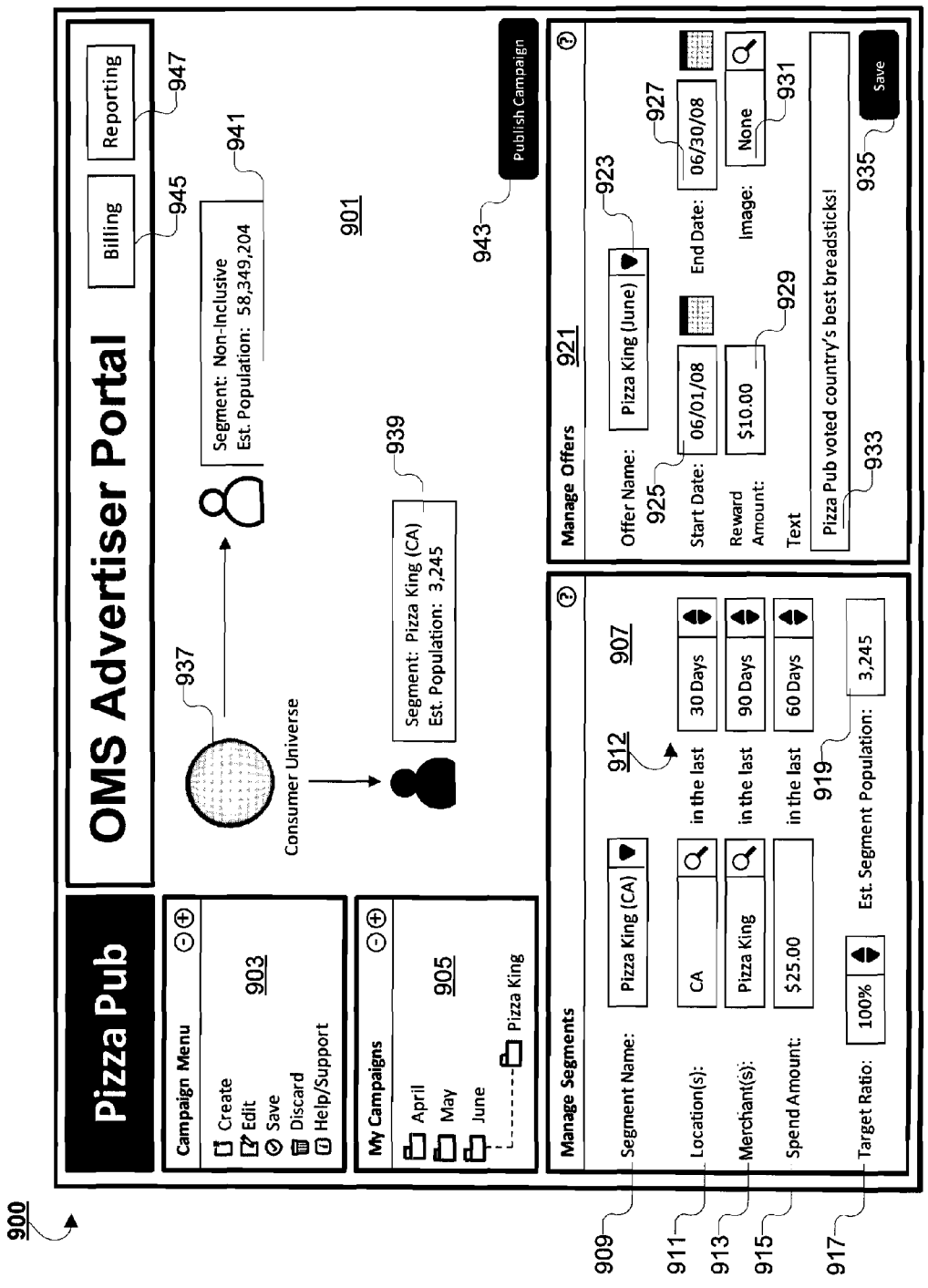
FIG. 9  OMS ADVERTISER PORTAL

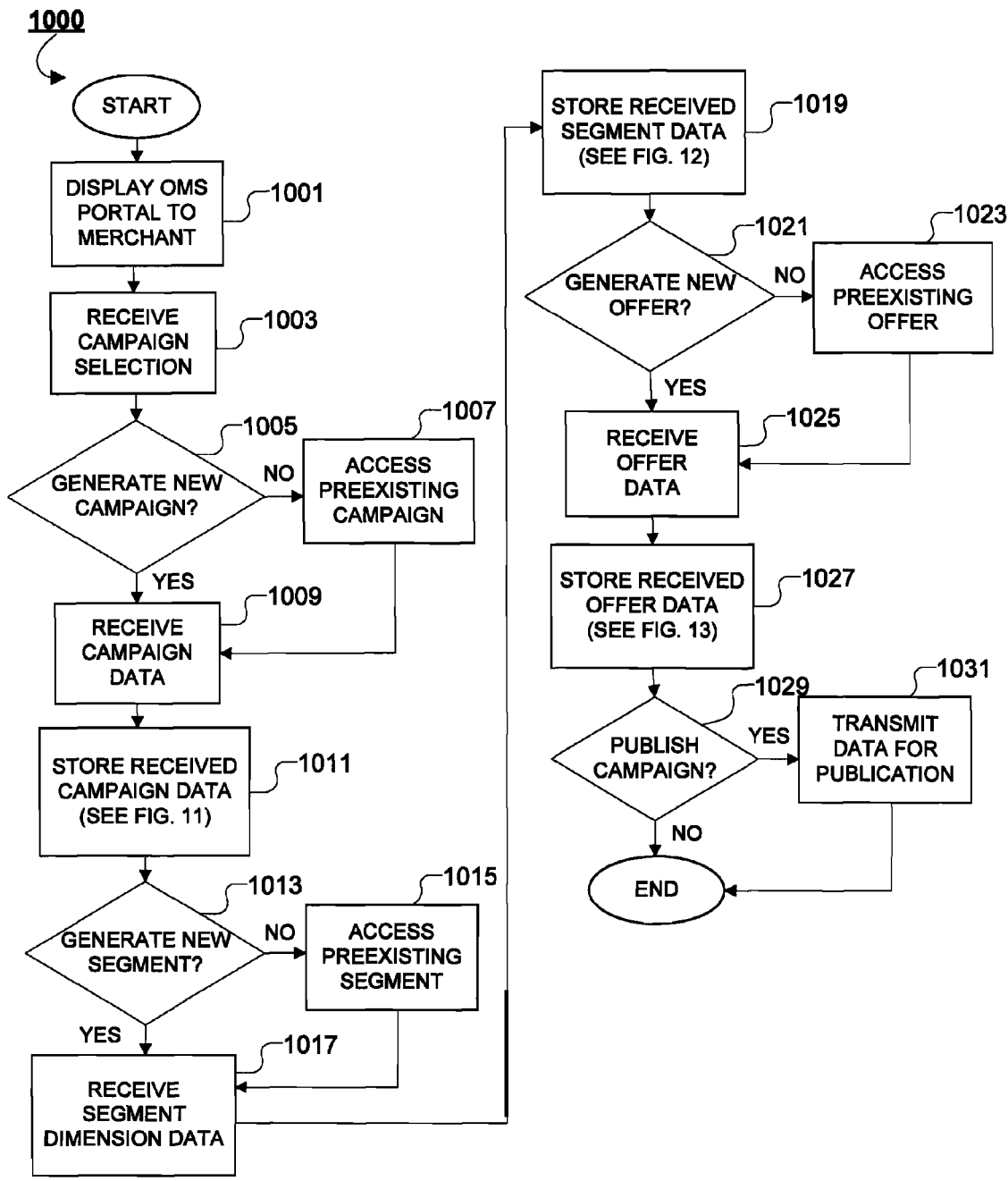
*FIG. 10* CAMPAIGN GENERATION PROCESS (SYSTEM PERSPECTIVE)

1100

| CAMPAIGN ID | ADVERTISER ID | AUTHOR ID | CAMPAIGN START DATE | CAMPAIGN END DATE |
|---|---|---|---|---|
| 10000 | PIZZA PUB | J. THOMPSON | 6/1/08 | 6/30/08 |
| 10001 | ART AVENUE | M. JONES | 6/1/08 | 6/22/08 |
| 10002 | HARDWARE HUT | R. SPIKES | 7/1/08 | 7/31/08 |
| 10003 | SPORTS KINGDOM | G. COFFEE | 8/1/08 | 8/15/08 |
| 10004 | VINTAGE VIDEO | P. BANKS | 8/1/08 | 8/31/08 |

*FIG. 11*    CAMPAIGN TABLE

1200

| CAMPAIGN ID | SEGMENT ID | LOCATION | MERCHANT CATEGORY / MERCHANT | SPEND AMOUNT |
|---|---|---|---|---|
| 10000 | 55555 | CA | PIZZA KING | $25.00 |
| 10001 | 55556 | 30324, 30325 | PAINTER'S PLACE | $30.00 |
| 10002 | 55557 | National | HOME & GARDEN | $10.00 |
| 10003 | 55558 | GA, SC, FL | ATHLETIC VILLAGE | $50.00 |
| 10004 | 55559 | 29577 | ENTERTAINMENT | $15.00 |

*FIG. 12*    SEGMENT TABLE

1300

| CAMPAIGN ID | SEGMENT ID | OFFER ID | OFFER AMOUNT | OFFER START DATE | OFFER END DATE | OFFER TEXT | OFFER IMAGE |
|---|---|---|---|---|---|---|---|
| 10000 | 55555 | 99999 | $10.00 | 6/1/08 | 6/30/08 | PIZZA PUB VOTED... | NONE |
| 10001 | 55556 | 99998 | $5.00 | 6/13/08 | 6/28/08 | VISIT ART AVENUE... | LOGO.JPEG |
| 10002 | 55557 | 99997 | 5% | 7/1/08 | 7/31/08 | SUPPORT YOUR... | NONE |
| 10003 | 55558 | 99996 | $15.00 | 8/15/08 | 8/17/08 | SPORTS KINGDOM... | PIC.JPEG |
| 10004 | 55559 | 99995 | 10% | 9/4/08 | 9/20/08 | CHECK OUT VINTAGE... | NONE |

*FIG. 13*    OFFER TABLE

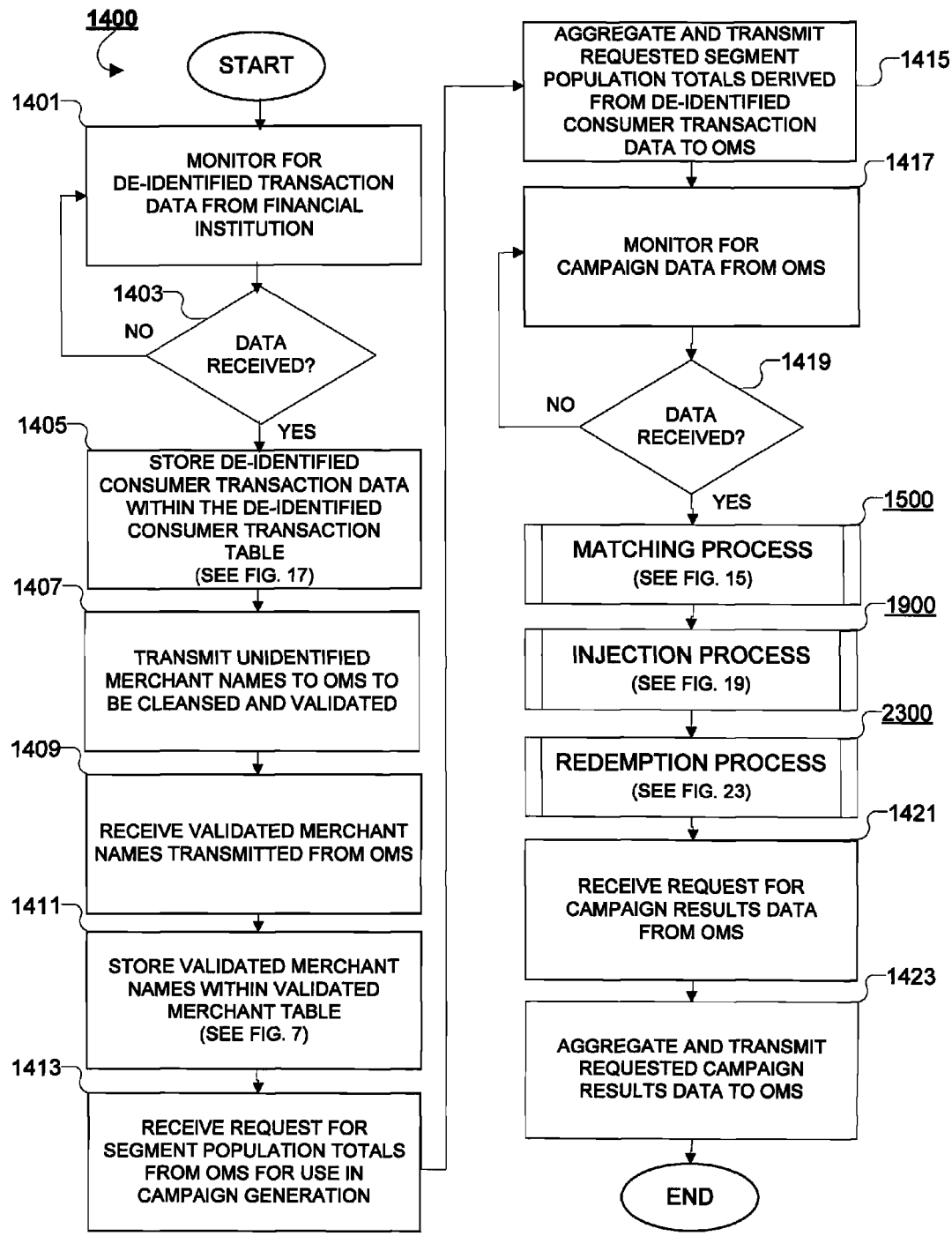
*FIG. 14* OVERALL OPS PROCESSES

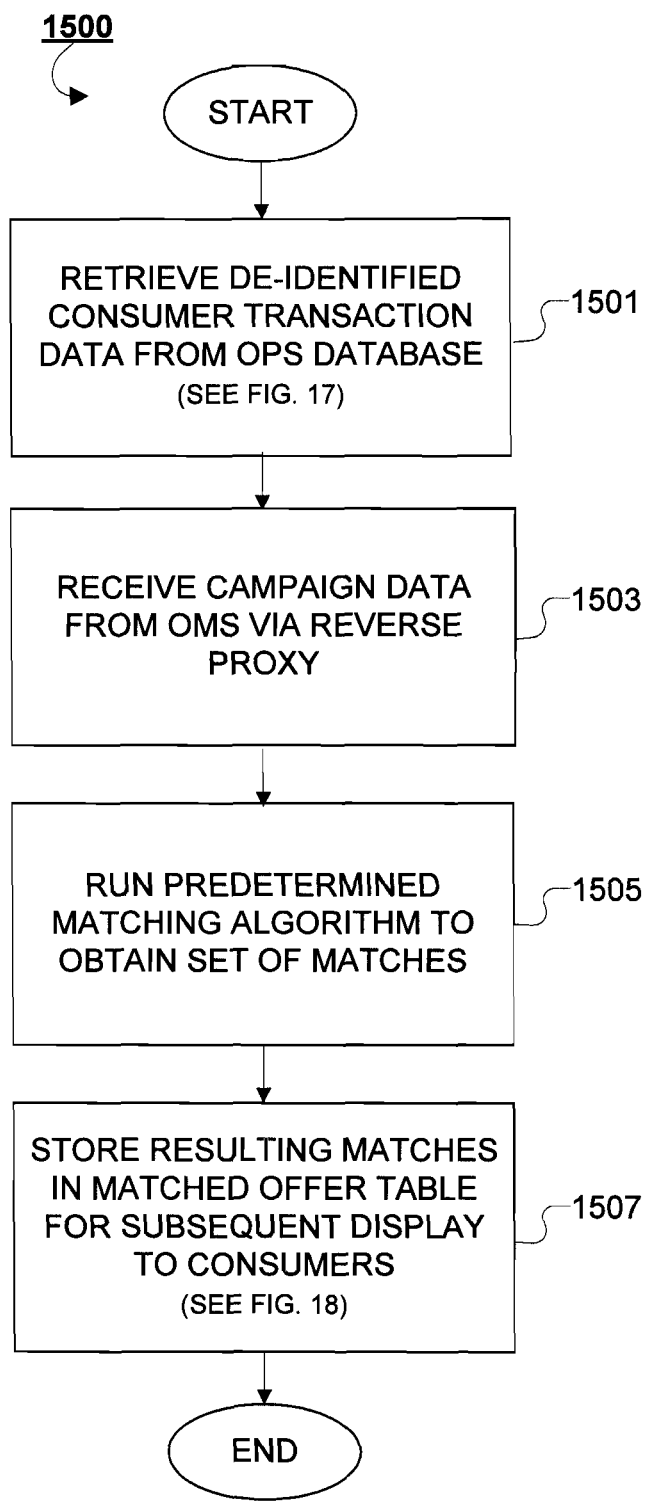
FIG. 15  MATCHING PROCESS

1600

| ACCOUNT NUMBER | ACCOUNT GUID | TRANSACTION ID | ZIP ID | MERCHANT NAME | AMOUNT | REWARDS TYPE |
|---|---|---|---|---|---|---|
| 2930928402 | 12932 | 55550 | 90210 | PIZZA KING | $35.98 | CASH BACK |
| 1029478293 | 23049 | 59875 | 20384 | SKATE ESCAPE | $81.22 | MILES |
| 1092387472 | 33145 | 98248 | 30324 | ROY'S RIB SHACK | $23.43 | POINTS |
| 958729230 | 10345 | 13324 | 85692 | TIRE TOWN | $350.06 | NONE |
| 849392044 | 98594 | 76520 | 13285 | THE BOOK BARN | $121.73 | CASH BACK |

*FIG. 16* CONSUMER TRANSACTION TABLE (FINANCIAL INSTITUTION)

1700

| ACCOUNT GUID | TRANSACTION ID | ZIP ID | MERCHANT NAME | AMOUNT | REWARDS TYPE |
|---|---|---|---|---|---|
| 12932 | 55550 | 90210 | PIZZA KING | $35.98 | CASH BACK |
| 23049 | 59875 | 20384 | SKATE ESCAPE | $81.22 | MILES |
| 33145 | 98248 | 30324 | ROY'S RIB SHACK | $23.43 | POINTS |
| 10345 | 13324 | 85692 | TIRE TOWN | $350.06 | NONE |
| 98594 | 76520 | 13285 | THE BOOK BARN | $121.73 | CASH BACK |

*FIG. 17* DE-IDENTIFIED CONSUMER TRANSACTION TABLE

1800

| TRANSACTION ID | OFFER ID | ACCOUNT GUID | RANK |
|---|---|---|---|
| 55550 | 99999 | 12932 | 1 |
| 37953 | 24832 | 49830 | 3 |
| 20482 | 40568 | 80204 | 2 |
| 11023 | 12944 | 18375 | 1 |
| 95840 | 20394 | 24683 | 5 |

*FIG. 18* MATCHED OFFER TABLE

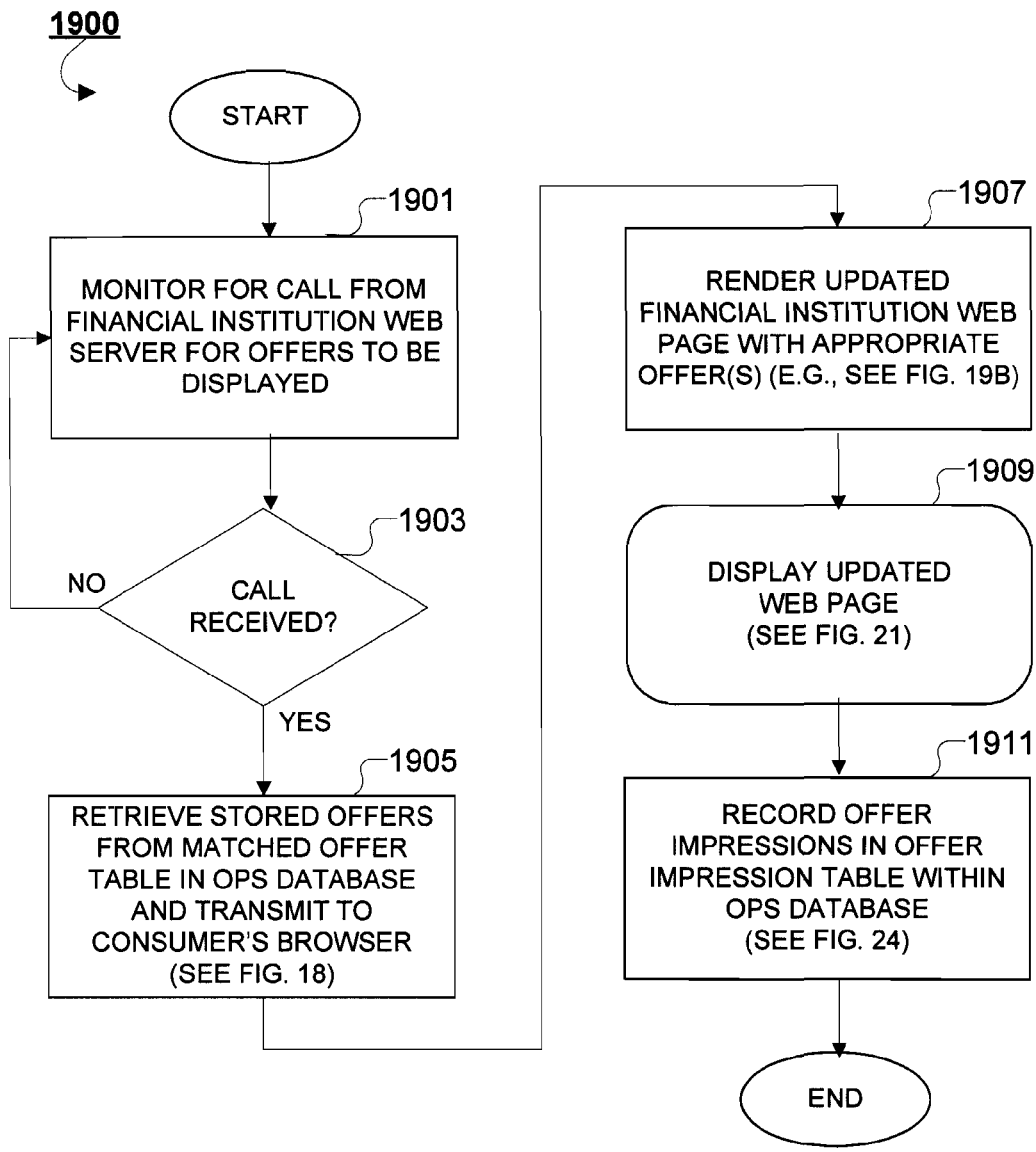
FIG. 19A  GENERAL INJECTION PROCESS

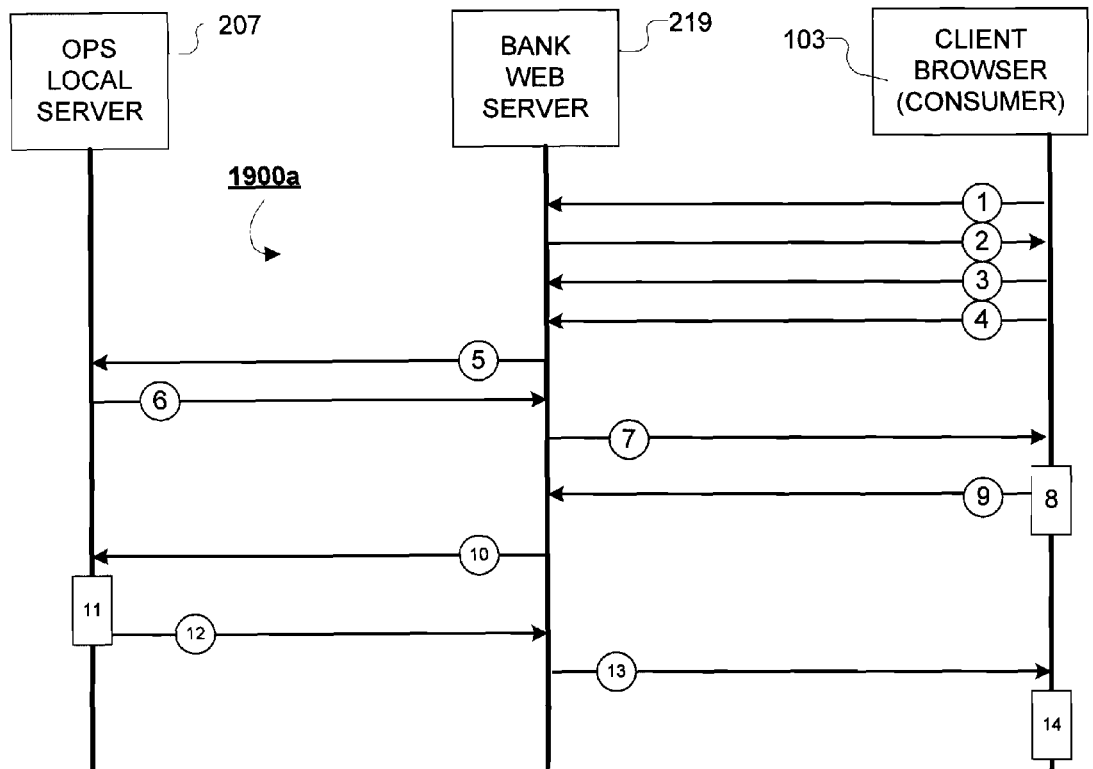

1. Bank customer (consumer) initiates secure on-line session with bank (Bank Web Server) through client browser, and requests and receives account history page which includes customer transactions.
2. Bank Web Server returns transactions with DOM injection script included in HTML; client browser renders account history page with such customer transactions.
3. After rendering the web page, the client browser executes DOM injection loader.
4. The DOM injection loader requests the DOM injection script via an asynchronous call to the Bank Web Server.
5. The Bank Web Server recognizes the asynchronous call is intended for OPS (via a proxy or other mechanism) and redirects call to the bank's OPS.
6. OPS sends DOM injection script to the bank's web server.
7. The Bank Web Server returns the DOM injection script in response to the asynchronous request (step 4) from the client browser.
8. The client browser executes the DOM injection script which identifies the customer's account along with the transactions previously rendered on the client browser.
9. The DOM injection script sends an account identifier and transactions to the Bank Web Server via an asynchronous call.
10. The Bank Web Server recognizes the asynchronous call is intended for OPS (via a proxy or other mechanism) and redirects the call to the bank's OPS.
11. OPS identifies the offers to display on the client's browser based on the account identifier and the rendered transactions.
12. OPS sends the offers to the Bank Web Server.
13. The Bank Web Server returns the offers in response to the asynchronous request (step 9) from the client browser.
14. After receiving the response to the asynchronous call, the client browser continues execution of the injection script and inserts the received offers into the previously rendered web page in predetermined manner per script.

FIG. 19B     SEQUENCE DIAGRAM – DOM INJECTION OF TMO(S)

2000

Account Activity | My Statements | Rewards

Account Number - XXXX XXXX XXXX 1774

Transaction Details

From [ 6/1/08 ]  To [ 6/15/08 ]  [Submit]

— 2001

Transaction Summary 2007

| Date | Description | Amount |
|---|---|---|
| 6/2/08 | Pizza King | -$35.98 |
| 6/5/08 | Golfer's Paradise Miniature Golf Playhouse | -$58.45 |
| 6/5/08 | Bob's Bar-B-Que | -$12.32 |
| 6/12/08 | Colonial Square Apartments | -$800.00 |
| 6/14/08 | Main St. Athletic Center | -$95.52 |

2003
2005
115
2009

FIG. 20  CONSUMER TRANSACTION DISPLAY (CONSUMER FINANCIAL INSTITUTION PORTAL)

2100

| Account Activity | My Statements | Rewards |

Account Number - XXXX XXXX XXXX 1774

Transaction Details

From 6/1/08   To 6/15/08   Submit

Transaction Summary

| Date | Description | Amount |
|---|---|---|
| 6/2/08 | Pizza King — 113a<br>$10 Off any purchase of $25+ at Pizza Pub in June<br>Pizza Pub voted country's best breadsticks! | -$35.98 |
| 6/5/08 | Golfer's Paradise Miniature Golf Playhouse | -$58.45 |
| 6/5/08 | Bob's Bar-B-Que | -$12.32 |
| 6/12/08 | Colonial Square Apartments | -$800.00 |

113b
- Green Thumb Grocery — Highest quality natural and organic groceries! $5.00 off for every $30 you spend in June.
- At Gas N' GO paying less for gas is rewarding. $2.00 off for every $10 spent in June.
- When you are here you're family at Mario's Bistro. $20.00 off on your first visit in June.

115

2009

FIG. 21  CONSUMER'S TRANSACTION DISPLAY WITH TMO(S) (CONSUMER FINANCIAL INSTITUTION PORTAL)

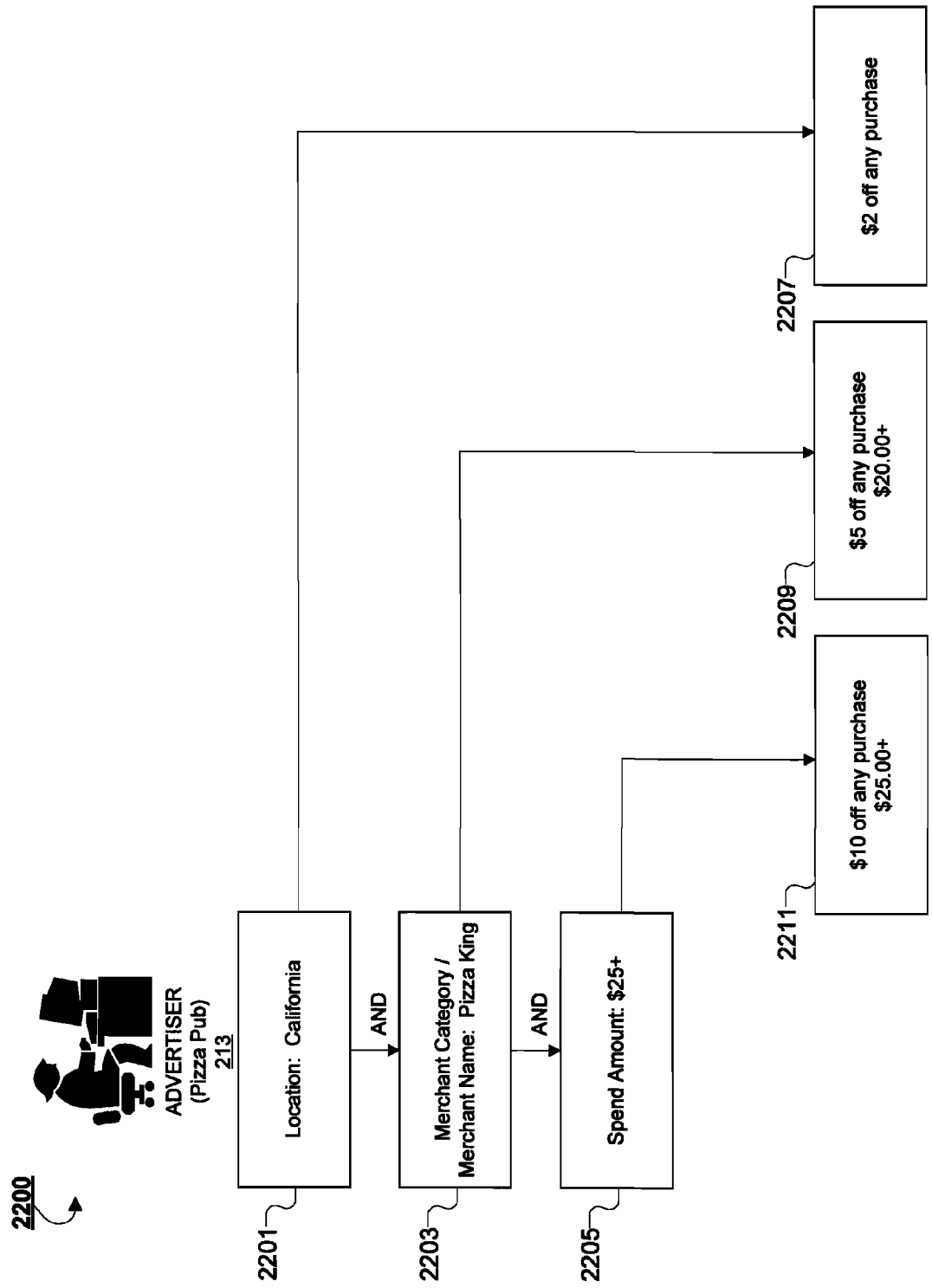
FIG. 22 EXEMPLARY MATCHING BASED ON DIMENSION(S)

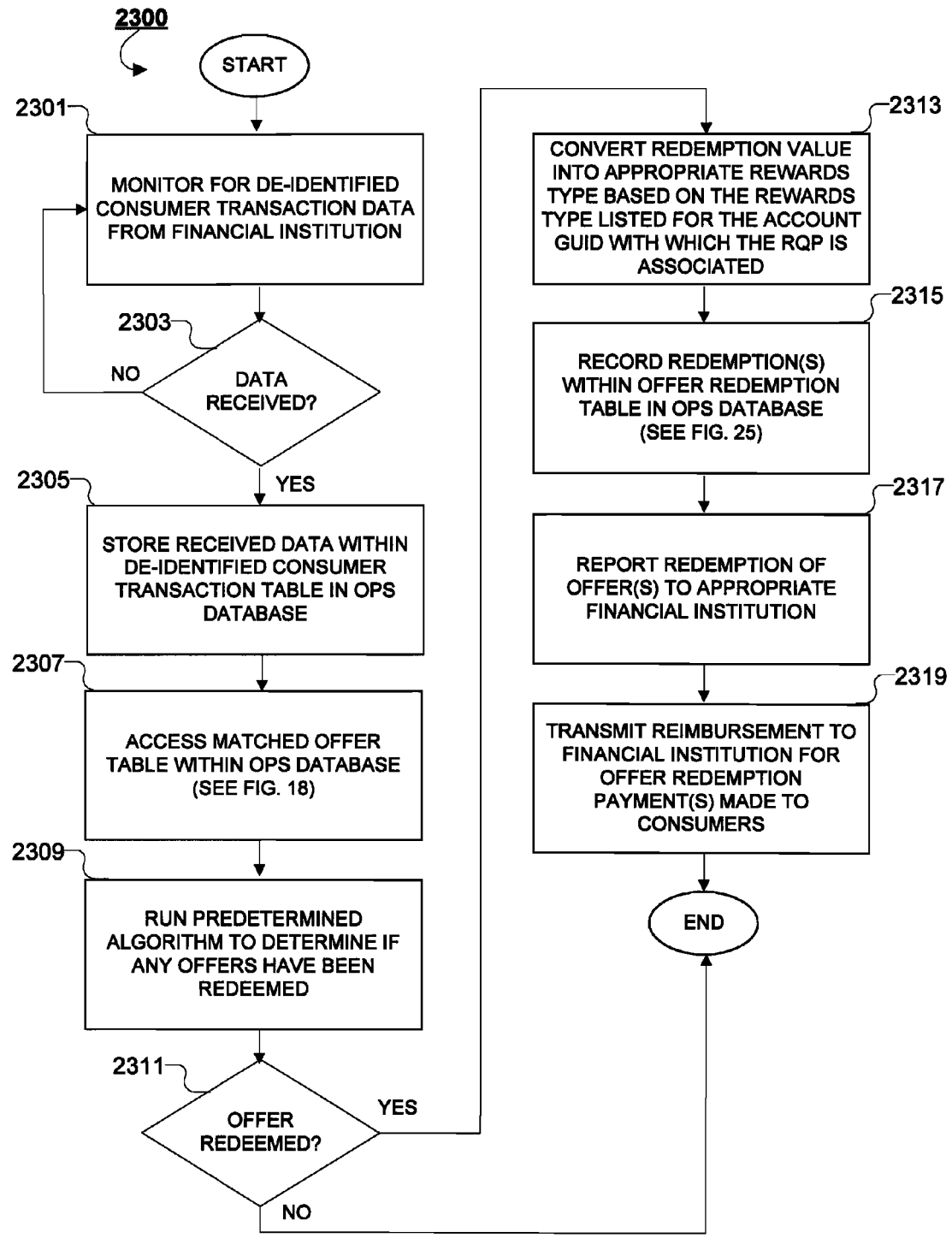
*FIG. 23* REDEMPTION PROCESS

2400

| OFFER ID | ACCOUNT GUID | DATE | TIME |
|---|---|---|---|
| 99999 | 12932 | 6/4/08 | 12:21 PM |
| 24832 | 49830 | 6/7/08 | 4:32 PM |
| 40568 | 80204 | 6/14/08 | 5:12 AM |
| 12944 | 18375 | 7/1/08 | 10:57 PM |
| 20394 | 24683 | 7/3/08 | 8:44 PM |

FIG. 24 OFFER IMPRESSION TABLE

2500

| OFFER ID | ACCOUNT GUID | DATE | TIME |
|---|---|---|---|
| 99999 | 12932 | 6/15/08 | 9:45 PM |
| 40568 | 80204 | 6/19/08 | 11:34 AM |
| 20394 | 24683 | 6/26/08 | 3:07 PM |

FIG. 25 OFFER REDEMPTION TABLE

2600

| OFFER ID | OFFER IMPRESSIONS | OFFER REDEMPTIONS |
|---|---|---|
| 99999 | 12030 | 81 |
| 40568 | 230449 | 9485 |
| 20394 | 782 | 23 |

FIG. 26 CAMPAIGN RESULTS TABLE

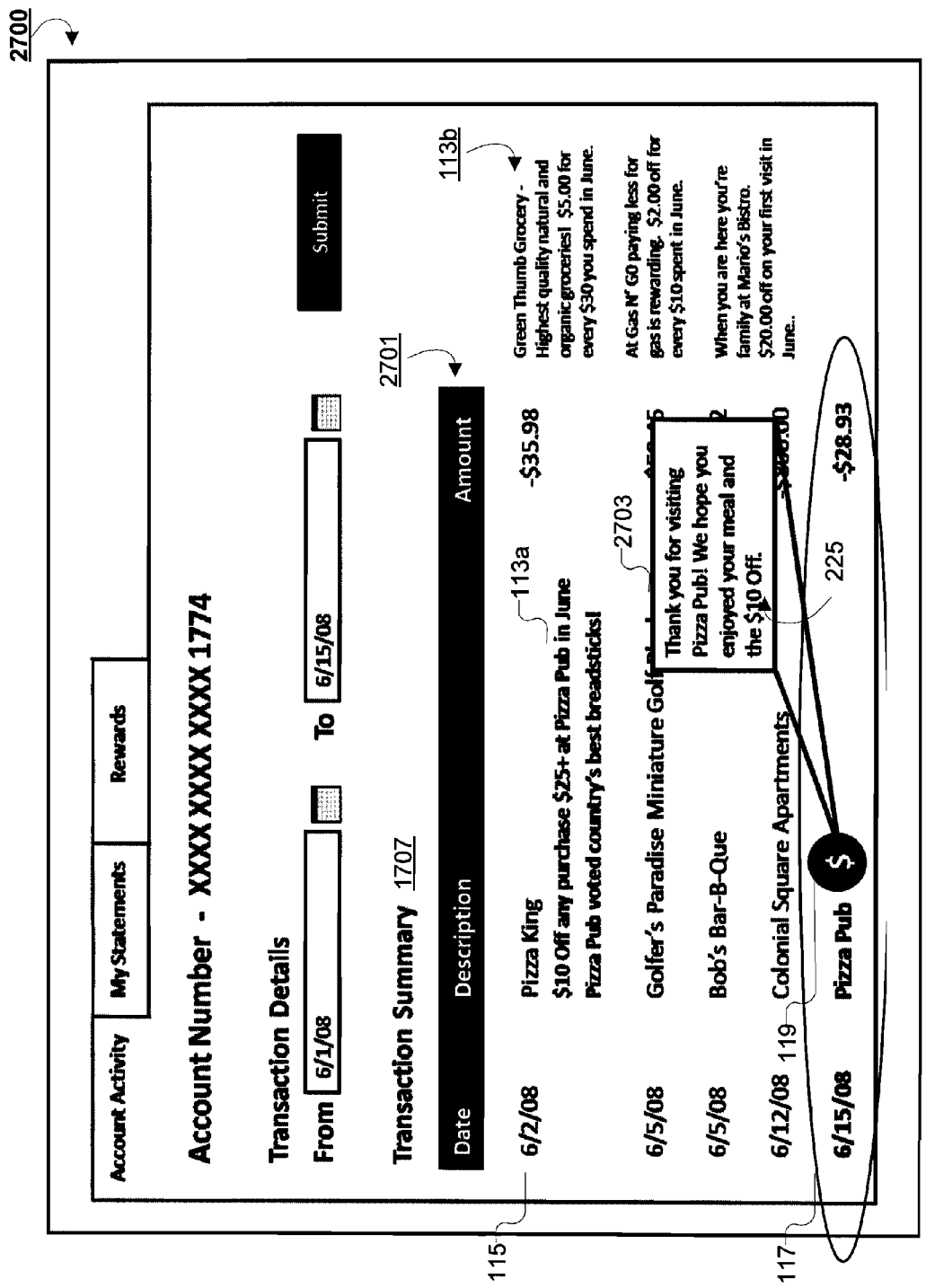
FIG. 27  CONSUMER TRANSACTION DISPLAY WITH REDEMPTION NOTIFICATION (CONSUMER FINANCIAL INSTITUTION PORTAL)

| Account Activity | My Statements | Rewards |
|---|---|---|
| | | 2001 |

Account Number - XXXX XXXX XXXX 1774

Rewards Details

From [6/1/08]  To [6/15/08]   [Submit]

Rewards Summary 2801

| Date | Description | Amount | Total |
|---|---|---|---|
| 6/3/08 | Frank's Fish House | $5.00 | $5.00 |
| 6/8/08 | Go-Kart Paradise | $5.00 | $10.00 |
| 6/15/08 | Pizza Pub | $10.00 | $20.00 |

225

2803

*FIG. 28* CONSUMER FINANCIAL INSTITUTION PORTAL REWARDS PAGE

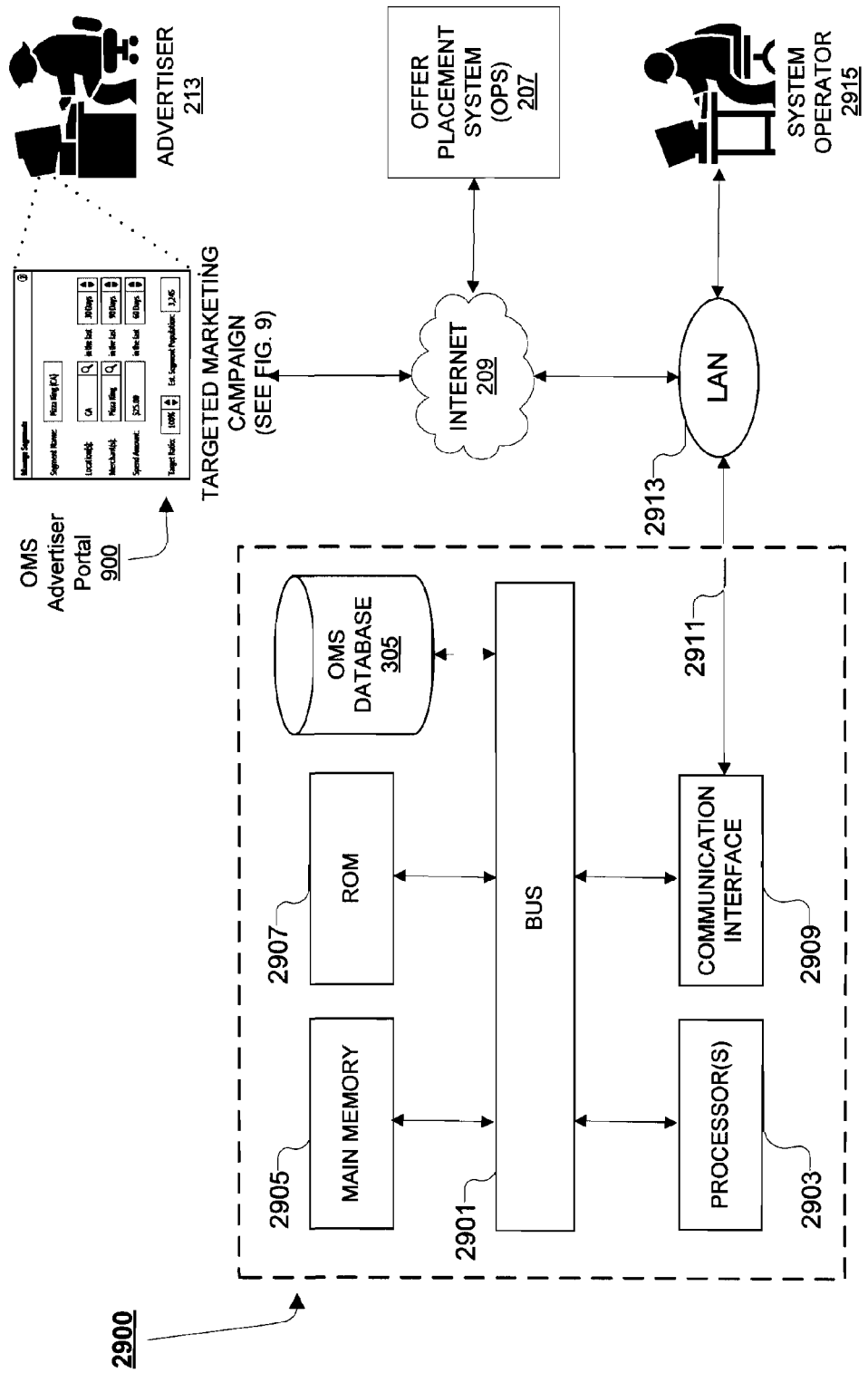
FIG. 29  EXEMPLARY OMS HARDWARE

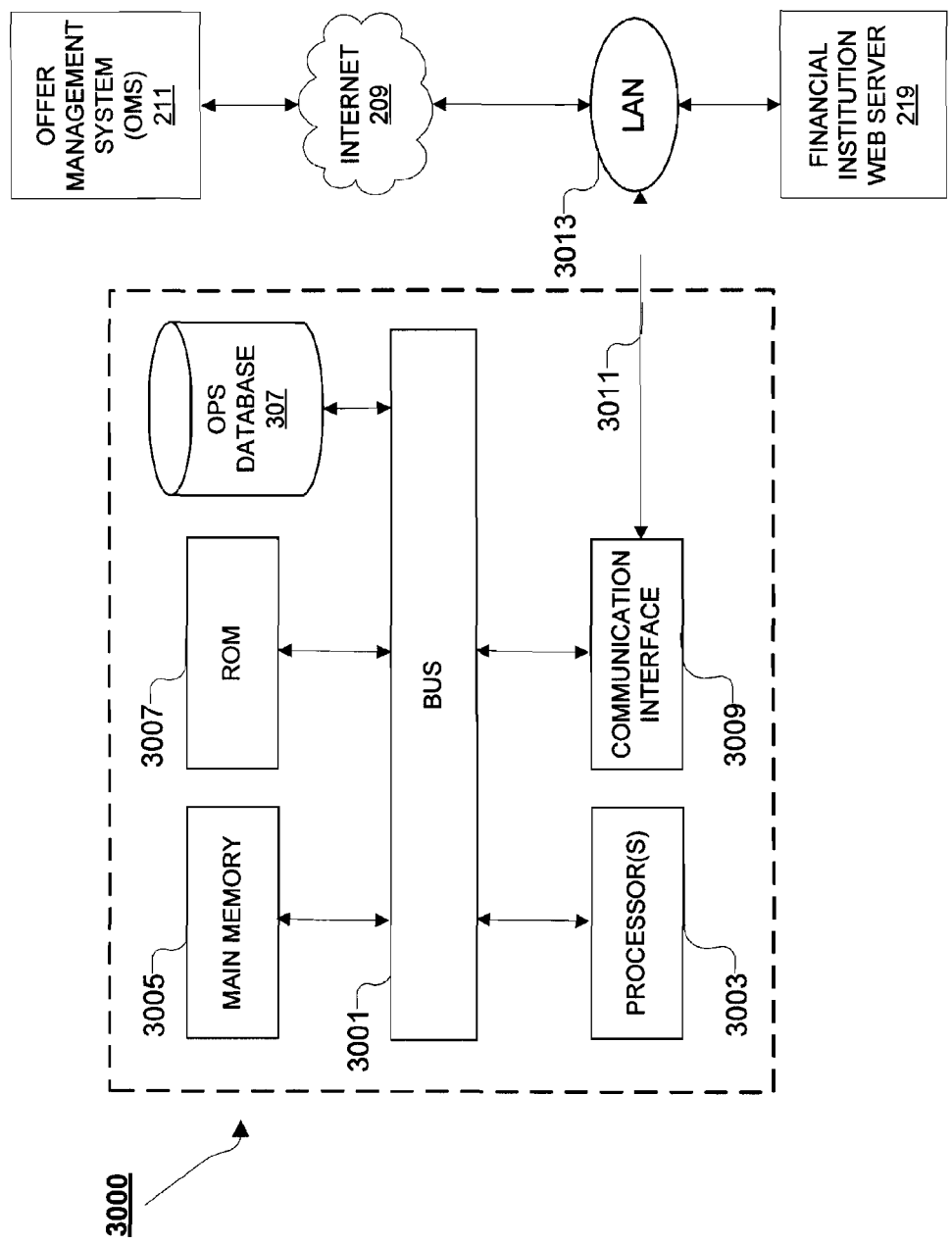
FIG. 30  EXEMPLARY OPS HARDWARE

OFFER PLACEMENT SYSTEM AND METHODS FOR TARGETED MARKETING OFFER DELIVERY SYSTEM

CROSS REFERENCE TO RELATED APPLICATIONS

This application claims benefit under 35U.S.C. §119(e) of U.S. Provisional Patent Application No. 61/108,332, filed Oct. 24, 2008, and entitled "System and Methods for Providing Targeted Marketing Offers to Consumers Via an Online Banking Portal", which is incorporated herein by reference as if set forth herein in its entirety.

This application is related to and incorporates by reference herein the following U.S. and international (PCT) patent applications:

U.S. patent application Ser. No. 12/486,131, entitled "System and Methods for Delivering Targeted Marketing Offers to Consumers Via an Online Portal", filed on Jun. 17, 2009;

U.S. patent application Ser. No. 12/486,146, entitled "Offer Management System and Methods for Targeted Marketing Offer Delivery System", filed on Jun. 17, 2009;

U.S. patent application Ser. No. 12/486,167, entitled "System and Methods for Offer Realization and Redemption in a Targeted Marketing Offer Delivery System", filed on Jun. 17, 2009;

U.S. patent application Ser. No. 12/486,204, entitled "System and Methods for Merging or Injecting Targeted Marketing Offers with a Transaction Display of an Online Portal", filed on Jun. 17, 2009; and International (PCT) patent application No. PCT/US2009/047652, entitled "System and Methods for Delivering Targeted Marketing Offers to Consumers Via an Online Portal", filed on Jun. 17, 2009; the disclosures of which applications are incorporated by reference as if the same were fully set forth herein.

TECHNICAL FIELD

The present systems and methods relate generally to electronic, computer-based targeted marketing systems, and more particularly to systems and methods for providing targeting marketing offers to consumers using financial services type online systems such as online banking portals.

BACKGROUND

Online financial services provided by financial institutions such as banks, credit unions, savings & loans, and brokerage institutions are becoming increasingly popular among consumers as a way to effectively manage their finances. Many people use such services to monitor their bank accounts and cash holdings, securities accounts, savings accounts, and so forth, and utilize financial-institution-provided online bill payment or check writing services. Generally, these online financial services are Internet-accessible via financial institution websites or web pages, including as viewed via mobile devices. As referred to herein, such online financial services type online systems will be referred to as "financial institution portals" or "banking portals," although other terms may apply to such services by different types of institutions.

In a traditional financial institution portal, users are typically provided with a listing of their accounts, and a further sub-listing of their recent transactions associated with those accounts. Each transaction will often include the date of the purchase or transaction, the amount of the transaction, the form in which the transaction occurred (i.e., check, credit card, etc.), and the retailer, service provider, or other establishment with which the transaction occurred. Based on the details available with each transaction, as well as the ease of use of most online banking portals, many consumers rely heavily on these portals to manage their finances and investments, stay on top of budgets, pay bills, and track their purchases. Additionally, with the advent and increased use of mobile devices (e.g., cell phones, smart phones, PDAs, etc.), consumers have constant access to their online services and accounts.

In order to provide detailed and up-to-date information regarding transactions, purchases, and accounts to portal users, banks and other financial service providers must keep thorough records of those transactions, and employ highly-sophisticated operational systems to maintain and organize such information. Accordingly, banking systems can provide a rich intelligence about the purchasing habits and propensities of consumers. It would be highly beneficial to most advertisers to have access to such detailed purchase information; however, due to strict privacy laws and regulations that limit how financial institutions can share consumer data, advertisers have never been able to access this valuable information.

Certain types of targeted marketing systems are known to be in use. The term "targeted marketing" generally refers to systems that enable the identification of particular classes or segments of consumers and the delivery by advertisers of specialized targeted marketing information and/or offers to such consumers. Consumers are often segmented into classes and subclasses based on age, gender, geography, socio-economic status, types of purchases, and other indicia. The specialized targeted marketing information provided to these identified classes of consumers can include special discounts on product purchases, coupons, rewards program points, or other similar incentives as regards specific products or services provided by advertisers. Generally, the more information known by an advertiser, the more targeted, specialized and valuable advertisements become.

Traditionally, marketers relied on general information such as their own historical sales data or common geographic data in order to target advertisements (in the form of mailers, television advertisements, etc.) to customers. While this type of targeted marketing does provide some benefit over undirected, mass marketing, it is not as specialized or precise as most advertisers would prefer. Even with the advent and widespread use of the Internet (and Internet advertisements), targeting marketing still does not reach the level of detail that would optimize the effectiveness of that marketing.

The ability to target advertisements to individual consumers based on each consumer's actual purchases would provide a highly-effective way to present products and/or services to consumers. For example, each consumer could be presented with advertisements for goods and/or services he or she regularly buys in the hopes of increasing the consumer's purchase of those goods and/or services. Or, the consumer could receive advertisements or offers for goods and/or service that are related to the consumer's past purchases (e.g., if a consumer recently purchased a lawn mower, then ads for related goods, such as lawn fertilizer or a hedge trimmer, could be provided). Additionally, advertisements could be presented based not on the specific goods and/or services purchased, but on peripheral information related to those purchases, such as the consumer's typical purchase amounts (e.g., consumer buys luxury items or is more cost-conscious), the geographic location of the consumer's transactions, the types of merchants at which the consumer often (or rarely) shops, etc. However, because merchants and advertisers do not have access to individual consumer purchase histories (such as the types of products purchased, dates purchased, amounts spent, specific merchants from which items were purchased, etc.), such targeted marketing has traditionally been unavailable.

Further, many types of offers or redemptions associated with targeted marketing campaigns are difficult for consumers to use and problematic for advertisers to track. For example, many consumers are unlikely to use coupons that require printing from a computer or clipping from a newspaper in order to be used. Accordingly, many consumers ignore such coupons and their associated advertisements.

Another issue related to traditional targeted marketing systems is that advertisers generally only have records as to their own sales data, and they do not have access to information regarding how much consumers spend or how often consumers shop at competitors of the advertisers, or even at unrelated advertisers. Such transaction data, if available, could prove invaluable for marketing and profitability purposes. As an example, one class of consumers could be that of purchasers of home-delivered pizzas. An advertiser (e.g., hypothetical advertiser "Pizza Pub") that delivers pizzas to the homes of customers may rely on past purchases or demographic information within a community to target mailers or television advertisements to those consumers. However, if that advertiser had access to information relating to existing customers of a competitor (e.g., hypothetical merchant "Pizza King"), then the advertiser could target advertisements to the competitor's customers in the hopes of drawing them away from the competitor. Further, the advertiser could then analyze information about the competitor's customers to determine what made the customers choose the competitor's product initially. Naturally, however, it is difficult for advertisers in most markets to obtain marketing intelligence about consumers of their competitors.

Additionally, financial institutions are always looking for ways to boost their revenue streams and increase customer loyalty. Presentation of valuable marketing offers (such as rebates or savings on goods and/or services) to consumers that use particular financial institution accounts is one way to increase loyalty and entice consumers to use payment mechanisms associated with those accounts (i.e., credit cards, bank cards, etc.). However, most banks lack the internal infrastructure necessary to effectively integrate advertisements from third parties into their existing financial institution portals. If an advertiser could work with a bank to extend offers to its customers based on the bank's knowledge of what its customers purchase, while preventing the advertiser from accessing sensitive or consumer-identifying data, then that information could be used to provide valuable and targeted marketing offers to consumers that are easy for the consumers to redeem, which would in turn lead to greater profits and increased customer loyalty for all parties involved.

Therefore, there is a long-felt but unresolved need for a system or method that interacts seamlessly with sophisticated banking systems and online banking portals, or other transaction-centric information portals or data repositories, to provide targeted marketing offers and advertisements to users of those portals, wherein such targeted marketing is related to each user's transactions and purchases displayed at the portal, as well as the user's purchase histories and/or spending habits. There is a further need for a system or method that enables simple and straightforward redemption of targeted marketing offers while still allowing merchants and advertisers to track the effectiveness of their targeted marketing campaigns. There is yet a further need for a system or method that provides such targeted marketing to financial institution customers without violating privacy laws and obtaining confidential customer information.

BRIEF SUMMARY OF THE DISCLOSURE

Briefly described, and according to one embodiment, aspects of the present disclosure generally relate to systems and methods for providing targeted marketing offers to consumers via online (Internet web-based) portals, particularly online financial institution portals associated with banks and other financial institutions. A targeted marketing system (TMS), as described herein, enables advertisers to construct highly-relevant advertisements and marketing offers that are displayed to consumers as those consumers access and view their online financial institution account portals. The offers are generally targeted to specific types of consumers based on prior transactions or purchases made by the consumers, as well as patterns in those transactions, overall consumer spending habits, and other offer-triggering events. Generally, the TMS matches specific targeted marketing offers to consumers based upon offer criteria and associated offer-triggering events defined by advertisers, provides matched offers to identified consumers via the consumers' online portals, tracks redemptions and other data associated with the offers, facilitates payment of rewards and redemptions to consumers based on redeemed offers, and enables a variety of other processes and functions as described in greater detail herein.

According to one aspect, the TMS includes an offer management system (OMS) and one or more offer placement systems (OPS's), wherein each OPS operates in association or cooperation with a financial institution's online services system. Generally, the OMS enables creation of targeted marketing campaigns including one or more targeted marketing offers for eventual delivery to consumers based on information received by advertisers, transmission of campaign data to the OPS's, reporting of marketing data and campaign results to advertisers after offers have been displayed to consumers, collecting redemption funds from advertisers based on redeemed offers and distributing those funds to financial institutions, and other processes described in greater detail herein. Generally, operations of an OPS include matching received campaign data from the OMS with de-identified consumer transaction data received from financial institutions, injecting or merging targeted marketing offers into financial institution portals, sending targeted marketing campaign performance data to the OMS, organizing and transmitting redemption data to financial institutions based on offer redemptions paid to consumers, and other processes described in greater detail herein.

More particularly described, aspects of the present disclosure relate to functions and processes associated with an offer placement system (OPS) of the TMS. According to one aspect, the OPS is operatively coupled to a financial institution computer system (utilizing network security protections of the financial institution computer system) and an offer management system (OMS). The OPS receives campaign data from the OMS corresponding to advertiser-created targeted marketing campaigns including one or more targeted marketing offers. The OPS also receives de-identified transaction data from the financial institution computer system indicating transactions completed by a plurality of consumers. The campaign data and de-identified transaction data are stored in one or more databases within the OPS for subsequent processing. Based on the stored campaign data and de-identified transaction data, the OPS identifies an offer-triggering event associated with a consumer, such as an offer-qualifying transaction, a group of transactions, an online portal session, or some other similar event, matches the offer-triggering event to one or more offers in the campaign data, and delivers information associated with the matched offers to the consumer during an online session conducted by the consumer. As offers are viewed and/or redeemed by consumers, the OPS tracks offer impression and redemption data for subsequent reporting to advertisers, and for instructing the financial institution to issue redemption payments (i.e., rewards) to consumers.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 illustrates a high-level lifecycle of an exemplary consumer transaction, associated marketing offer, and redemption of that offer according to one embodiment of a targeted marketing system (TMS) constructed in accordance with the present disclosure and certain aspects of the inventions.

FIG. 2 illustrates a high-level overview of one embodiment of a targeted marketing system (TMS) and its associated environment, according to one aspect of the disclosure.

FIG. 3 shows one embodiment of a system architecture for a targeted marketing system (TMS) according to an aspect of the disclosure.

FIG. 4 is a flowchart illustrating the overall processes and functions performed by the offer management system (OMS) according to one embodiment of the present targeted marketing system (TMS).

FIG. 5 is a flowchart illustrating one embodiment of a merchant identification process.

FIG. 6 is an exemplary merchant identification table illustrating data utilized to categorize and identify merchant names within an embodiment of the targeted marketing system (TMS).

FIG. 7 is an exemplary validated merchant table illustrating data associated with merchant names deemed validly identified and thus available for reference in matching consumer transactions to campaign data according to one embodiment of the targeted marketing system (TMS).

FIG. 8 is a flowchart illustrating the campaign generation process from the perspective of an advertiser according to an embodiment of the present targeted marketing system (TMS).

FIG. 9 is an exemplary screen shot of a graphical user interface (GUI) associated with an embodiment of the offer management system (OMS) advertiser portal.

FIG. 10 is a flowchart is illustrating one embodiment of the campaign generation process from the perspective of the targeted marketing system (TMS).

FIG. 11 is an exemplary campaign table illustrating advertiser-entered, campaign-related data received during campaign generation.

FIG. 12 is an exemplary segment table illustrating advertiser-entered, segment-related data received during campaign generation.

FIG. 13 is an exemplary offer table illustrating advertiser-entered, offer-related data received during campaign generation.

FIG. 14 is a flowchart illustrating the overall processes and functions performed by the offer placement system (OPS) according to one embodiment of the present targeted marketing system (TMS).

FIG. 15 is a flowchart illustrating one embodiment of the matching process for matching targeted marketing offers (TMOs) to consumer offer-qualifying purchases (OQPs).

FIG. 16 is an exemplary consumer transaction table illustrating consumer transactions recorded by a financial institution and stored within a financial institution database.

FIG. 17 is an exemplary de-identified consumer transaction table illustrating de-identified consumer transactions recorded by a financial institution.

FIG. 18 is an exemplary matched offer table illustrating identifiers associated with matched transactions and offers as a result of the matching process shown in FIG. 15.

FIG. 19, consisting of FIGS. 19A and 19B, illustrates a process for injecting or merging matched offers into a display from an online portal, where FIG. 19A is a flowchart illustrating an embodiment of a generalized process for injecting or merging matched offers, and FIG. 19B is a sequence diagram illustrating the sequence of steps associated with injecting matched offers into consumer financial institution portals via a document object model (DOM) injection process according to one embodiment of the targeted marketing system (TMS).

FIG. 20 illustrates an exemplary screen shot of a graphical user interface (GUI) associated with a typical exemplary consumer financial institution portal prior to injection of one or more targeted marketing offers (TMOs) into the portal.

FIG. 21 illustrates an exemplary screen shot of a graphical user interface (GUI) associated with a consumer financial institution portal or display with exemplary targeted marketing offers (TMOs) displayed therein according to an embodiment of the present targeted marketing system (TMS).

FIG. 22 shows a block diagram illustrating the potential matching of three exemplary offers to consumers associated with three unique targeted consumer segments (TCS's) based on predefined dimensions associated with the segments.

FIG. 23 is a flowchart illustrating an embodiment of the redemption process for determining whether one or more targeted marketing offers (TMOs) have been redeemed by a consumer, and reporting such redemption to the respective financial institution.

FIG. 24 is an exemplary offer impression table illustrating recorded offers that have been viewed by consumers based on consumer log-ins to financial institution portals.

FIG. 25 is an exemplary offer redemption table illustrating offers that have been redeemed by consumers based on redemption-qualifying purchases (RQPs).

FIG. 26 is an exemplary campaign results table illustrating aggregated offer performance data (i.e., offer impressions and redemptions).

FIG. 27 illustrates an exemplary screen shot of a GUI associated with a consumer financial institution portal with a targeted marketing offer (TMO), redemption-qualifying purchase (RQP), and a RQP icon displayed therein according to an embodiment of the present targeted marketing system (TMS).

FIG. 28 illustrates an exemplary screen shot of a GUI associated with a consumer financial institution portal displaying a representative rewards page according to an embodiment of the present targeted marketing system (TMS).

FIG. 29 illustrates an exemplary offer management system (OMS) hardware architecture upon which an embodiment of the OMS may be implemented as herein described.

FIG. 30 illustrates an exemplary offer placement system (OPS) hardware architecture upon which an embodiment of the OPS may be implemented as herein described.

DETAILED DESCRIPTION

Prior to a detailed description of the disclosure, the following definitions are provided as an aid to understanding the subject matter and terminology of aspects of the present systems and methods, are exemplary, and not necessarily limiting of the aspects of the systems and methods, which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Definitions/Glossary

Advertiser: an entity that provides or sells goods and/or services to consumers, and creates targeted marketing campaigns associated with those goods and/or services as described herein.

Aggregated Consumer Transaction Data: subset of de-identified consumer transaction data derived from all stored de-identified consumer transaction data in each offer placement system (OPS) representative of consumers that satisfy a given targeted consumer segment (TCS). Generally collected and transmitted to the offer management system (OMS) in response to an advertiser-initiated query during generation of a targeted marketing campaign (TMC). Generally synonymous with aggregated transaction data, aggregated consumer transactions, aggregated consumer transaction information, and aggregated population totals.

Campaign: see targeted marketing campaign (TMC).

Campaign Data: information associated with a targeted marketing campaign (TMC), as well as its associated targeted consumer segments (TCS's) and targeted marketing offers (TMOs). Generally includes data and/or information stored in the campaign table, segment table, and offer table.

Campaign Delimiting Information: information associated with a targeted marketing campaign (TMC) that limits or defines the campaign, including but not limited to: a campaign name, a campaign theme, a campaign start date, a campaign end date, etc. Generally synonymous with campaign criteria.

Campaign Performance Data: information associated with consumer interaction (i.e., results or performance) of a targeted marketing campaign (TMC). Generally includes data and/or information stored in the offer redemption table, offer impression table, and campaign results table. Generally synonymous with campaign results data and performance data.

Campaign Results Table: a data table or file in the targeted marketing system (TMS) associating information relating to the performance (results) of one or more targeted marketing campaigns (TMCs) and associated offers, including but not limited to: an offer identifier (ID), aggregated offer impressions, aggregated offer redemptions, etc.

Campaign Table: a data table or file in the targeted marketing system (TMS) associating information relating to one or more targeted marketing campaigns (TMCs) conducted by a particular advertiser (or merchant), including but not limited to: a campaign identifier (ID), merchant or advertiser identifier (ID), an author identifier (ID), a campaign start date, a campaign end date, etc.

Competitor: an entity that provides or sells competing or related goods and/or services to those of a merchant. Generally synonymous with merchant and advertiser competitor.

Consumer: an entity (individual, business, etc.) that holds at least one account with one or more financial institutions, and completes transactions and purchases with advertisers and merchants. According to aspects of the invention(s), based on completed transactions or other offer-triggering events (OTEs), a consumer becomes eligible to receive one or more targeted marketing offers (TMOs) via the consumer's online financial institution portal.

Consumer Transaction Table: a data table or file stored and retained within a financial institution's transaction system/processor associating information relating to particular consumer transactions, including but not limited to: a consumer name, a consumer identifier (ID), a consumer account identifier (ID), a transaction identifier (ID), a location identifier (ID) (e.g., zip or postal code, city, state, etc.), a merchant identifier (ID), an amount, a rewards type, etc.

De-Identified Consumer Transaction Table: a data table or file in the targeted marketing system (TMS), and specifically retained in one or more offer placement systems (OPS's), associating de-identified information relating to particular transactions within a financial institution's online banking system that may be eligible to be matched with a targeted marketing offer (TMO), including but not limited to: an account global unique identifier (GUID) that relates back to a particular consumer or customer of the financial institution, a transaction identifier (ID), a location identifier (ID) (e.g., zip or postal code, city, state, etc.), a merchant identifier (ID), an amount, a rewards type, etc.

De-Identified Transaction: a consumer transaction or purchase that has been processed according to an internal financial institution procedure to remove specific consumer- or account-identifying information. Generally synonymous with de-identified consumer transaction.

Demilitarized Zone (DMZ): a firewall configuration for selecting or demarcating local area networks (LANs). Computers residing behind the DMZ initiate secure outbound requests via the DMZ; computers within the DMZ in turn respond, forward, or re-issue requests out to the Internet or other public networks. Generally used in association with financial institution security protocols.

Dimension: a delineating category or information associated with a targeted consumer segment (TCS) that serves to narrow the population of consumers that may receive a targeted marketing offer (TMO) based on criteria associated with specific consumer transactions or other offer-triggering events (OTEs), including but not limited to: a merchant or advertiser category (e.g., retail, entertainment, dining, etc.), a merchant or advertiser name or identifier, a transaction location (e.g., zip or postal code, city, etc.), a spend amount, a total spend amount for a given time period, an average spend amount for a given time period, a total number of transactions in a given time period, etc. Generally synonymous with segment delimiting information or segment criteria.

Dynamic Resegmentation: process of automatically delivering follow-up targeted marketing offers (TMOs) to consumers who redeem original or initial TMOs.

Financial Institution: an entity that provides banking or other financial-related services to consumers (customers) and, in connection with the disclosed invention(s), offers online banking capabilities to its customers, such entities including but not limited to: banks, credit unions, credit card companies, brokerage institutions, lending institutions, savings & loans, etc. In order to utilize aspects of the claimed invention(s), a financial institution will generally include and/or operate or control a financial institution computer system that enables the various functions of the financial institution, wherein the financial institution computer system includes, among other system components, a financial institution portal, a financial institution transaction processor, and a financial institution web server. Generally synonymous with bank.

Financial Institution Portal: a secure and individually-accessible online portal (i.e., having a graphical user interface and/or other controls for use by consumers) that displays information related one or more accounts held by a consumer with a respective financial institution. Generally, a financial institution portal is Internet-accessible via a financial institution webpage, and displays prior financial transactions associated with the consumer's account(s), as well as targeted marketing offers (TMOs) and subsequent redemptions of those offers. Information associated with financial institution portals (e.g., transactions, TMOs, etc.) is also generally accessible via consumer mobile devices (i.e., through wireless Internet connections, mobile banking applications, SMS alerts, etc.), email notifications, and other similar mechanisms. Generally synonymous with banking portal.

Financial Institution Transaction Processor: server or processor within a financial institution that receives and stores consumer transaction data from merchants, and, in accordance with aspects of the claimed invention(s), de-identifies such transaction data to remove consumer- and/or account-specific information, transmits de-identified consumer transaction data to the offer placement system (OPS) for offer matching purposes, issues redemptions/rewards to consumers, and performs other similar functions as described herein. Generally synonymous with financial institution transaction system.

Financial Institution Web Server: a computer server within a financial institution for serving financial institution content, such as web pages, transaction data, targeted marketing offers (TMOs), redemptions/rewards, and other similar content to consumers via a financial institution portal. Generally enables communication and data sharing between internal components of the financial institution (e.g., financial institution transaction processor) and components of the targeted marketing system (TMS). In accordance with aspects of the invention, a financial institution web server provides and operates a corresponding and associated financial institution portal.

Identity Assurance Rating: a percentage-based measure of the likelihood that a given unidentified merchant name extracted from consumer transaction data is associated with or represents a known or validated merchant within the targeted marketing system (TMS) as a result of a merchant identification process. Generally synonymous with identity assurance score.

Impression: an occurrence or instance of a consumer logging in to his or her financial institution portal, whereby a particular targeted marketing offer (TMO) is displayed to (and/or viewed by) the consumer. Generally synonymous with offer impression.

Matched Offer Table: a data table or file in the targeted marketing system (TMS) associating information relating to particular targeted marketing offers (TMOs) that have been matched to specific consumer transactions or specific offer-triggering events (OTEs) and may be delivered to the consumers that completed the specific transactions or OTEs, including but not limited to: a transaction identifier (ID), an offer-triggering event identifier (ID), an offer identifier (ID), an account global unique identifier (GUID) of the consumer account, etc.

Merchant: an entity that provides or sells goods and/or services to consumers. As used herein, generally comprises an entity that provides or sells competing or related goods and/or services to those of an advertiser. Generally synonymous with competitor and advertiser competitor.

Merchant Category: a predetermined grouping of merchants based on the specific nature of the merchants' business(s) and/or service(s). Generally, each merchant associated with the targeted marketing system (TMS) belongs to one or more merchant categories. Merchant categories generally serve as optional dimensions used by advertisers to define targeted consumer segments (TCS's) during generation of targeted marketing campaigns (TMCs).

Merchant Identification Table: a data table or file in the targeted marketing system (TMS) associating information relating to unidentified merchant names which have been analyzed via the merchant identification process and associated with known or validated merchants recognized by the TMS, including but not limited to: an unidentified merchant key, an unidentified merchant name, a validated merchant key, a validated merchant name, a merchant category, an identity assurance rating, etc.

Offer: see targeted marketing offer (TMO).

Offer Defining Information: information associated with a targeted marketing offer (TMO) that limits or defines the offer, including but not limited to: an offer identifier (ID), an offer amount, an offer start date, an offer end date, offer text, an offer image (e.g., a logo or trademark), a minimum qualifying spend amount, etc. Generally synonymous with offer specifics, offer terms or terms of offer.

Offer Display Information: information associated with a targeted marketing offer (TMO) that is displayed to a consumer via the consumer's financial institution portal.

Offer Impression Table: a data table or file in the targeted marketing system (TMS) associating information indicating that a particular targeted marketing offer (TMO) was actually delivered to (and/or viewed by) a particular consumer, including but not limited to: an offer identifier (ID), an account global unique identifier (GUID), a date of impression, a time of impression, etc.

Offer Management System (OMS): component of the targeted marketing system (TMS) that enables creation of targeted marketing campaigns (TMCs), targeted consumer segments (TCS's), and targeted marketing offers (TMOs), reporting of marketing data and campaign results to advertisers, transmission of data to and receipt of data from one or more offer placement systems (OPS's), and other similar processes as described herein. Generally includes one or more databases, memories, servers, computer readable media, processors, algorithms, portals, and other similar components.

Offer Placement System (OPS): component of the targeted marketing system (TMS) that enables matching of received campaign data from the offer management system (OMS) with de-identified consumer transaction data from financial institutions, injecting or merging targeted marketing offers into financial institution portals, organizing and transmitting redemption data to financial institutions for reimbursements to consumers, transmission of data to and receipt of data from the OMS, and other similar processes as described herein.

Generally includes one or more databases, memories, servers, computer readable media, processors, algorithms, and other similar components.

Offer-Qualifying Purchase (OQP): a transaction or purchase by a consumer that may be eligible (qualify) to receive a targeted marketing offer (TMO), once processed by a system constructed as described herein. Generally synonymous with offer-qualifying transaction.

Offer Redemption Payment (ORP): a value provided to a consumer or credited to a consumer's account based on the consumer's redemption of a particular targeted marketing offer (TMO), including but not limited to: financial payment, cash back, account credit, account points, airline miles, hotel points, restaurant points, and other similar incentives. As used herein, an ORP is not necessarily a "payment" in the sense of money or funds, and should thus be understood as generally synonymous with reward.

Offer Redemption Table: a data table or file in the targeted marketing system (TMS) associating information indicating that a particular targeted marketing offer (TMO) delivered to a particular consumer was acted upon (i.e., redeemed), including but not limited to: an offer identifier (ID), an account global unique identifier (GUID), a date of redemption, a time of redemption, etc.

Offer Table: a data table or file in the targeted marketing system (TMS) associating information relating to the content of particular targeted marketing offers (TMOs) for delivery to selected consumers, including but not limited to: an offer identifier (ID), a campaign identifier (ID), a segment identifier (ID), an offer amount, an offer start date, an offer end date, offer text, an offer image (e.g., a logo or trademark), a minimum qualifying spend amount, etc.

Offer-Triggering Event (OTE): an event or series of events that, if satisfied, dictate that an offer or advertisement should be provided to a consumer, including but not limited to: an offer-qualifying purchase (OQP), satisfaction of a targeted consumer segment (TCS) or some other merchant-defined criteria, conduction of an online financial institution portal session by a consumer, etc. Generally, an offer-triggering event comprises satisfaction of a predefined category or set of criteria identifying how a consumer spends (or does not spend) money, typically based on each consumer's transaction history (e.g., types of merchants at which a consumer typically shops, types of merchants at which a consumer rarely shops, average number of transactions completed by a consumer for a given month, average spend amount (dollar value) of a consumer's transactions, geographic locations in which a consumer typically shops, etc.).

OMS Advertiser Portal: an online, secure, individually-accessible portal (i.e., graphical user interface) used by advertisers, advertising agencies, and other similar entities to create targeted marketing campaigns (TMCs), targeted consumer segments (TCS's), and targeted marketing offers (TMOs), review previously-created campaigns, segments, and offers, review and analyze reports and statistics related to performance of particular campaigns, conduct billing operations, and carry out other similar tasks.

Redemption: realization of a targeted marketing offer (TMO) by a consumer via a redemption-qualifying purchase (RQP).

Redemption-Qualifying Purchase (RQP): a transaction or purchase by a consumer that satisfies the associated criteria of at least one targeted marketing offer (TMO), and thereby qualifies the consumer for a reward. Generally, but not always, associated with the same account with which the offer-qualifying purchase (OQP) or offer-triggering event (OTE) occurred. Generally synonymous with redemption-qualifying transaction.

Reverse Proxy: a security component, often used by financial institution computer systems, that provides a layer of security to each financial institution's local area network (LAN) in addition to the financial institution's firewall(s). Generally includes computers and/or processors acting as proxy servers to intercept, inspect, and (if necessary) redirect inbound and outbound communications between components on either side of the reverse proxy. Generally used in association with financial institution security protocols, for example, to handle Secure Sockets Layer (SSL) encryption often used between a consumer's computer and a financial institution web server, caching of content, load balancing, performance acceleration, and for other reasons understood by those skilled in the art.

Segment: see targeted consumer segment (TCS).

Segment Delimiting Information: see dimension.

Segment Table: a data table or file in the targeted marking system (TMS) associating information used to identify a particular segment of consumers based on transactions completed by those consumers, including but not limited to: a segment identifier (ID), a campaign identifier (ID), a merchant or advertiser category (e.g., retail, entertainment, dining, etc.), a merchant or advertiser name or identifier (ID), a transaction location (e.g., zip or postal code, city, etc.), a spend amount, etc.

Targeted Consumer Segment (TCS): a group of consumers to which at least one targeted marketing offer (TMO) applies based on the specifics of the offer(s) and one or more offer-qualifying transactions or offer-triggering events (OTEs) completed by each consumer. Generally a subset of the entire population of available consumers. Generally synonymous with segment and market segment.

Targeted Marketing Campaign (TMC): a marketing campaign constructed by an advertiser, advertising agency, or other entity designed to generate and place advertisements in the form of targeted marketing offers (TMOs) and display such TMOs to consumers via the consumers' online financial institution portals. Generally includes one or more targeted consumer segments (TCS's) and one or more TMOs. Generally synonymous with campaign.

Targeted Marketing Offer (TMO): an offer to deliver a particular reward, refund, financial payment, offer redemption payment, or other incentive to a consumer via a system constructed as described herein, in response to the consumer satisfying certain requirements of the offer, e.g., purchase of goods or services in accordance with the offer, provision of requested information, or other required action or condition satisfaction. Generally, each TMO is associated with a corresponding targeted consumer segment (TCS). As described herein, TMOs are presented to consumers during the consumers' online banking sessions via each consumer's financial institution portal. Generally synonymous with offer or advertisement.

Targeted Marketing System (TMS): overall system as described herein for creating targeted marketing campaigns, delivering those campaigns to consumers via financial institution portals, tracking consumer redemption of marketing offers, reporting campaign results, maintaining privacy and security amongst financial institution clients (i.e., consumers), and performing a host of other tasks and processes as described in detail herein. Generally includes an offer management system (OMS), one or more offer placement systems (OPS), and other additional components as described herein.

Transaction Table: see consumer transaction table and de-identified consumer transaction table.

Unidentified Merchant Key: a unique identifier assigned to each unidentified merchant name within the targeted marketing system (TMS).

Unidentified Merchant Name: a merchant name extracted from consumer transaction data and transmitted to the offer management system (OMS) for identification and association with a recognized or validated merchant within the targeted marketing system (TMS).

Validated Merchant Key: a unique identifier assigned to each validated merchant name that has been associated with a recognized merchant within the targeted marketing system (TMS) based on completion of the merchant identification process.

Validated Merchant Name: an accepted or recognized name (and all validated variations thereof) associated with a given merchant within the targeted marketing system (TMS). Generally, unidentified merchant names are associated with validated merchant names upon completion of the merchant identification process and the attainment of an identity assurance rating above a predefined threshold rating. Generally synonymous with cleansed merchant name.

Validated Merchant Table: a data table or file in the targeted marketing system (TMS) associating information relating to merchant names that have been validated via the merchant identification process based on a calculated identity assurance rating above a predefined threshold rating, including but not limited to: an unidentified merchant key, an unidentified merchant name, a validated merchant key, a validated merchant name, a merchant category, an identity assurance rating, etc.

Overview

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Aspects of the present disclosure generally relate to systems and methods for providing targeted marketing offers to consumers via online portals, especially applicable but not limited to financial institution portals. Although the description which follows is primarily directed to application of the claimed invention(s) to financial institution portals, it should be understood that the invention(s) have broader applicability to any systems with portals that allow consumer viewing of predetermined information maintained by third parties on behalf of such consumers, especially those that relate to financial transactions, purchases, sales, or other commercial transactions that can be analyzed for purposes of generated targeted marketing offers based on such predetermined information.

A targeted marketing system (TMS), as described here in context of a financial institution portal, enables advertisers to construct highly-relevant advertisements and marketing offers that are displayed to consumers as those consumers access and view their online financial institution account portals. The offers are generally targeted to specific consumers based on prior transactions or purchases made by the consumers, as well as patterns in those transactions and overall consumer spending habits. However, based on aspects of embodiments of the TMS described in detail herein, advertisers have no knowledge of specific consumers nor any information relating to particular consumer transactions. Thus, embodiments of the TMS allow targeted advertising on a banking portal in a manner that protects all consumer data and privacy, and is compliant with the highly-complex banking and financial institution regulatory environment.

Additionally, embodiments of the TMS, via cooperation with one or more financial institutions, further enable accurate and automatic redemption or realization of offers when consumers make redemption-qualifying purchases. Further aspects of the present systems and methods facilitate reporting and analytics to advertisers regarding consumer interaction with and redemption of marketing offers, aggregation of de-identified financial transaction data for advertiser use in targeted marketing campaign creation, and a host of other functions and processes as are described in detail herein.

According to one embodiment, a TMS includes an offer management system (OMS) and one or more offer placement systems (OPS's), wherein each OPS operates in association or cooperation with a financial institution's online services system (i.e., online environment), including a financial institution transaction processor and financial institution web server, thereby providing a financial institution portal. Generally, the OMS enables creation of targeted marketing campaigns by advertisers, reporting of marketing data and campaign results to advertisers, collecting redemption funds from advertisers and distributing those funds to financial institutions, and other processes described in greater detail below. Generally, operations of an OPS include matching received campaign data from the OMS with de-identified consumer transaction data received from financial institutions, injecting or merging targeted marketing offers into financial institution portals, sending targeted marketing campaign performance data to the OMS, organizing and transmitting redemption data to financial institutions for reimbursements to consumers, and other processes described in greater detail below.

In one embodiment, "de-identified" transaction data (i.e., transaction data void of any consumer- or account-specific identifying information) is sent to an OPS by a respective financial institution. Typically, at least one OPS is in operative association with each participating financial institution to allow direct communication between each OPS and its respective financial institution. Generally, the transaction data is de-identified by each financial institution according to the institution's own internal protocols and procedure for removing account information and other consumer-identifying information. Each OPS stores this information for subsequent offer matching. Additionally, each OPS aggregates the de-identified consumer transaction information and makes such information available to the OMS for use in campaign creation. When needed, the OMS requests and accesses this aggregated transaction data and utilizes it during campaign creation to estimate potential populations of consumers that will receive targeted marketing offers associated with campaigns, and other similar uses. During campaign creation, advertisers that wish to provide targeted marketing offers (TMOs) interact with an OMS advertiser portal that displays campaign specifics, enables creation of targeted marketing segments and offers, allows advertisers to define dimensions and specific criteria associated with each segment and offer, etc.

Once a campaign (and its associated offers) has been created, the OMS transmits the campaign data to each OPS for merging with transaction data and delivery to consumers. According to one embodiment, each OPS, via a predetermined matching algorithm, matches specific consumer financial transactions with offers that satisfy the segment dimensions associated with the offers. According to another embodiment, rather than being matched to specific transactions, offers are matched to consumers' offer-triggering events, such as a pattern or series of transactions that meet a certain set of segment dimensions. After each offer-qualifying transaction or other offer-triggering event has been matched with a respective offer or offers, the offers are displayed to consumers via each consumer's online financial institution portal. Thus, when a consumer logs in to his or her portal, he or she is presented with offers that are targeted to prior transactions or purchases made by the consumer. For example, the offers may be directed at transactions involving competitors of the advertiser that created the respective marketing campaign (although this is not always the case).

In one embodiment, a consumer redeems a targeted marketing offer by making a redemption-qualifying purchase (RQP) using a payment mechanism (e.g., a debit card or credit card) associated with the respective financial institution account to which the offer was originally related. The RQP is subsequently recorded by the financial institution and is transmitted to the OPS associated with that institution. The OPS then examines each received de-identified transaction to determine if it qualifies as an RQP associated with a targeted marketing offer previously presented to and received by the consumer. Once verified as an RQP, the OPS records and stores the instance of the RQP (e.g., within its respective offer redemption table, discussed below) for subsequent processing. For example, the OPS determines the associated reward to be paid to the consumer by converting the reward value of the offer from dollars (as it is typically originally entered by an advertiser within an OMS portal when the offer is created, discussed below) to the appropriate rewards type (e.g., points, miles, etc.) associated with the consumer account that completed the RQP. Subsequently, the OPS provides a visual indication to the consumer in the financial institution portal that the purchase qualified for a redemption based on the previous offer.

At predetermined time intervals (e.g., daily, weekly, monthly) or continuously or on request, each OPS provides notification to its associated financial institution as to the sum of all offer redemption payments (ORPs) to be credited to each consumer's account. The sum of the ORPs associated with each particular targeted marketing offer (TMO) or campaign is determined by each OPS and transmitted to the OMS for storage (e.g., within its campaign results table, discussed below) and subsequent processing. At predetermined time intervals or continuously or on request, advertisers issue payments to financial institutions (e.g., by depositing or transferring funds to the OMS for transmission to each OPS for payment to financial institutions) for reimbursement of the ORPs yielded from their respective TMOs based on rewards issued to consumers. After the completion of a targeted marketing campaign (or during its operation), advertisers are able to view results and performance data associated with the campaign via an OMS portal.

Description of Targeted Marketing System, Components, and Processes

For purposes of example and explanation of the fundamental processes and components of the disclosed systems and methods, reference is made to FIG. 1, which depicts a high-level lifecycle 100 of an exemplary transaction, an associated targeting marketing offer, and redemption of that offer according to one embodiment of a targeted marketing system (TMS) constructed and operated in accordance with various aspects of the claimed invention(s). As will be understood and appreciated, the example lifecycle shown in FIG. 1 represents merely one approach or embodiment of the present system, and other aspects (e.g., delivery and/or redemption of offers based not on singular transactions, but on a series or pattern of transactions) are used according to various embodiments of the present system.

As shown in the lifecycle 100, a process for targeted marketing offer delivery commences with a purchase from or financial transaction with a merchant 101 (e.g., hypothetical advertiser competitor Pizza King) by a consumer 103. As defined elsewhere herein, an "advertiser" describes an entity that creates a targeted marketing campaign associated with its goods and/or services, whereas a "merchant" or "advertiser competitor" is an entity that sells competing and/or related goods and/or services to those of the advertiser. The terms "advertiser", "merchant", and "advertiser competitor" are used herein for purposes of discussion and explanation only, and, as will be understood and appreciated, are not intended to define or limit a particular class of entities. For example, an advertiser may fulfill roles as both an advertiser and a merchant, wherein the advertiser creates marketing campaigns targeted to consumers, and is also the subject of its competitors' marketing campaigns (and vice versa). Thus, for practical purposes, advertisers and merchants are interchangeable. For purposes of discussion and ease of reference, however, advertisers are referred to herein as those that create marketing campaigns, and merchants (or advertiser competitors) are those that provide competing or related goods and/or services to those of advertisers.

In the example shown in FIG. 1, at some point in time, an advertiser (in this example Pizza Pub, not the merchant Pizza King 101) generates a targeted marketing campaign (TMC) associated with its goods and/or services (block 105). In one embodiment, the campaign is created via an OMS advertiser portal within the targeted marketing system (TMS), as described elsewhere herein. Generally, advertisers define campaign specifics, such as the start and end date of a campaign, segments of consumers that the campaign will target (based on physical location of consumer purchases, spend amounts, etc.), specific offer amounts, texts, logos associated with campaign offers, and various other predetermined campaign criteria (discussed in greater detail below).

As shown in block 105, the exemplary campaign has been generated by an advertiser (e.g., "Pizza Pub"), and is scheduled to run between Jun. 1, 2008 and Jun. 30, 2008. Thus, any consumer transactions occurring within those dates may be subject to this specific campaign. The exemplary campaign also defines a particular consumer transaction segment (i.e., transactions occurring in California at advertiser competitor "Pizza King" locations, wherein the transaction is for an amount greater than $25). The representative campaign shown in block 105 also includes an offer to be presented to consumers, wherein a consumer is offered $10 off the price of any purchase of $25 or more at a Pizza Pub in June, and includes the advertiser-defined text: "Pizza Pub voted country's best breadsticks!". As will be understood and appreciated, the campaign criteria shown in block 105 are presented for illustrative purposes only, and are in no way intended to limit the scope of campaign specifics and dimensions available to advertisers for campaign creation.

According to one embodiment, the TMS gathers all advertiser offers centrally, and then displays those offers with corresponding consumer transactions via a consumer's financial institution portal. In one aspect, if a transaction, group of transactions, or other offer-triggering event (OTE) meets the criteria of one of the targeted marketing offers defined in a campaign, then that offer is associated with the transaction, group of transactions, or OTE, and is displayed to a consumer via the consumer's banking portal (assuming there are no competing offers that could also apply to the transaction(s) or OTE, in which case a ranking algorithm may be utilized to determine which offer(s) are displayed). Generally, each campaign includes one or more targeted marketing offers of which each is presented to one or more targeted consumer segments as defined by the advertiser. As will be understood and appreciated, each campaign may include a plurality of segments and offers, depending on the given advertiser's preferences. Further, each offer and segment may include a variety of criteria or dimensions that define the scope of each.

As shown in block 107, a consumer 103 purchases a pizza (or pizza-related items) from a merchant 101 (e.g., Pizza King) of an advertiser (e.g., Pizza Pub). The purchase is represented in block 107, which is a representation of the transaction as shown in the consumer's conventional financial institution portal (i.e., with no offer displayed). The purchase shown in block 107 is a representative offer-qualifying purchase (OQP) 115 (discussed in greater detail below). Generally, the consumer 103 is able to view a plurality of recent, prior transactions or purchases associated with one or more of the consumer's accounts via an interactive and scrollable webpage associated with an online financial institution portal. As shown, the exemplary purchase occurred on Jun. 2, 2008, at Pizza King, and was for the amount of $35.98. This representative and exemplary transaction is referenced throughout this disclosure for discussion purposes.

As will be understood by one of ordinary skill in the art, when a purchase is made by a consumer via some mechanism associated with a consumer account (e.g., credit card, debit card, paper check, etc.), that transaction is recorded by the respective financial institution and made available for online viewing within the consumer's financial institution portal. The portal typically displays a plurality of financial transactions, each transaction including transaction-specific information such as the transaction date, purchase amount, merchant, etc. Thus, while only one transaction is shown in block 107, it will be understood that many transactions are typically displayed in consumer banking portals. Additionally, according to various embodiments of the present system, if a transaction qualifies for receipt of an offer, then the offer will be displayed in relative juxtaposition with the transaction in the consumer's banking portal (as discussed below in association with block 109). Thus, the conventional portal display represented by block 107 is presented for illustrative purposes only.

Still referring to FIG. 1, block 109 is a representation of the consumer's financial institution portal with the targeted marketing offer (TMO) 113 displayed in perceptible association or juxtaposition with the consumer transaction that, in this example, triggered the presentation of the offer, e.g. the offer-qualifying purchase (OQP) 115. In one embodiment of the TMS, transactions are matched with TMOs by a matching algorithm within each offer placement system (OPS) in a manner such that advertisers have no knowledge of specific consumers or their accounts that receive the TMOs (described in greater detail below). As shown in block 109, because the consumer's transaction satisfied the criteria (i.e., the "terms of offer" or "offer terms") defined in the campaign for the specific TMO 113 (i.e., purchase within the start and end date of the campaign, at Pizza King, for an amount greater than $25, etc.), the consumer 103 was presented with the respective TMO. As shown, the TMO 113 indicates that if the consumer 103 makes any purchases (via a payment mechanism associated with the particular financial institution account) at a Pizza Pub (i.e., advertiser) of greater than $25 in the month of June, the consumer will receive $10 off of that purchase.

In an alternate embodiment, rather than displaying a TMO in juxtaposition with a specific transaction, the TMO is displayed as a banner advertisement or pop-up advertisement, or on a separate offer(s) page, or via some other similar display mechanism (see, e.g., FIG. 21). Further, some TMOs are triggered not by a single, specific transaction, but rather by an offer-triggering event (OTE), such as an accumulation of a consumer's transactions over time that satisfy a predefined segment based on average spend amounts at a given merchant or merchant type, or something similar. Accordingly, these TMOs are generally related to a consumer's purchase history or spending habits, and not to particular transactions, and are thus generally displayed in a consumer's financial institution portal.

As will be apparent, the specific and exemplary TMO 113 shown in FIG. 1 is an attempt by the advertiser (i.e., Pizza Pub) to attract consumers from one of its competitors 101 (i.e., Pizza King). Because the consumer 103 made a purchase at a Pizza King previously, the advertiser can infer that the consumer has a propensity to buy pizzas or pizza-related items. Thus, according to one aspect, offers within embodiments of the TMS are highly targeted because they are provided to consumers that already have an interest in the particular type or category of goods and/or services provided by the advertiser, or might be interested in related goods or services to those of a advertiser. As will be understood, however, offers do not have to be targeted to advertiser competitors, but instead could be targeted to consumers who already shop with a given advertiser for purposes of increasing business volume. For example, the advertiser could reward consumers and generate loyalty by offering frequent customers additional incentives to shop with the advertiser. Offers may also be targeted to related product areas that often go hand-in-hand with the advertiser's products or services (e.g., a golf sporting goods store targeting offers to consumers who made purchases at a golf course). Or, offers may be targeted to broad categories, such as consumers who shop at luxury stores, or consumers who rarely buy fast food items, etc. In general, regardless of the form of the offers, they are typically highly relevant because they are targeted based on how a consumer already spends money.

As will be understood and appreciated, a virtually unlimited number of financial institutions may utilize aspects of the present systems and methods. Accordingly, in one embodiment, offer presentation and display is customized to match the overall look and feel of each institution's online banking environment. As shown in block 109, the TMO 113 is presented in perceptible association or operative juxtaposition with the prior transaction to which the TMO was matched (i.e., the offer is presented in relative proximity to its associated transaction). As will be understood, the offer may be displayed according to a variety of presentation forms, such as immediately under the prior transaction (as shown in block 109), indented under the transaction, in a contrasting type, font, or color as compared to the transaction, etc. If the offer is matched not to a single transaction, but to an offer-triggering event (OTE), then the offer may be displayed in a more general display manner (e.g., via a pop-up or banner advertisement), although not necessarily. Regardless, when a consumer 103 logs into his or her portal, he or she will see an offer associated with each transaction or OTE that has criteria matching a potential offer (assuming at least one of the consumer's transactions can be matched to an offer).

In some circumstances, the consumer 103 may be presented with multiple offers corresponding to multiple transactions. In other circumstances, no offers will be presented because the consumer 103 made no recent purchases or satisfied any OTEs that match offer criteria of any potential offers. Additionally, in one embodiment, the presentation of offers complies with guidelines established by each financial institution (e.g., number of offers allowed per display page, format of offers, location of offers, etc.). As will be understood, while the TMO 113 is shown listed in block 109 immediately underneath the corresponding transaction, offers may be presented in any number of ways, such as by pop-up advertisements, listing of offers in a separate section of the financial institution portal display, and via other similar display formats (provided that consumers are able to perceive and subsequently redeem the offers).

Still referring to FIG. 1, according to one embodiment, if a consumer 103 decides to redeem (i.e., accept or respond to) an offer as shown in 109, the consumer is merely required to satisfy the offer criteria, and the TMS instructs the financial institution to credit the offer redemption value (i.e., reward) to the consumer's account or provide the reward to the consumer via some other appropriate reward mechanism. As shown in block 111 of the example lifecycle 100, the consumer made a redemption-qualifying purchase (RQP) 117 at an advertiser location (i.e., Pizza Pub) on Jun. 15, 2008 for $28.93. Because this purchase fell within the advertiser-defined offer criteria (i.e., in June, at a Pizza Pub, greater than $25, etc.), the TMS automatically detected the transaction as an RQP 117, and thus instructed the financial institution to credit the consumer's account accordingly (discussed in greater detail below). Next to the transaction is an RQP icon 119 (shown and discussed in greater detail in conjunction with FIG. 27) indicating to the consumer 103 that he or she redeemed a previously-presented TMO 113, and thus received a reward for the subject purchase.

In one embodiment, when the consumer 103 clicks on the icon 119 via a cursor (i.e., "mouse"), or simply hovers the cursor over the icon (i.e., "mouse over"), or interacts with the icon in some other understood manner, the financial institution portal displays information relating to the reward received by the consumer. As will be understood and appreciated, the reward may be indicated to the consumer 103 in a variety of ways, such as via a separate line item in the financial institution portal, an email notification, etc. Therefore, embodiments of the present TMS are in no way limited to use of an RQP icon 119 to indicate redemption payments or rewards.

As will be appreciated, all participatory parties benefit from use of embodiments of the targeted marketing system. Advertisers are given access to new, online marketing channels with large consumer populations. Embodiments of the targeted marketing system enable advertisers to provide highly-targeted advertisements and offers to consumers based on how those consumers already spend money. Advertisers are also provided with data and reports related to the effectiveness of their offers and advertising campaigns via continually-collected and recorded offer impression and redemption data. Additionally, banks and other financial institutions benefit by being able to offer their customers an additional outlet to accumulate rewards currency in the form in which their account(s) are currently enrolled. Such reward currencies drive customer loyalty and use of specific accounts, increase consumer transactions, and reduce attrition. For example, as consumers redeem offers, they build their rewards (e.g., airline miles, hotel points, cash back, etc.), and thus the consumers are more likely to continue using payment mechanisms (i.e., credit cards, debit cards, etc.) associated with the specific financial institution account. Finally, consumers benefit from embodiments of the present systems and methods because they receive cash and rewards merely by purchasing items they typically already purchase.

Referring now to FIG. 2, a high-level overview 200 is shown of one embodiment of the targeted marketing system (TMS) 215 and its associated environment. As shown, the TMS 215 includes an offer management system (OMS) 211 remotely connected (although the connection does not necessarily have to be remote) to one or more offer placement systems (OPS) 207 via the Internet 209. Generally, the OMS 211 enables creation of targeted marketing campaigns, segments, and offers by advertisers, reporting of marketing data and campaign results to advertisers, transmission of data to and from one or more OPS's 207, and other similar processes described herein. Generally, the OPS 207 enables matching of received campaign data from the OMS 211 with de-identified consumer transaction data received from financial institutions, injecting or merging targeted marketing offers into financial institution portals, organizing and transmitting redemption data to financial institutions for reimbursements to consumers, transmission of data to and from the OMS, and other similar processes described herein. Although the OMS 211 and OPS 207 are represented in FIG. 2 as conceptual boxes, in one embodiment, both the OMS and each OPS comprise system components including one or more databases, memories, servers, computer readable media, processors, algorithms, portals, and other similar components (see FIGS. 29-30 for further description of OMS and OPS hardware).

In the embodiment shown in FIG. 2, in addition to being remotely connected to the OMS 211, the OPS 207 is directly connected to a financial institution system 205 to enable direct and secure communication of information back and forth between the OPS and financial institution, as the OPS is protected behind the financial institution's existing firewall(s). As will be understood and appreciated, the financial institution may be a bank, credit card company, lending institution, savings & loan, prepaid debit company, or other similar financial institution. Additionally, although the embodiment of the TMS 215 shown in FIG. 2 includes only one OPS 207 and one financial institution system 205, other embodiments of the TMS include many OPS's connected to many different financial institutions. Generally, one OMS is capable of servicing a plurality of OPS's at a plurality of financial institutions. Further, according to one aspect, more than one OPS 207 is connected to each financial institution 205. For example, an embodiment of the present system may be constructed such that a different OPS services each different aspect of a financial institution's services (e.g., credit card account, bank account, money market account, stock brokerage needs, web services, transaction processes, etc.), or synchronized OPS's may reside in multiple data centers that serve customers to improve scalability and reliability. For ease of reference, however, the figures and discussion of the present disclosure are primarily directed to an exemplary system comprising only one financial institution 205 and one OPS 207.

Generally, most financial institutions employ a distributed architecture in which different entities within each financial institution may be located at different physical or virtual locations, and perform different services and functions for the overall financial institution system. Thus, the exemplary financial institution 205 shown in FIG. 1 illustrates two components—a financial institution web server 219 and a financial institution transaction processor 220. The functions of the web server 219 generally include, among other things, serving the financial institution portal (and its associated web pages, data, and other content) to consumers 103. The functions of the financial institution transaction processor 220 include, among other things, tracking and storing consumer transactions data for subsequent use. The functions of each of these illustrated components 219 and 220 and their interaction with various OPS components is described in greater detail throughout this disclosure. Additionally, although most financial institutions include at least these two discrete components 219, 220, financial institution systems 205 are referred to generally in various parts of this disclosure for ease of reference.

According to the embodiment shown, all information or data passing between the OMS 211 and the OPS 207 is processed via a reverse proxy 217, typically in conjunction with (but sometimes alternatively to) a demilitarized zone (DMZ), before the data is allowed to proceed (described in greater detail below). In one embodiment, the OPS 207 is directly connected to the financial institution system 205 in a manner such that various components of the OPS operate behind the financial institution firewall(s) and other security protections. Accordingly, in order to preserve the security of the overall system, ensure secure communications (e.g. via SSL), prevent system corruption, and retain consumer privacy, all data and information passing into or out of the OPS is processed within a reverse proxy located on the financial institution's web server 219 or similar equally secure means. Generally, embodiments of the reverse proxy 217 used within aspects of the present system comprise computers and/or processors acting as proxy servers to intercept and inspect all inbound and outbound communications between components on either side of the reverse proxy. When the reverse proxy identifies information being sent to or from the OMS 211 to the OPS 207, the reverse proxy directs the information via the web server 219 to the OPS over the financial institution's internal network. Typically, the reverse proxy 117 (and/or DMZ) checks file types and formats, verifies that certain information or types of information is or is not present in the transmitted data, and performs other operations as described in greater detail below. Generally, each financial institution 205 defines the specifics and protocols associated with its respective reverse proxy 117 and/or DMZ, and thus data transmitted between each OPS 207 and the OMS 211 should comply with these protocols.

As shown in FIG. 2, an advertiser 213 (i.e., Pizza Pub) generates a targeted marketing campaign (TMC) within the OMS 211 via an OMS advertiser portal 900 (see FIG. 9 and its associated discussion for further details regarding the OMS advertiser portal). Before a campaign is created, de-identified consumer transaction data is transmitted from the financial institution's transaction processor 220 to the OPS 207, which stores the data for subsequent use. This data is aggregated by the OPS and accessed by the OMS as needed for campaign generation. The financial or consumer transaction data is de-identified of any consumer- or account-identifying information via an internal financial institution de-identifying process and stored in a de-identified consumer transaction table (see FIG. 17 and its associated discussion). Each financial institution 205 that is connected to and utilizes aspects of the TMS 215 employs its own protocol for removing identifying information from consumer financial transactions. Such identifying information is removed to protect consumer privacy, maintain security, etc. Thus, the transactions data received by each OPS includes a plurality of financial transactions indicating merchants involved in the transactions, merchant types, spend amounts, dates, payment mechanism types, and other similar information. However, the information does not include specific consumer names, account numbers, or other identifying information.

The de-identified financial transaction data is aggregated in the OPS 211, and accessed by the OMS for use in generation of TMCs and associated TMOs 113. Generally, a TMC is an advertising campaign constructed by an advertiser 213, advertising agency, or other entity designed to generate and place advertisements in the form of TMOs and display such TMOs to consumers 103 via the consumers' online financial institution portals. Each TMC typically includes one or more TMOs 113 related to the overall theme of the TMC. As an advertiser 213 creates a campaign and groups consumers into targeted consumer segments (TCS's), the aggregated transaction data provides an accurate estimate as to the number of consumers each TMO will reach based on the most recent de-identified consumer transaction data available across all OPS's in the TMS 215. Thus, the advertiser 213 is able to modify the specifics of each TMO based on the size of the projected consumer segment associated with each offer (discussed in greater detail below).

Typically, the TMOs presented to consumers 103 within embodiments of the present TMS 215 are targeted based on purchases made by each consumer and related information associated with those purchase. When an advertiser 213 creates an offer, the advertiser typically defines a segment of consumers that will receive the offer based on one or more transactions completed by the consumers. For example, an advertiser 213 may target an offer to consumers who spent a certain amount of money at a particular retailer during a given time period in a defined zip code. Advertisers can identify, based on aggregated consumer transaction data, approximately how many consumers the offer will reach. The advertisers, however, are unaware of any specific consumers that actually receive or redeem the presented offers, as the advertisers are never given any specific consumer-identifying information.

Once a campaign, and its associated offers, is finalized by the advertiser 213, the offers are stored in the OMS 211, transmitted to each OPS 207 via each corresponding reverse proxy 217 (and/or DMZ), and then matched with actual consumer transactions or OTEs that satisfy the offer criteria. The resulting matched offers are stored in the corresponding OPS for potential delivery to consumers. As each consumer 103 logs in to his or her specific account(s) via the respective online financial institution portal, the matched offers corresponding to transactions or OTEs are injected or merged into the graphical display of the consumer's financial institution portal, thus transforming the conventional financial institution portal display into one that includes one or more TMOs (described in greater detail below).

In the example overview 200 shown in FIG. 2, a consumer 103 engages in a transaction with a merchant 101 (i.e., advertiser competitor Pizza King). For ease of reference, this transaction corresponds to the exemplary transaction discussed in association with FIG. 1 and in other parts of this disclosure. Because this transaction satisfies one or more offers generated by an advertiser 213 via the OMS 211 (discussed in greater detail below), the transaction qualifies as an offer-qualifying purchase (OQP) 115. As will be understood and appreciated, this transaction may have taken place either before or after the offer to which it will be matched was created. A record of the OQP 115 is transmitted from the merchant 101 to the financial institution (typically, via a payment mechanism processor, such as a credit card reader), and identified and recorded within the financial institution 205 (particularly, within the financial institution transaction processor system 220) in a financial institution database along with numerous other transactions of the respective consumer 103, as well as other consumers and clients of the financial institution. As will be understood and appreciated, in order for the financial institution to identify and record the transaction, the OQP is completed via a payment mechanism associated with one of the consumer's accounts held at the financial institution, such as a credit card, debit card, prepaid card, gift card, paper check, wire transfer, or other similar payment vehicle, and is thus viewable via the consumer's online banking portal.

After the OQP 115 been recorded within the financial institution database, all consumer-identifying information is removed from the OQP (i.e., it is de-identified), it is then transmitted to the OPS 207 for storage in an OPS database and potential matching with TMOs 113. As will be understood by one of ordinary skill in the art, the de-identified transactions may be transmitted to the OPS on a continual basis, or batch processed and transmitted once daily, or transmitted via some other similar recurring transmission method. According to one embodiment, upon receiving the de-identified transactions, the OPS transmits all unidentified "raw" merchant names (i.e., those that cannot be recognized within the OPS's current database) to the OMS 211 in order to be "cleansed," categorized, and validated via a merchant identification process (see FIG. 5 and its associated discussion). Those merchant names that are successfully associated with an existing validated merchant are returned to the respective OPS and subsequently stored within the OPS (e.g., in a validated merchant table, as discussed in association with FIG. 7).

The OPS 207 then performs a matching process between received TMOs and received de-identified transactions to match TMOs to transactions that satisfy the criteria of the TMOs (see FIG. 15 and its associated discussion). After an offer is matched to a particular transaction (or a particular consumer's account), identifiers associated with both the offer and transaction (or account) are then stored in a matched offer table (see FIG. 18 and its associated discussion). According to one aspect, TMOs are matched to OTEs, such as groupings of transactions by a consumer, and such matches are stored in an OPS database. As will be appreciated, some consumer transactions will not satisfy any TMOs, and thus no offer is matched to or displayed with these transactions in the consumer's financial institution portal.

Still referring to the exemplary embodiment of the TMS 215 shown in FIG. 2 and in accordance with aspects of the present systems and methods, when a consumer 103 logs into his or her financial institution portal after the OQP 115 has been matched to an offer, the offer 113 is displayed to the consumer in perceptible association with the OQP. In one embodiment, the TMS 215 utilizes a JavaScript document object model (DOM) injection to inject matched offers into the graphical user interface (GUI) associated with the financial institution portal when the interface is displayed to the consumer (discussed in greater detail below). Using this method, a relatively minimal amount of software code (typically, only a few lines of JavaScript code) are input into the financial institution's online environment (i.e., webpage-rendering software code at web server 219) that operates the financial institution's online portal. When executed, this JavaScript code calls a separate algorithm stored within an OPS 207 that merges the matched offers with their corresponding transactions or OTEs in the rendered financial institution webpage. Although a preferred embodiment of the present system 215 utilizes a DOM injection to perform this merging process, other embodiments are not limited to this particular method, and other similar methods may be used.

It is understood that banks and other financial institutions are typically wary of modifying their systems to add functionality provided by a third party. This wariness stems from concerns about compromising the security of the bank and the effort required to make even minor changes to these complex systems. Thus, by utilizing a DOM injection at the point of display of the portal to the consumer 103, only a minimal amount of code is input into the financial institution's internal code, and advertisers 213 and other system operators of the TMS 215 have no access to the financial institution's code itself (or its data). Further, based on this minimally invasive insertion of a small amount of code into the financial institution's software, aspects of the TMS and financial institution system are able to operate independently of each other. Thus, if a problem occurs within the TMS, then the financial institution is able to operate in its conventional manner until the problem is rectified, and vice versa. Additionally, aspects of the TMS 215 may be updated or modified over time without requiring modification of the financial institution's software, as the TMS code that is written into the financial institution's software is merely a call to a larger code base stored within each OPS 207.

Still referring to FIG. 2, after a consumer 103 views a TMO 113 associated with the consumer's OQP 115, the consumer may elect to redeem the TMO according to the TMO specifics. As shown, the consumer 103 redeems the TMO 113 with the advertiser via a redemption qualifying purchase (RQP) 117. The RQP, in this example, is a payment of $28.93 at an advertiser (i.e., Pizza Pub) location. For ease of reference, this RQP 117 corresponds to the exemplary RQP shown and discussed previously in conjunction with FIG. 1, and in other parts of this disclosure. A record of the RQP is transmitted to the financial institution 205 in much the same manner as the record of the OQP 115. Again, the financial institution records the OQP and transmits it to the OPS 207. In one embodiment, the OPS 207 then performs a redemption process to determine if the transaction completed by the consumer 103 satisfies any of the redemption criteria of the TMO(s) previously presented to the consumer (i.e., whether the transaction is in fact an OQP) (see FIG. 23 and its associated discussion for further details on this process).

If the consumer's transaction qualifies as a RQP 117 as stipulated by the TMO, then the OPS records the instance of that RQP within its respective offer redemption table and simultaneously calculates the type and amount of reward (i.e., ORP 225) earned by the consumer. In the presented example, the account to which the consumer's RQP was charged had been associated with a "cash back" rewards program (as shown subsequently in this disclosure), and thus no further conversion is needed (as the advertiser had entered the reward value of TMO(s) in dollars). In the event an ORP requires conversion from cash into another type of reward (e.g., airline miles, points, etc.), the conversion is performed within the OPS based on each financial institution's specific conversion rate(s) for the account associated with the RQP. According to one embodiment, several transactions or a series of transactions must be completed by a consumer in order to qualify as an RQP (e.g., if an offer dictates three purchases at a particular advertiser must be made in a given time period). Or, in some embodiments, the reward is paid out over an extended time period (e.g., several months) if a consumer continues to make a particular type of purchase or stay enrolled in a particular club or program (e.g., a movie rental membership). In one embodiment, the consumer 103 is notified of the ORP via an icon 119, message, or some other indicator evidencing that an offer has been successfully redeemed (see FIG. 27 and its associated discussions for further details).

According to one aspect of the TMS 215, financial institutions 205 are reimbursed directly by advertisers via the TMS for the value of all rewards paid to consumers 103. For example, advertiser may have pre-funded accounts within the TMS that are used to reimburse financial institutions for ORPs 225. Or, in some embodiments, the TMS includes a general fund that is used to pay financial institutions, which is in turn compensated by advertisers 213 after the payments to consumers have been made. Additionally, in one embodiment, advertisers pay the operator or operating entity of the TMS for the ability to create and deliver TMCs and subsequent TMOs to consumers (i.e., not just for reimbursement of reward value, but for privilege to use TMS functionality).

As will be understood and appreciated, advertiser creation of campaigns, segments, and offers, consumer redemption of those offers, transmission of data between the OMS 211, each OPS 207, and each financial institution 205, and other processes of embodiments of the TMS 215 shown and described in conjunction with FIG. 2, occur on a continual and ongoing basis. Further, over time, offer redemptions and/or impressions are tracked and recorded by each OPS 207, and this data is transmitted (preferably, in aggregation) to the OMS 211 for reporting to advertisers 213. In this way, advertisers are able to determine the relative effectiveness of their campaigns, manage their return on investments (ROI), and adjust future campaigns and advertisements based on performance of previous campaigns and offers.

Additionally, in one embodiment, a system operator or manager has access to all TMS 215 components, and controls and manages overall TMS operations. The system manager accesses the system via a management portal 2915 (see FIG. 29) to perform maintenance on the system, update or make changes to the system, and complete other management tasks.

Referring now to FIG. 3, the system architecture 300 for one embodiment of the disclosed targeted marketing system (TMS) 215 is shown. As shown, the architecture 300 includes the OMS 211, at least one OPS 207, databases 305, 307, a plurality of firewalls 330, at least one reverse proxy 217 and the Internet 209. Additionally, the overall system architecture 300 includes connections to one or more financial institutions 205 (including the institution's internal transaction processor(s) 220 and web server(s) 219) and each institution's associated database(s) 309. As will be understood, although only one OPS 207 and one financial institution 205 are shown in the embodiment of FIG. 3, other embodiments include a plurality of OPS's 207 and a plurality of financial institutions 205. Further, as will be appreciated, although only one database is shown each for the OMS, OPS, and the financial institution, embodiments of the present TMS 215 utilize many databases to store system information as needed. In one embodiment, more than one OMS 211 is utilized to perform the campaign creation and management functions of the system. Aspects of the internal hardware components associated with each OMS and OPS are shown and discussed in conjunction with FIGS. 29-30.

According to a preferred embodiment, the OMS 211, OPS 207, and financial institution 205, and their respective components, communicate with each other via a conventional service-oriented architecture (SOA). Generally, a service-oriented architecture is an information technology infrastructure that allows different applications to exchange data with one another. Typically, a SOA separates functions into distinct units or services, which are made accessible over a network (such as the Internet), such that users of the system can combine and reuse them as desired. As will be understood, the communication protocol between the system components shown in FIG. 3 may vary depending upon each financial institution's preferred communication technique, and other similar file transfer mechanisms may be used according to embodiments of the present system.

In the embodiment shown in FIG. 3, the internal components (i.e., processor(s), memory(ies), etc.) of the OMS and OPS are represented by blocks 211 and 207, respectively (see FIGS. 29-30 for more detailed representations). Also included as part of the OMS and OPS are OMS database 305 and OPS database 307, respectively. The OMS database 305 stores data and other information used in the generation of targeted marketing campaigns (TMCs), analysis of campaign performance, and other similar OMS processes. In one embodiment, the OMS database 305 includes a campaign table 1100, segment table 1200, and offer table 1300 (described in greater detail below) for storing campaign- and advertising-related data (collectively referred to as "campaign data" 315). Preferably, the OMS database also includes a local instance of campaign results data 301 (discussed below), such as that shown in a campaign results table 2600. In one embodiment, the OMS database also includes a merchant identification table 600 for storing data and information used in the cleansing and categorization of merchant names.

The OPS database 307 stores data and other information used in matching TMOs to transactions or offer-triggering events (OTEs), displaying such TMOs to consumers, recording redemptions of TMOs, and other similar OPS processes. In one embodiment, the OPS database 307 includes a de-identified consumer transaction table 1700, matched offer table 1800, and campaign results data 301 (represented by the offer impression table 2400 and offer redemption table 2500 (described in greater detail below)) for storing data relating to matched transactions and offers, redeemed offers, etc. According to one embodiment, the OPS database also includes a validated merchant table 700 which effectively serves as a repository for data required to match "raw" merchant names originating from a payment mechanism processor (e.g., credit card reader) to validated (i.e., "normalized") merchant names suitable for matching offers and redemptions (discussed in greater detail below).

Additionally, within the financial institution 205 is at least one financial institution database 309 for storing consumer transaction information. In one embodiment, the financial institution database 309 includes a master consumer transactions table 1600 for storing all consumer transactions recorded within the financial institution. Additionally, in one embodiment, the financial institution database stores an instance of de-identified consumer transaction table 1700 (not shown) for subsequent transmission to the OPS. As will be understood and appreciated by one of ordinary skill in the art, consumer transactions that have not been de-identified (i.e., those in transactions table 1600) remain within the financial institution database, and are unavailable to components of the TMS. As will be further understood, embodiments of the present TMS 215 are not limited to the specific tables mentioned in association with the databases 305, 307, 309, as other tables and data necessary for successful operation of the TMS as will occur to one of ordinary skill in the art are included as well.

As will be understood and appreciated, the various components of aspects of the TMS (i.e., the OMS 211 and each OPS 207) and each financial institution 205 must share data in order to carry out their respective functions. However, different protocols exist for sharing data depending on the data type. Importantly, even though it is stripped of consumer-identifying information, de-identified consumer transaction data never leaves the OPS (for purposes of regulatory compliance and consumer privacy concerns). Thus, when the OMS requires consumer transaction data for campaign generation, the OMS makes a query into the OPS, and the OPS returns an aggregated total of consumers and/or transactions associated with the particular request. For example, as an advertiser creates a particular segment, the OMS requests from the OPS the total number of consumers or transactions that satisfy the segment, and the OPS returns such an aggregated total (and, in one embodiment, the aggregated purchase histories of the consumers at a merchant or merchant group associated with the segment). However, no specific de-identified transactions ever leave the OPS. For other, less sensitive types of data, similar access calls are made between system components. Or, according to another embodiment, although data tables may be generated and stored within one system component (e.g., campaign data 315 is typically generated within the OMS), instances of the data tables are transmitted to other system components as needed and cached locally for subsequent use (i.e., "master" v. "local" tables). Again, however, de-identified consumer transaction data is retained within the OPS behind the financial institution's security components.

As shown in FIG. 3, communications between the OMS 211 and OPS 207 pass through one or more firewalls 330, as well as reverse proxy 217. Generally, each firewall is an integrated collection of security measures designed to prevent unauthorized electronic access to its associated, networked computer system. Depending on the particular financial institution 205, each firewall is a dedicated appliance or software that inspects network traffic passing through it and denies or permits access to network components based on a set of predefined rules. Often, based on heightened security measures typically associated with financial institutions 205, each institution has multiple firewalls, and various distributed components within the institution are located behind varying levels of security (discussed below). In one embodiment, the OMS 211 also includes a firewall 330*a* to inspect data and information passed to and from it over the Internet 209. As will be understood, each firewall is configured according to financial institution or system administrator protocols.

According to the embodiment shown, both the financial institution 205 and the OPS 207 utilize distributed architectures with disparate components residing behind varying firewalls 330*b-c* (i.e., security levels) for performing functions that require varying levels of security. As shown, an initial firewall 330*b* separates the Internet 209 (and, thus, external components, such as the OMS 211) from the financial institution web server 219, the OPS application components 207, and the reverse proxy 217. The area including these components is generally referred to as a demilitarized zone (DMZ) (also referred to as a "demarcation zone" or "perimeter network"), which is defined elsewhere herein. Some embodiments of the present system utilize a DMZ in addition to or in lieu of a reverse proxy to provide additional or alternate security measures. The financial institution web server 219 and OPS sever 207 that reside in the DMZ generally perform the functions of serving web page content to consumers 103, injecting offers into the served web pages, and other similar functions. Behind a second firewall 330*c* with enhanced security measures reside the financial institution transaction processor 220, financial institution database 309, and OPS database 307. Generally, these components are included behind an additional security layer because they store sensitive consumer information and conduct secure processes, such as matching offers to consumer transaction data, etc. As will be understood, the architecture shown in FIG. 3 is exemplary only, and various financial institutions 205 employ varying architectures and security measures depending on the institution's preferences.

According to a preferred embodiment, in addition to one or more firewalls, a reverse proxy 217 is utilized to provide an extra layer of security to each financial institution's local area network (LAN). In one embodiment, the reverse proxy 217 comprises computers and/or processors acting as proxy servers to intercept and inspect all inbound and outbound communications between components on either side of the reverse proxy (in this case, the OPS 207 (in conjunction with the financial institution 205) and the OMS 211). In the embodiment shown, the OPS 207 operates behind both the reverse proxy and the financial institution firewall(s), such that the financial institution and the OPS have a direct communication link (ad described above). In this manner, any information or data passing into or out of the OPS (specifically, from the OMS) is subject to the same layers of protection and security as required by the financial institution. Because of these security components present between the OPS 207 and the OMS 211 (and Internet 209, etc.), embodiments of the TMS 215 are able to operate in compliance with financial institution regulatory guidelines.

Offer Management System (OMS)

As described previously, embodiments of the offer management system (OMS) 211 enable advertiser creation of targeted marketing campaigns (TMCs), targeted consumer segments (TCS's), and targeted marketing offers (TMOs), cleansing, categorization, and validation of unidentified merchant names, reporting of marketing data and campaign results to advertisers, transmission of data to and from one or more offer placement systems (OPS's), and other similar processes. Because TMCs are created via the OMS and then transmitted to individual OPS's installed at separate financial institutions, advertisers are able to create TMCs that are presented across a plurality of financial institutions. Further, because each OPS matches the TMCs to consumer transactions within each financial institution, advertisers are able to market and advertise to consumers based on actual consumer purchase behavior without compromising the privacy or security of the consumer's transaction data. Details and specific functionality associated with the OMS and its processes will now be further described.

FIG. 4 is a flowchart 400 illustrating the overall processes and functions performed by the OMS 211 according to one embodiment of the present TMS 215. As will be understood and appreciated, the steps of the process 400 shown in FIG. 4 are not necessarily completed in the order shown, and the processes of the OMS operate concurrently and continuously. Accordingly, the steps shown in FIG. 4 are generally asynchronous and independent, computer-implemented, tied to a particular machine (the OMS 211 of a TMS 215), and not necessarily performed in the order shown. As shown, one of the OMS processes includes the campaign generation process 1000 to generate targeted marketing campaigns, whereby campaigns are created based on advertiser-entered campaign specifics (described in greater detail below in conjunction with FIGS. 8 and 10). During the process 1000, in response to advertiser creation of targeted consumer segments, the OMS requests segment population totals (i.e., the number of consumers associated with a particular advertiser-defined segment based on de-identified consumer transactions) from each OPS 207 to assist advertisers in campaign creation (step 401). Once received by the OMS, the population totals are aggregated to provide a sum of all consumers (and their associated transactions) eligible to receive a TMO associated with a segment or segments to help advertisers determine the scope of their campaigns (step 403).

Although the segment population request step 401 and segment population receipt step 403 are shown in FIG. 4 as associated with the OMS process 400, such steps may also be viewed as being a part of the campaign generation process 1000, but are shown and described in FIG. 4 in connection with the operations of the OMS for ease of understanding and clarity.

Other processes associated with generation of campaigns is described in greater detail below. After a campaign has been created, the campaign data 315 (including campaign, segment, and offer information) is transmitted to each OPS 207 via one or more reverse proxies 217 for further processing and display to consumers 103 (step 405).

After a TMC's completion (or during its operation), an advertiser may desire to view and analyze results of the campaign (e.g., number of consumers that have viewed offers associated with the TMC, number of offers redeemed, specific competitor locations of redeemed offers, etc.). Thus, in response to an advertiser query, the OMS requests campaign results data from each OPS (step 407). Upon receiving the request, embodiments of each OPS 207 will collect and transmit aggregated campaign results data 301 to the OMS 211 for advertiser review (step 409). In one embodiment, the campaign results data is displayed to advertisers via an OMS advertiser portal 900 in the form of statistics, graphs, charts, percentages, or other similar conventional reporting formats (discussed in greater detail below).

Also included in the overall OMS processes 400 is the merchant identification process 500, in which unidentified merchant names are analyzed and identified (if possible) for subsequent use (described in greater detail below in conjunction with FIG. 5). Based on local card processing systems, naming conventions, and other factors, merchant names associated with consumer transactions are often sent from merchants to a given financial institution (and subsequently to an associated OPS) in several different formats, even though each represents (and is associated with) the same merchant. For example, prior to being "cleansed" within the OMS 211, hypothetical merchant 101 Pizza King may be represented as "PK #29483", "Pizza K", "P. King Inc", and/or numerous other variations within the transaction data received by the financial institution 205 (and eventually sent to its OPS('s) 207). Accordingly, in order for the present system to recognize name variations as corresponding to a single merchant entity for purposes of matching consumer transactions to offers, initiating payment of redemptions based on RQPs, and other processes as described herein, each name should preferably be identified and categorized according to an existing, validated merchant name.

FIG. 5 is a flowchart of an embodiment of a computer-implemented merchant identification process 500 carried out by a particular machine (e.g. OMS 211) for identifying and "cleansing" (i.e., normalizing) unidentified merchant names received from an OPS 207. As mentioned, because merchant names in transaction data may comprise a variety of formats, even though the names all represent or are associated with a single merchant 101, the names should be identified and linked to that merchant for a variety of purposes (described above). For many merchant names associated with consumer transactions, an OPS is able to clearly identify the merchant associated with a given name (e.g., because the particular name format corresponds to a previously-identified name from previous transactions), and thus the name is never transferred to the OMS for identification. For others, however, the merchant name must be identified before further transaction processing, matching, etc., can occur.

Starting at step 501, a request for unidentified merchant names is transmitted from the OMS 211 to one or more OPS's 207. At step 503, the OMS verifies whether any unidentified merchant data was received from an OPS. If unidentified merchant data was received, then such data is stored within the OMS database 305 or in an OMS local memory, and a predetermined merchant identification algorithm is performed utilizing the received data to identify corresponding merchant names (described below) (step 505). If no merchant data (i.e., names) is received, then the OMS again requests data from the OPS (step 501). As will be understood, steps 501 and 503 are performed on a looping basis to continually request or check for incoming merchant name data. In alternative embodiments, the OMS requests data from the OPS periodically (e.g., hourly, daily, etc.), or at the specific request of a system operator, or via some other protocol as will occur to one of ordinary skill in the art. In a further embodiment, rather than a request for unidentified merchant names being transmitted from the OMS to an OPS, the OPS automatically transmits unidentified merchant names to the OMS as discovered within transaction data.

Once the requested unidentified merchant names are received, a predetermined merchant identification algorithm interprets data fields (i.e., cleanses or "scrubs" the data) within the names in order to effectively identify the merchant associated with each merchant name (step 505). According to one embodiment, the predetermined algorithm first removes all non-alphabetic data from the unidentified merchant name before then comparing the result against a stored list of previously-validated merchant names. According to various embodiments, the stored list comprises predefined names entered by a system operator as corresponding to particular merchants, names that were previously validated via the merchant identification process 500, common variants or patterns in name formats recognized across all unidentified merchant names, and/or other names as will occur to one having ordinary skill in the art. Based on the comparison to the stored list, each unidentified merchant name is assigned an identity assurance score or rating relative to a valid merchant name to which it is most likely associated. Generally, the identity assurance rating comprises a percentage-based measure of the likelihood that a given unidentified merchant name is associated with an existing valid merchant name. As will be understood, the identity assurance rating for a given unidentified merchant name can be calculated according to a number of factors, such as the percentage of alphabetic characters that match a name on the stored list of names, or based on particular word matches or ordering of characters, etc. After an identity assurance score is calculated for each unidentified merchant name, each name is stored in a merchant identification table 600 for further processing (discussed in greater detail below in conjunction with FIGS. 6 and 7).

Once an unidentified merchant name receives an identity assurance score, the name is classified as either "validated" (i.e., identified or recognized) or "un-validated" based on the assurance score. According to one embodiment, a system operator defines a threshold assurance score (e.g., 80%, 90%, 100%, etc.) that must be met in order to classify a merchant name as "validated." At step 507, the process 500 determines whether a given merchant name was identified (i.e., validated) or not. Generally, unidentified merchant names receiving an identity assurance score above the predefined threshold are deemed to have an association with an existing valid merchant name, and thus require no further identification efforts (i.e., they are deemed "validated"). If an unidentified merchant name receives an identity assurance score below the predefined threshold, an optional manual identification process is typically initiated (step 509). In some embodiments, however, rather than manually identifying merchant names, the unidentified names are simply discarded, and the transactions associated with those names are made unavailable for offer matching and other functions.

Still referring to FIG. 5, one embodiment of the manual identification process comprises manual review by a system operator of each unidentified merchant name, whereby the operator makes a "best guess" to either classify the name according to a known (i.e., validated) merchant name, or label it as "un-validated." In another embodiment, the manual identification process comprises an electronic search according to a predetermined algorithm of existing and readily available resources (e.g., online databases or Internet search) in an attempt to effectively identify the merchant name. If, through the manual identification process, an unidentified merchant name is successfully identified, the merchant name is given "validated" status. If a name cannot be identified via the manual process, then the name is discarded, and the transactions associated with the name are made unavailable for matching and other functions.

Upon completion of both the predetermined and manual identification processes (steps 505 and 509), the now validated merchant names are stored within a validated merchant table 700 in the OMS database (step 511) (discussed in greater detail below in conjunction with FIG. 7). According to one embodiment, only validated merchant names stored within the validated merchant table 700 are transmitted to each OPS for subsequent processing (step 513).

FIG. 6 is an exemplary merchant identification table 600 illustrating data associated with unidentified merchant names utilized or generated during the merchant identification process 500. FIG. 7 is an exemplary validated merchant table 700 illustrating data associated with validated merchant names. In the embodiment shown, tables 600 and 700 include identical data categories or fields, except that table 700 includes only merchant names that were officially validated via the merchant identification process 500 (e.g., because their identity assurance score exceeded a predetermined threshold). As will be understood by one having ordinary skill in the art, tables 600, 700 are presented for illustrative purposes only, and embodiments of the present system 215 are not limited to use of the specific data tables shown.

As shown, the tables 600, 700 each include six data categories or fields: unidentified merchant key 601, unidentified merchant name 603, validated merchant key 605, validated merchant name 607, merchant category 609, and identity assurance rating 611. As will be understood, however, the data categories or fields are not limited to the fields shown, and other embodiments include additional fields as will occur to one of ordinary skill in the art. As will also be understood, although only five data entries are shown in table 600 (i.e., entries corresponding to unidentified merchant keys 349, 103, 184, etc.), and three data fields are shown in table 700 (i.e., entries corresponding to unidentified merchant keys 349, 785, 293), actual data tables constructed in accordance with aspects of the present system may include a virtually unlimited number of entries corresponding to a plurality of merchant names processed by embodiments of the present TMS 215.

As shown, the unidentified merchant key field 601 indicates a unique identifier generated by an embodiment of the TMS 215 and assigned to each unidentified merchant name received from an OPS (i.e., previously extracted from consumer transaction data). Although the unidentified merchant keys are illustrated as 3-digit numbers, it will be appreciated that these unique identifiers may comprise many formats, including number strings of longer length, hexadecimal identifiers, binary identifiers, and the like. The unidentified merchant name field 603 indicates the specific merchant name extracted from a given consumer transaction. The validated merchant key field 605 indicates an identifier that corresponds to a validated merchant name (shown in field 607) to which the unidentified merchant name is likely associated (based on the identification process 500). For example, exemplary unidentified merchant keys 103 and 184 correspond to unidentified merchant names "SKATE ESCP" and "S ESCAPE HOUSTON", respectively. Based on the merchant identification process, the system has determined that both of these entries likely represent merchant "SKATE ESCAPE", which has validated merchant key 23. Similarly to the unidentified merchant keys, the validated merchant keys may comprise many formats, and are not limited to the specific 2-digit format shown.

Still referring to FIGS. 6 and 7, the merchant category field 609 indicates the category or categories assigned to each validated merchant name. As described herein, merchant category information is used primarily for purposes of defining targeted consumer segments, although other uses are possible. According to one embodiment, each validated merchant name is associated with only one merchant category. In alternate embodiments, however, merchants are associated with a plurality of categories as apply to their particular businesses. Generally, merchants are categorized according to conventional industry codes as defined by a selected external source (e.g., a merchant category code (MCC), Hoovers™, the North American Industry Classification System (NAICS), etc.). However, in one embodiment, merchant categories are assigned based on system operator preferences, or some other similar categorization process.

The identity assurance rating field 611 indicates the identity assurance score calculated for each unidentified merchant name (as described previously in conjunction with FIG. 5). As shown, the entries corresponding to unidentified merchant keys 103 and 184 are not included in table 700, indicating that their respective identity assurance ratings (90% and 70%, respectively) were below the predefined threshold for the shown embodiment. Thus, the transactions associated with those unidentified merchant names will be unavailable for subsequent OPS processes. Representative merchant name entry 613 corresponds to the Pizza Pub/Pizza King example referenced in other parts of this disclosure.

Referring now to FIG. 8, a flowchart is shown illustrating a campaign generation process 800 from the perspective of an advertiser 213 according to an embodiment of the present targeted marketing system 215. Such steps are generally computer-implemented, and tied to the operations of a particular machine (OMS 211), but are herein described from the perspective of the advertiser to enable a person skilled in the art of computer programming to construct a suitable computer-implemented user interface. Generally, a campaign comprises one or more targeted marketing offers which can be delivered to one or more targeted consumer segments. In one embodiment, however, rather than creating an overarching campaign, an advertiser simply creates a singular offer for delivery to consumers (discussed in greater detail below). Additionally, the process 800 shown in FIG. 8 merely represents one path to creating and/or editing campaigns, segments, and offers, and other paths are possible within embodiments of the present system (e.g., defining offer specifics before or simultaneously with campaign specifics).

As shown in FIG. 8, at step 801, an advertiser 213 logs into the OMS advertiser portal 900 to begin creation of a campaign. FIG. 9 illustrates an exemplary OMS advertiser portal 900 that is displayed to an advertiser during the operations of the campaign generation process 800 in accordance with aspects of the claimed invention(s). As will be understood and appreciated, the person that physically creates the campaign may be an employee of the advertiser (e.g., a member of the marketing team), or a member of an advertisement agency, or some other third party with authorization to create campaigns on behalf of the advertiser. At step 803, the advertiser 213 decides whether he or she is creating a new campaign, or accessing and editing a preexisting (prestored) campaign. If it is a new campaign, the advertiser defines the campaign specifics (e.g., the name of the campaign, the start and end date of the campaign, etc.) (step 807). If, however, the advertiser is accessing a preexisting (prestored) campaign, then the advertiser selects the particular campaign from a list of the advertiser's stored campaigns via the OMS advertiser portal 900 (step 805). Once selected, the advertiser 213 either confirms the preexisting campaign specifics, or edits the specifics and saves (stores) the changes to the campaign (step 807). Exemplary campaign data is illustrated in table 1100 shown in FIG. 11.

After a campaign has been created or accessed, the advertiser 213 decides whether he or she wishes to create a new consumer segment, or access a preexisting (prestored) segment associated with the campaign (step 809). Generally, a segment defines a particular group of consumers 103 that will receive offers based on the transactions completed by the consumers. Regardless of whether an advertiser 213 creates a new segment, or accesses a preexisting segment from a list of stored segments (step 811), the advertiser defines the segment by a dimension (again, via the OMS advertiser portal 900) (step 813). If it is a preexisting segment, the advertiser may simply confirm the dimension or dimensions associated with the segment.

As defined previously herein, a "dimension" refers to a delineating category that serves to narrow the population of consumers that may receive an offer associated with the segment based on criteria associated with specific consumer transactions. Examples of dimensions include the location of the transaction (e.g., zip code(s), city(ies), etc.), the merchant (e.g., Pizza King) or merchant type (e.g., restaurants) with which the transaction was completed, the amount spent, the specific category of items purchased, the payment mechanism associated with the transaction, etc. According to one embodiment, segments (and their associated dimensions) are used to identify and target consumers based not on specific consumer transactions, but on patterns and trends associated with transactions over time (e.g., consumers with high volumes of transactions at health food stores). After the advertiser has defined the segment by at least one dimension, the advertiser is queried as to whether he or she wishes to further define the segment (step 815). If so, steps 813 and 815 are repeated until the segment has been completely defined to the advertiser's satisfaction. If not, the segment is saved (stored), and the advertiser 213 moves forward in the campaign generation process 800. Exemplary segment data is illustrated in table 1200 shown in FIG. 12.

Still referring to FIG. 8, once at least one segment has been defined or accessed by an advertiser 213, the advertiser either creates a new offer associated with the segment, or accesses a preexisting (prestored) offer from a list of stored offers (step 817) and assigns it to a respective segment. Typically, a TMO 113 defines an offer for a reward if the consumer 103 completes some subsequent, redemption-qualifying purchase (RQP) 117 or series of purchases with the advertiser 213. For example, an offer may dictate that the consumer will receive $10 off any purchase over $25 made at an advertiser location in the month of June. Often, the offer may include an advertiser logo or advertising statement, such as "Pizza Pub voted country's best breadsticks!". In one embodiment, however, rather than an offer in which consumers are offered a reward for completing a RQP 117, the offer is purely an advertisement for the advertiser 213 (i.e., the "offer" does not necessarily have to include an associated consumer reward). For example, the offer may simply comprise the statement: "Pizza Pub voted country's best breadsticks!", with no corresponding reward offer. As will be understood and appreciated, a plurality of offer specifics (i.e., offer defining information) may be defined by advertisers 213 according to embodiments of the present TMS 215.

Regardless of the offer specifics, these specifics are defined at step 821. If a preexisting offer was selected (step 819), the advertiser 213 either confirms or edits preexisting specifics, or defines new specifics. After at least one offer specific has been defined, the advertiser is queried as to whether he or she wishes to further define the offer 113 (step 823). If so, steps 821 and 823 are repeated until the offer has been completely defined to the advertiser's satisfaction. If not, the offer is saved (stored), and the advertiser moves forward in the campaign creation process 800. Exemplary offer data is illustrated in table 1300 shown in FIG. 13.

At step 825, the advertiser 213 decides whether he or she wishes to "publish" the campaign. If not, the campaign creation process 800 is ended, and the generated campaign is stored for subsequent use. If, however, the advertiser does choose to publish the campaign, then the publish process is initiated 827. Generally, the publication process is initiated once the advertiser is completely satisfied with the campaign and its associated offer(s), and is ready to deliver the offers to consumers 103. In one embodiment, the publish process comprises transmitting the finalized campaign, segment, and offer data to each OPS 207, wherein the data is analyzed and verified by each financial institution 205 and/or a system operator according to each institution's protocols. Essentially, the offers are screened to ensure that they comply with the financial institution's specifications (e.g., the formatting is compliant, they do not contain explicit or offending material, etc.), as well as advertising regulations and practices. Once the financial institution is satisfied with the content and format of the campaign, the associated offers are matched to qualifying transactions and delivered to consumers (described in greater detail below). According to one aspect, an advertiser 213 may elect to create and store several offers associated with a campaign, and then publish the campaign (and its associated offers) all at once. In another aspect, offers are published individually.

Another aspect of embodiments of the campaign generation process 800 is the "dynamic resegmentation" process (not shown). As used herein, "dynamic resegmentation" refers to the process of automatically delivering follow-up TMOs to consumers that redeem original or initial TMOs. In one embodiment, during the campaign generation process 800, after offers have been defined, advertisers have the option to define a follow-up offer that is automatically presented to a consumer that redeems an initial offer. The typical goal, from the advertiser's perspective, is to entice the consumer to purchase the advertiser's goods and/or services more than once in the hopes of obtaining the consumer as a repeat and loyal customer.

As mentioned previously, in one embodiment, campaigns, segments, and offers are created within the OMS 211 via an OMS advertiser portal 900. FIG. 9 illustrates an exemplary screen shot of a graphical user interface (GUI) associated with an embodiment of the OMS advertiser portal 900. Through this portal, advertisers 213 perform the functions of campaign, segment, and offer creation, campaign management, campaign reporting and analysis, billing, and other similar OMS processes. As will be understood and appreciated, the GUI shown in FIG. 9 is presented for illustrative purposes only, and other formats and displays of GUIs are used in other embodiments of the present TMS 215.

The portal display 900 shown in FIG. 9 is a representative display for and on behalf of hypothetical advertiser, Pizza Pub, a user of the TMS 215. As shown, the portal display includes a "Campaign Menu" section or display region 903, a "My Campaigns" section 905, a "Manage Segments" section 907, a "Manage Offers" section 921, and an estimated population display section 901. As will be understood and appreciated, other sections and fields in addition to those specifically listed and shown in FIG. 9 are possible according to other embodiments of the present system.

As shown, the "Campaign Menu" section 903 is a conventional GUI menu that enables management of TMCs and basic campaign-related functions, such as creating new TMCs, editing existing TMCs, saving and discarding TMCs, and retrieving help or support information. The "My Campaigns" section 905 illustrates folders including the advertiser's stored campaigns from each month. As will be understood, campaigns may be listed according to date, merchant or competitor name, merchant or advertiser category, etc., and are not limited to display according to the month or months to which the campaigns pertain (as shown in FIG. 9). In the embodiment shown, the "My Campaigns" section 905 comprises a conventional hierarchical display, wherein a representative campaign (i.e., "Pizza King") is shown as selected. As will be appreciated, TMCs are named according to each advertiser's preferences, typically based on the overall theme of the campaign. For example, the illustrative campaign is targeted to customers of advertiser competitor 101 Pizza King, and thus the campaign has been named "Pizza King". Because this particular campaign has been selected from the advertiser's library of campaigns, the TCS's and TMOs illustrated in the "Manage Segments" and "Manage Offers" sections 907, 921, respectively, coincide with the selected "Pizza King" campaign.

Although not shown, each campaign generally includes a start date and end date. In one embodiment, campaign delimiting information such as a campaign name, start date, end date, etc., are defined via conventional data entry fields within the OMS advertiser portal (not shown). The start and end date associated with a campaign typically defines when a campaign runs (i.e., when transactions are monitored to determine satisfaction of segment and offer specifics, discussed below), but other significance may be assigned to the start and end dates, as will occur to one having ordinary skill in the art.

In the embodiment shown, the "Manage Segments" section 907 is the interface in the portal display 900 through which TCS's are created and/or edited. As will be understood, the representative dimensions 911, 913, 915 are presented merely for illustrative purposes, and embodiments of the TMS 215 are not limited to the specific dimensions shown. In "Segment Name" field 909, an advertiser defines a name for a new segment, or accesses the system to retrieve a previously-created segment from a drop down menu associated with field 909. For example, the name of the selected segment shown in FIG. 9 is "Pizza King (CA)", likely indicating a segment targeted to consumers of Pizza King stores in California. In the "Location(s)" field 911, the advertiser defines the location of consumers (and specifically, consumer transactions) to which TMOs will be targeted. In one embodiment, the "Location(s)" field 911 defines the physical location in which consumer transactions occurred. In another embodiment, however, the "Location(s)" field defines the location of the billing address associated with a consumer account held at a financial institution 205. As will be understood, the "Location(s)" dimension, as well as all other dimensions, may be defined according to advertiser and/or system operator preferences. Additionally, in various embodiments, locations are represented by zip or postal codes, cities, states, and other similar geographical indicia.

Still referring to FIG. 9, in the "Merchant(s)" field 913, the advertiser identifies the merchant or advertiser competitor(s) 101 with which transactions or purchases were (or will be) completed. In one embodiment, specific merchants are identified via a pre-populated list in the "Merchant(s)" field 913. In other embodiments, however, general business categories are defined (e.g., retail, home repair, entertainment, sporting goods stores, etc.). In the "Spend Amount" field 915, a minimum amount is defined that a consumer 103 must have spent in order to qualify for and receive a TMO associated with the defined segment. According to one embodiment, the spend amount applies only to a single consumer transaction. In another embodiment, however, the spend amount is an aggregated total of a particular consumer's transactions over a given time period that satisfy the other, defined dimensions associated with the segment.

As mentioned, the specific dimensions shown (911, 913, 915) are presented for illustrative purposes only, and other similar dimensions, such as specific items purchased, overall number of transactions completed by each consumer, average number of transactions completed by each consumer in a given time period, payment mechanism used, types of merchants (e.g., luxury, discount, health and beauty, etc.) either shopped or not shopped during a given time period, etc., are utilized according to various embodiments of the present TMS 215. Additionally, according to one aspect, segments are defined that include as few as one dimension. For example, an advertiser 213 may elect to deliver TMOs to all consumers 103 that engage in transactions with a particular merchant 101, regardless of the location of the transaction, the spend amount, etc. Further, some segments may be directed to the advertiser's current customers (as opposed to consumers of competitors) in order to reinforce consumer loyalty.

Still referring to the "Manage Segments" section 907, the time period fields 912 define time periods in which the respective dimensions are applied. According to various embodiments, the time period may be absolute (e.g., purchases made in August 2008) or relative to a present date of the campaign (and its associated segments and offers). For example, if an advertiser is working to create a campaign on June 1 in a given year, and the time period 912 for a particular dimension dictates transactions in the last 30 days, then any consumers performing transactions occurring within 30 days prior to June 1 (i.e., May 2-May 31) are subject to the respective dimension, and thus will be reflected in the "Est. Segment Population" field 919 (discussed below). As will be understood, the time periods 912 may indicate any time period defined by an advertiser or system operator as will occur to one of ordinary skill in the art.

According to one embodiment, the time period fields 912 dictate time periods in which consumer transactions are monitored or aggregated to analyze consumer spending habits. For example, an advertiser 213 may wish to create an offer-triggering event (OTE) associated with a segment of consumers that complete more than 5 transactions with a given merchant 101 over a predefined time period. Or, an advertiser may define a segment of consumers to receive offers that had a total spend amount above a predetermined threshold over a given time period. Accordingly, the advertiser is able to associate OTEs with segments of consumers based not on individual transactions, but on patterns of transactions over time.

As dimensions are defined by an advertiser 213 for a given segment, the "Est. Segment Population" field 919 displays an estimated total number of consumers 103 that will receive offers associated with the given segment. Generally, the "Est. Segment Population" field 919 refreshes to display an updated number of potential consumers each time a new dimension is defined by the advertiser, or each time a time period field 912 is adjusted. Accordingly, the advertiser is able to narrow or enlarge the scope of the consumer segment by adding, narrowing, or removing dimension specifics in order to achieve a desired number of consumers to receive offers. According to one embodiment, each time a segment dimension is defined, or a time period field adjusted, the OMS 211 queries each OPS 207 for aggregated consumer transaction information, and the OPS returns an aggregated population of consumers that satisfy the segment (based on the consumers' de-identified transactions stored in each OPS database 307). In the exemplary portal display 900 shown in FIG. 9, approximately 3,245 consumers are estimated to be eligible to receive an offer associated with the given segment based on the dimensions as defined.

As mentioned, the estimated number of consumers shown in field 919 is determined based on the aggregated de-identified consumer transaction data received/accessed from each OPS 207. If the advertiser 213 feels that the estimated number of consumers 103 is too high, but the advertiser does not want to vary the segment dimensions, a "Target Ratio" can be defined in "target ratio" field 917. For example, an advertiser is able to elect to deliver offers to a random percentage of consumers within a given segment (e.g., only 30% of consumers in a segment will receive a TMO). Additionally, according to one embodiment, the system is preconfigured to reject or block segments that carve out an exceedingly narrow scope of consumers. For example, if an estimated consumer population associated with a given segment falls below 300 consumers, then the system indicates to the advertiser that it must broaden the segment in order to proceed. The purpose of a preconfigured minimum segment population is to enhance consumer privacy and prevent segments from becoming too narrow (i.e., enabling an advertiser to identify actual consumers based on overly specific segments). As will be understood, the preconfigured minimum segment population may be set at any number that a system operator desires.

As segments are defined, estimated population display field 901 provides a graphical display of consumers in a given segment. As shown, customer universe icon 937 represents the entire population of consumers available for targeting as a function of the particular financial institution(s) 205 connected to the TMS 215. In one embodiment, this total number of consumers is displayed when the advertiser 213 interacts with the icon 937 by hovering a cursor over the icon (i.e., "mouse over"), or clicking on the icon, etc. Segment display field 939 identifies the currently selected segment (i.e., "Pizza King (CA)"), and lists the estimated number of consumers in the segment (which corresponds to the "Est. Segment Population" field 919). Segment display field 941 identifies the number of consumers in the available consumer population that are not subject to the selected segment. In the example shown in FIG. 9, field 941 indicates that an estimated 58,349, 204 consumers will not be eligible to receive a TMO because they have not (or likely will not) engage in transactions that satisfy the selected segment dimension criteria.

As will be understood, in various embodiments of the present system, multiple segments may be created and/or edited simultaneously. In these instances, display field 901 displays icons and segment information for each selected segment. Further, according to some embodiments, the number of consumers 103 indicated in display field 901 is merely an estimate of the total number of consumers that will receive offers associated with a selected segment. In these embodiments, an estimated number is provided (as opposed to an actual number), because, depending on the particular campaign or segment, the campaign may apply only to future transactions, and so a specific, accurate total cannot be determined. Again, as mentioned, only aggregated consumer transaction data is transmitted to the OMS, so no consumer-identifying information or specific account numbers are ever transmitted, and thus advertisers remain unaware of specific consumers that receive (or may receive) TMOs.

Still referring to FIG. 9, in the embodiment shown, the "Manage Offers" section 921 is the interface in the portal display 900 through which TMOs are created and/or edited. As will be understood, the representative offer specifics (e.g., "Reward Amount", "Image", etc.) are presented merely for illustrative purposes, and embodiments of the TMS 215 are not limited to the particular specifics shown. In the "Offer Name" field 923, an advertiser 213 defines a name for a new offer, or retrieves a previously-created offer from a drop down menu associated with field 923. For example, the name of the selected offer is "Pizza King (June)", likely indicating an offer that is (or will be) targeted to consumers of Pizza King stores in June of the selected year.

As shown, "Start date" and "End date" fields 925, 927 define the start and end dates between which TMOs 113 will be presented to consumers 103. In one embodiment, the start and end dates defined in fields 925 and 927 map directly to the campaign start and end dates. In other embodiments, however, the offer start and end dates are independent of the campaign start and end dates, and define the time period in which offers will be displayed to (i.e., viewable by) consumers via their financial institution portals. In one embodiment, both campaign and offer start and end dates correspond to monthly time periods (i.e., the first and last days of a month) to coincide with traditional financial institution billing cycles. As will be understood, time periods for campaigns, segments, and offers are defined to correspond to varying criteria as desired by a system operator or advertiser.

Still referring to the "Manage Offers" section 921, in the "Reward Amount" field 929 (i.e., incentive or offer amount), the advertiser 213 defines an amount or value for the selected TMO. Generally, this amount is a value the consumer 103 will receive off of his or her purchase or as a credit to his or her financial institution account if he or she "redeems" the offer (i.e., engages in a RQP 117). In general, the amount defined in the "Reward Amount" field 929 is entered by the advertiser as a dollar value or percentage of purchase and, if necessary, converted to each consumer's appropriate rewards type as determined by the rewards type associated with each consumer's account. In one embodiment, this conversion process is carried out within each OPS before requesting an offer redemption payment be issued to the consumer by the financial institution (described in greater detail below in conjunction with FIG. 23). In another embodiment, the reward amount value is converted to rewards currency before the offer is ever displayed to the consumer. In the "Image" and "Text" fields 931, 933, respectively, advertisers have the capability to include an image (such as an advertiser logo) or text in the TMO.

As will be understood, the offer defining information shown (925, 927, 929, 931, 933) is presented for illustrative purposes only, and other similar specifics, such as redemption methods, minimum RQP 117 spend amounts for redemptions to apply, particular advertiser locations at which redemption occurs, etc., are utilized according to various embodiments of the present TMS 215. Additionally, according to one embodiment, offers do not necessarily require (or make available) redemption. Some offers, for example, are simply advertisements indicating an advertiser logo or text.

Once an advertiser 213 is satisfied with the segment and offer as defined, the advertiser may elect to save the segment and offer via Save button 935. Once saved, the segment and offer are stored in the OMS database 305 in their respective campaign file. Further, if the advertiser wishes to publish the campaign (or in other embodiments, individual offers), then the advertiser selects Publish Campaign button 943. Once published, the campaign (and its associated segments and offers) are subject to the publish process, described previously in conjunction with FIG. 8.

Also shown in the exemplary OMS advertiser portal 900 are Billing and Reporting tabs 945, 947, respectively. When an advertiser 213 selects Billing tab 945, a billing screen is displayed (not shown), in which the advertiser is able to make deposits into a TMS account to cover consumer redemptions and/or manage payments directly to an identified system operator (or third party payment entity), track payouts to consumers, and perform other billing functions. When an advertiser selects Reporting tab 947, a reporting screen is displayed (not shown), in which the advertiser is able to review statistics and analytics associated with the advertiser's campaign(s). Such performance data is recorded by each OPS 207 and transmitted to the OMS 211 for advertiser review. Generally, the OMS provides informative displays (such as charts, graphs, tables, etc.) and other data indicating the performance (i.e., success) of the advertiser's campaign(s), both historically and in virtually real-time. Such information includes total number of offers redeemed, total number of offer impressions (i.e., views of an offer by consumers), total amount spent at advertiser locations in conjunction with offer redemption, amounts spent at advertiser locations as compared to competitor locations, and other similar reporting information.

As will be understood and appreciated by one of ordinary skill in the art, the fields and sections shown in the exemplary OMS advertiser portal 900 shown in FIG. 9 generally comprise conventional data entry fields, such as drop down menus, free-form text entry fields, selectable buttons, etc.

Referring now to FIG. 10, a flowchart is shown illustrating one embodiment of a computer-implemented campaign generation process 1000 from the perspective of the operational steps carried out by the TMS 215. The process 1000 illustrated in FIG. 10 coincides closely with the campaign generation process 800 shown in FIG. 8, except that FIG. 8 tracks the campaign generation process from the advertiser perspective, whereas FIG. 10 describes computer-implemented steps of the campaign generation process from the system perspective (in response to advertiser-entered data). At step 1001, the system 215 displays a GUI associated with the OMS advertiser portal 900 to an advertiser 213. Generally, the advertiser either selects a preexisting campaign or chooses to generate a new campaign. Accordingly, the system receives the advertiser's selection (step 1003). If a new campaign is selected (step 1005), the system awaits and subsequently receives campaign data entered by the advertiser (step 1009). If a preexisting campaign is selected (i.e., a campaign previously created by the advertiser), the system accesses the preexisting campaign (step 1007), and then receives advertiser-entered campaign data (if any). Once all campaign-related data has been received, the data is stored in the OMS database 305 (step 1011) (see FIG. 11 for exemplary campaign table that reflects and represents stores campaign-related data).

After a campaign has been selected and stored, an associated segment is typically created or selected for editing. If a new segment is selected for creation (step 1013), the system awaits and subsequently receives segment data entered by the advertiser (step 1017). If a preexisting segment is selected (i.e., a segment previously created by the advertiser), the system accesses the preexisting segment (step 1015), and then receives advertiser-entered segment data (if any). Once all segment data has been received, the data is stored in the OMS database 305 (step 1019) (see FIG. 12 for exemplary segment data table).

After a segment has been selected and stored, an associated offer is typically created or selected for editing. If a new offer is selected for creation (step 1021), the system awaits and subsequently receives offer data entered by the advertiser (step 1025). If a preexisting offer is selected (i.e., an offer previously created by the advertiser), the system accesses the preexisting offer (step 1023), and then receives advertiser-entered offer data (if any). Once all offer data has been received, the data is stored in the OMS database 305 (step 1027) (see FIG. 13 for exemplary offer data table). At step 1029, the system queries the advertiser 213 as to whether the advertiser would like to publish the campaign. If the advertiser does not wish to publish the campaign, then the campaign generation process 1000 is ended. If, however, the advertiser does wish to publish the campaign, then the campaign data is transmitted to each OPS 207 and the publication process is initiated (discussed previously).

FIGS. 11, 12, and 13 are exemplary data tables or structures illustrating representative data that was received and stored during the campaign generation process 1000. As mentioned previously, the collection of data contained in these tables (i.e., tables 1100, 1200, 1300) is generally referred to herein as "campaign data" 315. As will be understood, tables 1100, 1200, 1300 are presented for illustrative purposes only, and embodiments of the present system 215 are not limited to use of the specific data tables shown. In one embodiment, the three disparate tables are merged into one large data file within the OMS database 305. In another embodiment, a relational data table or index (not shown) stores and associates each campaign ID with its corresponding segment ID(s) and offer ID(s) such that offers, segments, and campaigns may be queried and tracked in relation to one another.

FIG. 11 is an exemplary campaign table 1100 illustrating advertiser-entered, campaign-related data received during campaign generation, as reflected by a plurality of entries in the table, each entry having a plurality of predetermined data fields. As shown, the table 1100 includes five data categories or fields: campaign identifier (ID) 1101, advertiser identifier (ID) 1103, author identifier (ID) 1105, campaign start date 1107, and campaign end date 1109. As will be understood, however, the data categories or files are not limited to the fields shown, and other embodiments include additional fields, including those mentioned previously herein, as well as those not mentioned that will occur to one of ordinary skill in the art. As will also be understood, although only five data entries are shown in the table (i.e., entries corresponding to exemplary and illustrative campaign IDs 10000-10004), actual data tables constructed in accordance with embodiments of the present system may include a virtually unlimited number of entries corresponding to a plurality of campaigns created by advertisers 213 utilizing aspects of the present system.

As shown, the campaign ID field 1101 indicates a unique campaign identifier associated with each campaign. Each campaign identifier is generated by an embodiment of the TMS 215 and associated with a respective campaign as each campaign is generated by an advertiser 213. Although the campaign IDs are illustrated as 5-digit numbers, it will be appreciated that these unique identifiers may comprise many formats, including number strings of longer length, hexadecimal identifiers, binary identifiers, and the like. The advertiser ID field 1103 indicates the particular advertiser associated with each campaign. The author ID field 1105 indicates the individual system user that actually created each campaign. Further, the campaign start and end date fields 1107, 1109 indicate the beginning and end dates for each campaign. As mentioned previously and according to various embodiments, these dates may or may not correspond to offer start and end dates, may or may not coincide with financial institution account billing cycles, etc. Representative campaign 1111 corresponds to the Pizza Pub/Pizza King example referenced in other parts of this disclosure.

FIG. 12 is an exemplary segment table 1200 illustrating advertiser-entered, segment-related data received during campaign generation, as reflected by a plurality of entries in the table, each entry having a plurality of predetermined data fields. As shown, the table 1200 includes five data categories or fields: campaign identifier (ID) 1101, segment identifier (ID) 1201, location 1203, merchant category/merchant 1205, and spend amount 1207. In particular, it will be appreciated that the campaign ID 1101 provides a link or connection of a particular segment to a particular campaign, so that a particular segment represented by an entry in a segment table is associated with a particular campaign. For example, in the entry 1209, the segment ID 55555 is a segment associated with campaign ID 10000.

It should be understood that the data categories or files are not limited to the fields shown in FIG. 12, and other embodiments include additional fields, including those mentioned previously herein, as well as those not mentioned that will occur to one of ordinary skill in the art. As will also be understood, although only five data entries are shown in the table (i.e., entries corresponding to segment IDs 55555-55559), actual data tables constructed in accordance with embodiments of the present system may include a virtually unlimited number of entries corresponding to a plurality of segments created by advertisers 213 utilizing aspects of the present system.

As shown, the segment ID field 1201 indicates a unique segment identifier associated with each segment. Each segment identifier is generated by an embodiment of the TMS 215 and associated with a respective segment as each segment is generated by an advertiser 213. Just as with the campaign identifiers, the segment identifiers comprise various formats within various embodiments of the present TMS 215, and are not limited by the 5-digit number format shown. Additionally, as each segment identifier is generated, it is associated with a respective campaign identifier (shown in campaign ID field 1101 in the segment table 1200) within the OMS database 305 to create a link between the segment and its corresponding campaign. The link between the segments and campaigns enables information in both tables to be accessed when either a specific segment or campaign is queried or accessed. The location field 1203 indicates, in one embodiment, one or more locations in which consumer transactions that are part of each respective segment may occur. In another embodiment, the location field 1203 indicates the location of consumer billing addresses. In further embodiments, the location field 1203 represents another location as will occur to one of ordinary skill in the art.

Still referring to FIG. 12, merchant category/merchant field 1205 indicates a particular merchant 101 (FIG. 1), merchants, or category of merchant with which consumer transactions that are part of the respective segment are carried out. Generally, the spend amount field 1207 indicates a minimum amount that each consumer must have spent, either via a single transaction or cumulatively across many transactions over the specified campaign time period, in order to qualify as part of a given segment. As shown, representative segment 1209 corresponds to the Pizza Pub/Pizza King example referenced in other parts of this disclosure.

FIG. 13 is an exemplary offer table 1300 illustrating advertiser-entered, offer-related data received during campaign generation, as reflected by a plurality of entries in the table, each entry having a plurality of predetermined data fields. As shown, the table 1300 includes eight data categories or fields: campaign identifier (ID) 1101, segment identifier (ID) 1201, offer identifier (ID) 1301, offer amount 1303, offer start date 1305, offer end date 1307, offer text 1309, and offer image 1311. As will be understood, however, the data categories or fields are not limited to the fields shown, and other embodiments include additional fields, including those mentioned previously herein, as well as those not mentioned that will occur to one of ordinary skill in the art. As will also be understood, although only five data entries are shown in the table (i.e., entries corresponding to offer IDs 99999-99995), actual data tables constructed in accordance with embodiments of the present system may include a virtually unlimited number of entries corresponding to a plurality of offers created by advertisers 213 utilizing aspects of the present system.

As shown, the offer ID field 1301 indicates a unique offer identifier associated with each offer. Each offer identifier is generated by an embodiment of the TMS 215 and associated with a respective offer as each offer is generated by an advertiser 213. Just as with the campaign and segment identifiers, the offer identifiers comprise various formats within various embodiments of the present TMS 215, and are not limited by the 5-digit number format shown. Additionally, as each offer identifier is generated, it is associated with a respective segment identifier and campaign identifier (shown in campaign ID field 1101 and segment ID field 1201 in the offer table 1300) within the OMS database 305 to create a link between the offer and its corresponding segment and campaign. The link between the offers, segments, and campaigns enables information in any of tables 1100, 1200, or 1300 to be accessed when a specific offer, segment, or campaign is queried or accessed.

Generally, the offer amount field 1303 indicates a reward amount or value a consumer 103 will receive if he or she completes a RQP 117 associated with the offer. The offer amount is generally entered by an advertiser within the OMS advertiser portal 900 as either a dollar amount or a percentage of a subsequent RQP, although other advertiser-entered offer amounts are possible within embodiments of the present system as will occur to one of ordinary skill in the art. In one embodiment, the offer amount is converted to an equivalent value of financial institution rewards currency (e.g., points, miles, etc.) before the offer is displayed and/or paid to the consumer (described in greater detail below in conjunction with FIG. 23). Typically, if the offer amount is converted to rewards currency, it is so converted by each OPS 207 based on predetermined conversion ratios set by each financial institution 205. In one embodiment, each consumer account associated with a particular rewards currency at a financial institution is grouped into a portfolio for that particular rewards currency to enable efficient conversion of offer amounts. In an alternate embodiment, the offer amount is predefined by an advertiser in a rewards currency or currencies, and thus offers are only displayed to consumers that have accounts that utilize the specific defined rewards currency(ies). As mentioned, according to the preferred embodiment, the offer amount is automatically issued/paid to each consumer's account by the respective OPS 207 and financial institution 205 once (if) a RQP has occurred.

Although not shown, in one embodiment of the present system 215, an offer-qualifying amount is defined as an item of offer defining information, indicating a minimum amount a consumer 103 must spend via the RQP 117 in order to receive the reward (i.e., offer amount). For example, an advertiser may dictate that, after a consumer has received an offer, the consumer must spend more than $25 in a follow-up purchase or purchases in order for the purchase(s) to qualify as an RQP. In the offer start and end date fields 1305, 1307, beginning and end dates are indicated for offer presentment to consumers. According to one embodiment, advertisers 213 may elect to "abandon" an offer (or entire campaign) prior to the end date if, for example, the consumer response rate to the campaign or offer was higher than expected. Generally, however, if an offer or campaign is abandoned, consumers that have already received the abandoned offer will remain eligible to redeem it according to its stipulated offer specifics.

Still referring to FIG. 13, the offer text field 1309 indicates a message, advertisement, or text presented to each consumer 103 with each respective TMO. Further, the offer image field 1311 indicates an image or picture uploaded and defined by an advertiser 213 to be included with the offer. Generally, the image comprises a advertiser logo, but virtually any image may be included. As shown, representative offer 1313 corresponds to the Pizza Pub/Pizza King example referenced in other parts of this disclosure.

Offer Placement System (OPS)

As described previously, embodiments of the offer placement system (OPS) 207 enable matching of received campaign data from the offer management system (OMS) 211 with de-identified consumer transaction data received from financial institutions 205, injecting or merging targeted marketing offers (TMOs) into financial institution portals for review by consumers 103, transmission of unidentified merchant names to the OMS for validation, organizing and transmitting offer redemption data to financial institutions for reimbursements to consumers, transmitting of results (i.e., performance) data to the OMS, and other similar processes as described herein. Generally, at least one OPS 207 is in operative association with each financial institution location, preferably located behind the institution's firewall(s) and reverse proxy 217, thus enabling direct communication with each financial institution while maintaining financial institution-level security with outside components (such as the OMS) (see FIG. 3 and its associated discussion for further details of OPS and financial institution architecture). Details and specific functionality associated with the OPS and its processes will now be further described.

FIG. 14 is a flowchart illustrating the overall computer-implemented processes and functions performed by the OPS 207 according to one embodiment of the present TMS 215. As will be understood and appreciated, the steps shown in FIG. 14 are not necessarily completed in the order shown, as the OPS operates on a continual and recurring basis, and the steps shown in FIG. 14 are associated with disparate functions of the OPS. Accordingly, the steps shown in FIG. 14 are generally asynchronous and independent, computer-implemented, tied to a particular machine (OPS 207), and not necessarily performed in the order shown. As shown, starting at step 1401, the OPS 207 monitors for incoming de-identified consumer transaction data from the financial institution 205. If data is received, then such data is stored within the OPS database 307 in a de-identified consumer transaction table 1700 (described in greater detail below) for further processing (steps 1403, 1405). If no data is received, then the OPS again monitors for receipt of data (step 1401). As will be understood, steps 1401 and 1403 are performed on a looping basis to continually check for incoming consumer transaction data. In one embodiment, data is transmitted from the financial institution periodically (e.g., hourly, daily, etc.), and thus the OPS only monitors for incoming data once per period.

Once received, the consumer transaction data is stored in the OPS database 307 (step 1405). The stored data comprises an instance or subset of the representative data shown in de-identified consumer transaction table 1700, which comprises de-identified transactions completed by various consumers. The consumer transaction data is utilized for matching consumer transactions to campaigns and offers (discussed in greater detail below in conjunction with FIG. 15). Upon receiving and storing the de-identified transaction data, the OPS determines whether any of the merchant names in the data are unidentifiable, and then extracts and transmits all unidentified names to the OMS to be identified and categorized via the merchant identification process 500 (described previously) (step 1407). After executing the merchant identification process, the OMS returns all validated merchant names to the OPS (step 1409), which then stores the received, validated merchant names within a validated merchant table 700 in the OPS database 307 for subsequent use in matching transactions to offer data.

As described previously, during campaign generation, the OMS 211 transmits requests to the OPS 207 for aggregated consumer transaction data that satisfies various segments created by advertisers. Thus, at step 1413, the OPS receives such a request for segment population totals. Upon receiving such request, the OPS determines which de-identified consumer transactions satisfy the segment request, aggregates the determined transaction data, and transmits the data to the OMS for use in campaign creation (step 1415). According to one embodiment, a predetermined searching algorithm is used to determine which transactions satisfy the segment dimensions associated with the request (similarly to the matching algorithm used in the matching process 1500, described below in association with FIG. 15).

At step 1417, the OPS 207 monitors for incoming campaign data 315 from the OMS 211. If data is received, then the OPS activates the matching process 1500 (described below), whereby the received campaign data is utilized in conjunction with de-identified consumer transaction data for matching consumer transactions to specific offers (steps 1419 and 1500). If no campaign data is received, then the OPS again monitors for receipt of data (step 1417). Generally, the campaign data includes campaign, segment, and offer data such as that shown in FIGS. 11-13. As will be understood, steps 1417 and 1419 are performed on a recurring basis to continually check for incoming campaign data or updates to previously-received data. If updated data is received, then previously-matched offers are modified accordingly. In one embodiment, data is transmitted from the OMS periodically (e.g., hourly, daily, etc.), and thus the OPS only monitors for incoming data once per period. As mentioned previously, incoming data may be transmitted in the form of instances of local data tables or structures, or may comprise access calls to master data stores in other TMS components. As also mentioned previously, any incoming data to an OPS from the OMS passes through financial institution firewall(s) 330 and a reverse proxy 217. Thus, all data must comply with each financial institution's guidelines and protocols. If it does not, the communication is blocked and an error message is transmitted to the respective advertiser and/or OMS operator.

Still referring to FIG. 14, once de-identified consumer transaction data and campaign data has been received by the OPS, a matching process 1500 is initiated to identify which consumers will receive specific TMOs 113 based on specific consumer transactions (i.e., offer-qualifying purchases (OQPs) 115 or offer-triggering events). The details associated with the matching process are described in conjunction with FIG. 15. After offers and transactions have been matched, the matched offers are stored in a matched offer table (see FIG. 18 and associated discussion) in the OPS database 307 where they await injection into financial institution consumer portals (or are sent to a consumer via another mechanism, such as via mobile devices, email, SMS or MMS messages, etc.). As a consumer 103 logs into his or her financial institution portal to view his or her account(s), an injection process 1900 is performed, in which the matched offers are merged into the respective financial institution portal for display in association with respective consumer transactions (see FIG. 19 and associated discussion for details). Over time, as consumers 103 view the TMOs 113 and redeem them via RQPs 117, the redemption process 2300 tracks and records viewed and redeemed offers, and instructs financial institutions 205 to issue offer redemption payments (ORPs) 225 to consumer accounts (see FIG. 23 and associated discussion). As data associated with viewed and redeemed offers, etc., is collected and stored, the OPS 207 aggregates and transmits such campaign results data 301 to the OMS 211 in response to a request from the OMS for such data for processing and display to advertisers 213.

Referring now to FIG. 15, a flowchart is shown illustrating one embodiment of a computer-implemented matching process 1500 for matching TMOs 113 to consumer OQPs 115 or OTEs within an OPS 207. As will be understood, the matching process 1500 generally occurs at pre-determined time intervals which can be adjusted as new campaign and transaction data is received within an OPS. At step 1501, stored de-identified consumer transaction data for each consumer is retrieved from the de-identified consumer transaction table 1700 (based on account GUIDs) within the OPS database 307. At step 1503, campaign data 315 is received from the OMS. As will be understood, steps 1501 and 1503 may occur simultaneously, or in reverse order than that shown. Generally, the data is newly-received data that has not yet been matched (i.e., transactions have not yet been matched to offers). However, in one embodiment, even previously-matched transactions and offers are re-processed periodically to determine if a more appropriate or specific match exists, based on a ranking algorithm (discussed below).

Once the de-identified transactions data has been retrieved and the campaign data has been received, a predetermined matching process is performed on the data to determine which TMOs each specific consumer should receive (step 1505). Preferably, the matching algorithm utilizes a conventional, hierarchical matching process that compares segment data (such as that shown in FIG. 12) to de-identified consumer transaction data (such as that shown in FIG. 17) to determine which transactions satisfy which segments (i.e., the system compares each transaction in a list of transactions to elements of campaign data). For example, an amount 1611 of a given transaction or purchase may be compared to the spend amount 1207 for each available segment. If the transaction satisfies the spend amount for one or more segments, then the next dimension of the identified segment(s) are processed, and so on. As will be appreciated, if a given transaction fails to satisfy any segments, then no offer is matched to the transaction.

Once the OPS 207 confirms that a specific consumer's transaction(s) match the dimensions for a respective segment, then the TMO associated with the segment is retrieved (based on related offer and segment IDs) and stored as an identified match with the transaction(s) for subsequent processing and display to consumers (as explained below in conjunction with FIG. 19). According to one embodiment, each TMO specifies where it should be placed (i.e., displayed) in a consumer's financial institution portal. For example, offers may be placed underneath a transaction, adjacent to a transaction, in a side bar, in a pop-up advertisement, etc., within the financial institution portal. Further, when an offer is placed underneath a transaction, the advertiser can define, via the OMS advertiser portal 900, whether the offer is placed beneath a transaction from a specific merchant, beneath a transaction from merchants or advertisers of similar type to the advertiser, or beneath any transaction. Based on predetermined rules defined by a financial institution or system operator, the OPS determines precisely where to display the offer when it is presented to a consumer.

It will be appreciated by one having ordinary skill in the art that, under some circumstances, more than one offer will apply to a given transaction. In these circumstances, and according to one embodiment, once all offers have been matched to a transaction, a predetermined ranking algorithm is utilized to determine which offer will be displayed with the particular transaction. In one embodiment, the ranking algorithm is customized to a system operator's or financial institution's specifications. For example, in one embodiment, advertisers 213 pay additional fees to the TMS operator to give their offers higher priority. In other embodiments, offers are ranked based on the overall perceived value of the offer (e.g., offer amount 1303), and the offer with the highest value to the consumer is selected as the matched offer.

Other variables for ranking are considered in other embodiments, such as the consumer's predicted responsiveness to each offer (e.g., based on the number of the consumer's transactions in a given merchant category), whether other offers from the particular advertiser have been previously presented to the particular consumer (determined based on the account GUID, discussed below), etc. According to still further embodiments, rather than ranking potential offers, if a given transaction satisfies more than one segment, all matched offers associated with the satisfied segments are subsequently displayed to the consumer.

After each OQP 115 or OTE is matched to a respective TMO 113, the match (i.e., the identifiers associated with matched offer and transaction(s)) is stored in a matched offer table 1800 (discussed below) until the matched offer is called for display to its respective consumer 103 (step 1507). Generally, each OPS database 307 and the data tables stored therein are formatted to correspond to data structures of their respective financial institutions 205. Because of variations in the manner in which financial institutions process and record data, some level of customization is generally required when an OPS is formatted for a given financial institution. However, once installed and formatted, the OPS, financial institu- FIG. 16 is an exemplary consumer transaction table 1600 illustrating consumer transactions recorded by a financial institution 205 and stored within a financial institution database 309. As will be understood, table 1600 is presented for illustrative purposes only, and embodiments of the present system 215 are not limited to use of the specific data table shown. As mentioned previously, the data included in consumer transaction table 1600 is stored at all times within the financial institution, and is de-identified before being sent to the OPS (described below). The consumer transaction table 1600 comprises consumer transaction data, as reflected by a plurality of entries in the table, each entry corresponding to an individual transaction, and each entry having a plurality of predetermined data fields.

As shown, the table 1600 includes seven data categories or fields: account number 1601, account global unique identifier (GUID) 1603, transaction identifier (ID) 1605, zip identifier (ID) 1607, merchant name (or identifier (ID)) 1609, amount 1611, and rewards type 1613. As will be understood, however, the data categories or fields are not limited to the fields shown, and other embodiments include additional fields as will occur to one of ordinary skill in the art. As will also be understood, although only five data entries are shown in the table (i.e., entries corresponding to account numbers 2930928402, 1029478293, etc.), actual data tables constructed in accordance with embodiments of the present system may include a virtually unlimited number of entries corresponding to a plurality of consumer transactions recorded by embodiments of the financial institutions 205.

As shown, the account number field 1601 indicates the specific account number associated with a consumer's account. The account GUID field 1603 indicates a unique global account identifier (i.e., a secure identifier) associated with each consumer's account. Prior to transmitting data to the OPS 207, each financial institution replaces actual consumer names and/or account numbers with GUIDs, which are a conventional type of identifier used when dealing with secure or sensitive data. Generally, each financial institution 205 incorporates its own internal process to convert actual accounts to GUIDs. Although the account GUIDs are illustrated as 5-digit numbers, it will be appreciated that these unique identifiers may comprise many formats, including number strings of longer length, hexadecimal identifiers, binary identifiers, and the like. Conventional GUIDs comprise 32 hexadecimal digits as will be known to those skilled in the art, such as, for example: 3F2504E0-4F89-11D3-9A0C-0305E82C3301.

As will be understood, use of GUIDs in place of actual consumer accounts or consumer identifiers prevents unauthorized access to confidential consumer information by components outside of the financial institution 205 (e.g., OMS, Internet, etc.). If, however, some sensitive data were accidentally transmitted to an OPS 207, no further breach of this data would occur, as the OPS is in operative association with the financial institution behind the financial institution's firewall(s) 330 and reverse proxy 217. Further, the distributed architecture of the financial institution and each OPS (as shown previously in FIG. 3) creates additional layers of security for each component. Accordingly, all private and sensitive consumer information is retained within the financial institution's security mechanisms, thus allowing placement of TMOs without disclosure of sensitive and confidential consumer data.

Still referring to FIG. 16, transaction ID field 1605 indicates a unique transaction identifier associated with each transaction. Generally, these transaction IDs are generated and associated by financial institutions 205 with transactions in much the same manner as account GUIDs. In one embodiment, the transaction IDs are represented by add-on characters to the account GUIDs, as typically more than one transaction is associated with each account.

In one embodiment, the zip ID field 1607 indicates the zip code (i.e., location) in which the specific transaction occurred. In other embodiments, the zip ID field 1607 indicates the zip code of the billing address of the consumer associated with the specific account, or some other informational location. As will be understood, the zip ID field is essentially a location identifier, and thus other location indicia may be included (e.g., city, state, etc.).

As shown, the merchant name field 1609 indicates the specific business entity with which the transaction occurred. As will be understood, the business entity shown in field 1609 may be a merchant, advertiser, advertiser competitor, etc. The amount field 1611 indicates the amount of the transaction. Further, the rewards type field 1613 indicates the particular rewards type (if any) tied to the respective account. For accounts with only one rewards type, the financial institution indicates which type of rewards program is associated with the account in which the transaction occurred. For accounts with multiple rewards programs, either a single program is selected by the financial institution, or multiple programs are indicated in association with the given transaction in rewards type field 1613. Further, in some embodiments, rather than indicating a rewards type in a consumer transaction table, the rewards type(s) associated with each account is stored in a separate file (e.g., portfolio of accounts associated with a given rewards type) in the financial institution database 309. Again, transaction data as referred to herein is not limited by the specific fields shown in FIG. 16, and other data items are contemplated, such as merchant categories, amount spent in an overall merchant category, transaction type, specific goods and/or services purchased, and other similar data fields. Additionally, as shown, representative transaction 1615 corresponds to the Pizza Pub/Pizza King example referenced in other parts of this disclosure.

FIG. 17 is an exemplary de-identified consumer transaction table 1700 illustrating de-identified consumer transactions data recorded by a financial institution 205 and transmitted to its respective OPS 207. The de-identified consumer transaction table 1700 comprises de-identified consumer transaction data, as reflected by a plurality of entries in the table, each entry corresponding to an individual transaction, and each entry having a plurality of predetermined data fields.

As explained and defined previously herein, de-identified transactions are those in which consumer- and/or account-identifying information has been removed (and typically replaced with a GUID). As will be understood, table 1700 is presented for illustrative purposes only, and embodiments of the present system 215 are not limited to use of the specific data table shown. As shown, table 1700 is identical to consumer transaction table 1600, except that the actual account number associated with each transaction has been removed. Accordingly, table 1700 includes six data categories or fields: account global unique identifier (GUID) 1603, transaction identifier (ID) 1605, zip identifier (ID) 1607, merchant name (or identifier (ID)) 1609, amount 1611, and rewards type 1613. As will be understood, however, the data categories or files are not limited to the fields shown, and other embodiments include additional fields as will occur to one of ordinary skill in the art. As will also be understood, although only five data entries are shown in the table (i.e., entries corresponding to GUIDs 12932, 23049, etc.), actual data tables constructed in accordance with embodiments of the present system may include a virtually unlimited number of entries corresponding to a plurality of consumer transactions recorded by embodiments of the present TMS 215.

FIG. 18 is an exemplary matched offer table 1800 illustrating identifiers associated with matched transactions (OQPs 115), offers (TMOs 113), and accounts as a result of the matching process 1500. The matched offer table 1800 comprises matched offer data, as reflected by a plurality of entries in the table, each entry corresponding to the matching of an individual transaction with a specific offer applicable to that transaction, and each entry having a plurality of predetermined data fields.

As will be understood, table 1800 is presented for illustrative purposes only, and embodiments of the present system 215 are not limited to use of the specific data table shown. As shown, the table 1800 includes four data categories or fields: transaction identifier (ID) 1605, offer identifier (ID) 1303, account global unique identifier (ID) 1603, and rank 1801. As will be understood, however, the data categories or fields are not limited to the fields shown, and other embodiments include additional fields as will occur to one of ordinary skill in the art, including offer-triggering event (OTE) identifier (ID), etc. As will also be understood, although only five data entries are shown in the table (i.e., entries corresponding to transaction IDs 55550, 37953, etc.), actual data tables constructed in accordance with embodiments of the present system may include a virtually unlimited number of entries corresponding to a plurality of matched consumer transactions and offers.

As shown, the transaction ID field 1605, offer ID field 1303, and account GUID field 1603 correspond to the similarly-identified fields shown and discussed previously in conjunction with FIGS. 13, 16, and 17. In one embodiment, when offers and transactions are matched, the respective data entries are pulled or replicated from the respective data tables or files and stored in matched offer table 1800. For offer-triggering events (OTEs) in which offers are not necessarily matched to a single transaction, the account GUID field 1603 indicates to which consumer account a matched OTE corresponds. Rank field 1801 identifies the ranking of the particular matched offer as compared to other matched offers for the given transaction or OTE (as mentioned previously). Additionally, as shown, representative transaction 1803 corresponds to the Pizza Pub/Pizza King example referenced in other parts of this disclosure.

As will be described below, when a consumer logs into his or her financial institution portal and views his or her transactions, the associated offer(s) are retrieved from matched offer table 1800 (or an equivalent data store) for display to the consumer based on the consumer's matched transactions or OTEs. As will be understood, however, simply because a transaction has been matched with an offer or OTE does not necessarily mean the consumer 103 will actually receive the offer. For example, if a given consumer infrequently views his or her online banking portal, then he or she may never receive a particular offer or offers. Or, if an offer or OTE has been assigned a low rank, then that offer may not be displayed to the given consumer because other, higher-ranked offers apply to the given transaction or OTE. For this reason (and others), offer views (i.e., "impressions"), in addition to offer redemptions, are recorded by each OPS 207 for purposes of reporting to advertisers 213, etc.

Targeted Marketing Offer Injection or Merging into Display of Online Portal

FIG. 19, consisting of FIGS. 19A and 19B, illustrates a computer-implemented process for injecting or merging a selected targeted marketing offer (TMO) into the display of an online portal provided by a financial institution, in accordance with aspects of the claimed invention(s). As will by now be understood, once the disclosed targeted marketing system (TMS) 215, via the operations of the OMS 211 and OPS 207 as described herein, has carried out prior processes of processing transaction data to provide a basis for identifying market segments, creating a campaign from such processed transaction data by determining appropriate market segments for receiving offers, establishing the terms and conditions for a targeted marketing offer within such segments, and determining that predetermined TMO display conditions have been satisfied by a consumer's action (e.g., a predetermined transaction or other offer-triggering event), the TMS 215 displays information corresponding to the TMO to the consumer via the online portal. In one particular aspect, the TMO information is displayed in close juxtaposition, proximity, or other discernible association with the consumer's prior transaction information as the consumer views the same via their online banking portal.

FIG. 19A is a flowchart illustrating an embodiment of an injection process 1900 for injecting or merging matched offers into an online financial institution portal in association with consumer transaction displays when a consumer logs in and views his or her financial institution portal. FIG. 19A is a more generalized offer injection process 1900, whereas FIG. 19B (discussed in greater detail below) illustrates a specific implementation of one embodiment of a document object model (DOM) injection process 1900a for injecting offers into consumer financial institution portals.

In general, embodiments of the claimed invention(s) utilize a form of "cross-site scripting" in order to effect the merger or injection of TMOs into the financial institution portal, or other similar technique which does not require significant computing resources, programming, or modification of the financial institution web server code that generates the portal on behalf of a consumer. As known to those skilled in the art, many modern web browser programs that run on consumers' computers or other web-accessing devices (such as smart phones) include embedded program code execution engines. Such modern browsers include well known programs such as Microsoft's Internet Explorer, Mozilla Firefox, Apple Safari, Google Chrome, and others. Embedded program code execution engines include those identified as Javascript, Flash, XML, PHP, CSS (Cascading Style Sheets), ASP, and others.

Generally speaking, such embedded program code is computer-executable program code that is downloaded at run time from a web site and executed within the browser environment at a local (client) computer, instead of code that is executed at a server computer that provides the HTML or similar code commonly associated with a "web page." Further generally speaking, a cross-site scripting method typically involves the downloading of computer program code from a primary web server that generates the display of a web site (such as HTML that generates the financial institution portal), which embeds a minimal script or call to download and run computer program code from another server (e.g. a script server or another process in the primary web server) that effects the functionality of the TMO injection or merger into the portal display.

According to one aspect of the claimed invention(s), and according to one embodiment, a cross-site scripting method utilizes the Javascript code execution capability of modern web browsers to run a script that merges or injects information corresponding to a targeted marketing offer into the financial institution portal display of a consumer's account history comprising a plurality of transactions of the viewing consumer. The web page comprising the portal display, typically an account history page comprising a list of the consumer's prior transactions, is dynamically adjusted to incorporate (merge, inject) the TMO information into the display of transactions of the financial institution portal, in an unobtrusive and aesthetically acceptable manner and format. Advantageously, the financial institution portal is independent of and systemically uncoupled from the TMO injection, such that (a) the TMO information is seamlessly and unobtrusively presented to the consumer in accordance with predetermined advertisement placement information (such as display the TMO adjacent to a selected transaction, display the TMO in a predetermined position on the portal display screen, etc.) and (b) any issues with operation or security of the injection process will not affect the operation of the financial institution portal, which will continue to operate and serve the consumer's needs whether or not any TMOs are presented.

Although the disclosed embodiments and aspects are described in connection with use of Javascript code embedded into the HTML of the financial institution portal, it should be understood that other techniques for merging or injecting the TMO information into the portal can be employed, such as by certain forms of redirection to another site, use of browser frames, and the like, but other techniques may present technical or business issues that are more complex than a simple merger or injection operation. For example, the known security policy of "same origin" for a script and a document or code that contains a script is satisfied in disclosed aspects of the claimed inventions by use of a proxy at the financial institution web server that redirects a call for script to the OPS residing within the financial institution's firewall within its DMZ.

Prior to discussing the specific methodology of TMO merger or injection by use of a scripting technique, a more generalized discussion of the preferred merger or injection process will be provided by reference to FIG. 19A.

Starting at step 1901 in FIG. 19A, an OPS 207 monitors for a call from its respective financial institution's web server 219 for previously-matched offers. In accordance with one aspect of the disclosed system, each time a consumer 103 logs in to his or her financial institution web portal, a call is automatically transmitted from the financial institution web server to the OPS to retrieve the matched offers (if any) associated with the particular consumer's account transactions (based on the consumer's GUID). In accordance with one disclosed aspect of the claimed invention(s), for this call to occur, a relatively minimal amount of JavaScript code (or some other similar programming language) is inserted into the financial institution's banking portal code at a previous time when an OPS is initially connected to the financial institution 205. When a consumer's browser loads the financial institution portal display (and especially an account history page comprising a list of prior transactions of the consumer), this JavaScript code (i.e., "script call code") calls a larger segment of code contained within the OPS that performs the functions of retrieving matched offers and injecting those offers into the financial institution's web portal display to the consumer.

The preferred process of utilizing a small amount of software code inserted into a previously-existing code base to call a disparate and more extensive algorithm enables connection of the TMS (and specifically, the OPS) to the financial institution with minimal initial or on-going effort on the part of the financial institution. Preferably, a JavaScript DOM injection is used to access and execute code stored within the OPS to modify the financial institution's online portal each time a consumer logs in and views his or her account display. Accordingly, there is no server involvement from the financial institution's 205 perspective with the TMO injection, as all processes occur within the OPS 207, except at the point of web display to the consumer. This functionality is made possible based on the system architecture 300 of embodiments of the TMS 215, wherein each OPS is directly connected to each financial institution within the financial institution's security infrastructure.

Further, because minimal intrusion into the financial institution's preexisting software code is required, both the financial institution 205 and any associated OPS 207 are free to update and revise their code bases as needed without changing or updating the interaction between these two systems. Additionally, based on the discrete nature of the system architecture 300, if problems occur with either the TMS or financial institution systems individually, these problems can be confined within each respective component or domain without affecting or infecting the other components. As will be known to those of ordinary skill in the art, while a JavaScript DOM injection is utilized according to one embodiment, other embodiments utilize other scripting, cross-site scripting, or other similar mechanisms for retrieving and rendering updated financial institution web displays with matched offers.

Still referring to FIG. 19A, if a call is received from the financial institution 205 (indicating a consumer 103 has logged in to the financial institution portal to view his or her account and transactions, e.g. via an account history page), then the stored, matched offers associated with the particular consumer's transactions are retrieved from the matched offer table 1800 maintained by the OPS in the OPS database 307 (step 1905). If a call is not received, then the OPS 207 again monitors for a call from the financial institution online system (step 1901) via a continuous monitoring loop. In one embodiment, if a call is received, then the OPS searches its matched offer table according to the GUID associated with the received call from the financial institution (step 1905). Once the TMOs (if any) associated with a given consumer's transactions are retrieved, information corresponding to the selected TMO's is transmitted to the consumer's browser, and the injection process updates the previously rendered web page associated with the financial institution portal with such retrieved TMO information, thereby displaying the retrieved offer(s) to the consumer (steps 1907, 1909) (see FIG. 21). Stated in other words, and according to one aspect of the claimed invention(s), the consumer views his or her account history page initially as originally intended and as originally programmed by the financial institution web portal, and that account history page is updated by the consumer's browser, which receives the TMO information asynchronously to the account history web page display, by locally executing the injection script which dynamically and independently modifies the prior account history display to provide an updated account history display that incorporates the TMO information merged therein.

In one embodiment, the updated consumer financial institution web page is displayed via a hypertext markup language (HTML) web service, or other similar service. As will be understood and appreciated, according to one embodiment, calls to retrieve matched offers may occur with relatively high frequency (possibly hundreds or thousands per minute), and thus the process 1900 shown in FIG. 19A (and particularly steps 1901 and 1903) is repeated on a continual and rapidly-recurring basis.

Each time the updated financial institution web page is rendered and displayed to a consumer 103 (steps 1907, 1909), the OPS 207 records the offer impression for each displayed offer in the offer impression table 2400 (see FIG. 24 and its associated discussion) (step 1911) in the OPS database 307. As defined previously herein, an "offer impression" represents an instance of a consumer logging in to his or her financial institution portal 2100 and viewing the displayed offers associated with displayed transactions. It is inferred that when an offer is injected into the consumer's financial institution portal, the consumer sees the offer. According to one embodiment, a consumer transaction cannot qualify as a RQP for a particular TMO until the OPS recognizes that at least one offer impression of the TMO has occurred for the consumer. Furthermore, offer impressions assist advertisers 213 in tracking and assessing the performance of their campaigns and associated advertisements, as analytics are determined regarding the number of times a consumer viewed an offer before redeeming it, how many times, generally, offers are viewed per month, etc. The details associated with offer impressions and the offer impression table are discussed below.

In accordance with aspects of the claimed invention(s), a DOM injection process is utilized to effect the dynamic updating of a consumer's display to include TMOs in the display, as described next in connection with FIG. 19B. In this embodiment, the script that effects the injection or merger of the TMO information is provided from a server associated with the OPS (identified as OPS local server 207 in FIG. 19A, also called a "script server"), as a result of calls provided to it from a bank web server 219.

FIG. 19B is a sequence diagram illustrating one embodiment of the steps associated with injecting matched offers into consumer financial institution portals via a DOM injection process 1900*a*. As shown, the embodiment of the DOM injection process generally comprises three system components—a client browser (i.e., consumer 103 accessing a financial institution portal), a bank web server (i.e., financial institution web server) 219, and a local server associated with the OPS 207 (i.e., a server residing behind financial institution firewalls and operatively coupled to OPS database 307).

At step 1 in FIG. 19B, the consumer 103 initiates a secure, on-line session with the financial institution 205 via the consumer's web browser for purposes of reviewing his or her transactions, managing his or her accounts, etc. Typically, the consumer will be requesting a display of an account history page comprising a list of prior transactions maintained by the consumer's financial institution. At step 2, the client browser requests, receives from the financial institution web server 219, and renders the consumer's transaction display 2000 (discussed below), including the consumer's recent transactions associated with a specific account. At step 3, after the consumer's transactions display web page has been rendered, the client browser requests and executes a DOM Injection Loader (i.e., a minimal amount of code inserted into bank's web services code, discussed previously, whose primary purpose is to invoke the operation of an embedded code engine associated with the browser, such as Javascript).

At step 4, the DOM Injection Loader then requests a DOM Injection Script (i.e., more extensive executable code or script stored within the OPS 207 that executes offer insertion or injection functionality, discussed previously) via an asynchronous call to the financial institution web server 219. The call for the injection script typically includes an identifier of the consumer and a network return pathname (URL) for returning the script and other information (such as the TMO information) from the OPS to the client machine.

At step 5, the financial institution web server 219 recognizes that the asynchronous call is intended for the OPS (via a reverse proxy 217 or other similar mechanism) as a script server, and redirects the call to the OPS local server.

At steps 6 and 7, upon receipt of the asynchronous call, the OPS 207 acting as a script server transmits a DOM Injection Script back to the bank's web server 219, which then returns the DOM Injection Script to the client browser (in response to the browser's asynchronous request) via the network return pathname. At step 8, the client browser executes the DOM Injection Script for purposes of identifying the particular consumer account being accessed along with the consumer transactions previously rendered to the consumer 103 via the transactions (account history) display.

At step 9, after the consumer's account and transactions information have been identified, the DOM Injection Script transmits this information to the financial institution web server 219 via another asynchronous call, and the web server again redirects the call to the OPS local server (step 10). Stated in other words, the information in the account history display, which either has been or will be displayed to the consumer by the bank web server, is transmitted to the OPS local server so that this information can be used to access the matched offer table 1800 (FIG. 18) and determine if any targeted marketing offers are available for provision to the consumer.

At step 11, and still referring to FIG. 19B, once the OPS 207 receives the asynchronous call redirected from the bank web server, the OPS identifies and determines which offers should be displayed to the consumer 103 via the financial institution portal based on the particular consumer account and the rendered transactions. In order to determine which offers to transmit back to the bank's web server (and thence to the consumer's browser) for display to a consumer, the OPS searches the matched offer table 1800 in the OPS database 307 and retrieves offers associated with the consumer's account. Also, based on the rendered transactions, the OPS makes a determination as to where offers should eventually be displayed (i.e., "placed") on the consumer's transactions display pursuant to offer placement criteria (typically defined by advertisers 213 during campaign generation).

At steps 12, 13, once retrieved, the OPS 207 sends the offers to the financial institution web server 219, which in turn transmits the offers to the consumer's browser via the previously supplied network return pathname. At step 14, upon receipt of the offers, the client browser continues execution of the DOM Injection Script and inserts (injects or merges) the offers into their appropriate display locations on the consumer's financial institution portal web page in accordance with predetermined placement information (thereby rendering a display similar to that shown in FIG. 21).

As will be understood by those skilled in the art, the specific steps shown in FIG. 19B are presented for illustrative purposes only, and other methods for injecting and displaying offers to consumers are possible according to various embodiments. For example, rather than using a DOM injection process, other cross-site scripting mechanisms may be used. Or, in an alternate embodiment, rather than the client browser making the call for offers, the bank web server 219 makes the call to the local OPS server before the consumer's transactions display web page is ever rendered. While this server-side approach performs generally the same functions as a DOM injection approach, many financial institutions prefer the DOM injection because it enables minimal intrusiveness and restructuring of a financial institution's internal architecture and software. Further, although the preferred embodiment is described in terms of interaction between a client browser (i.e., consumer), a financial institution web server, and an OPS server, it should be understood that various system architectures, script call codes, and other system components may be utilized according to various embodiments. For example, the computer code used for cross-site scripting could be stored and executed on a server external to the OPS (assuming that appropriate security mechanisms were employed), or all processes could take place within the financial institution computer system, etc. It will thus be appreciated that virtually any mechanism for injecting offers into financial institution transactions displays may be used in association with embodiments of the present system, assuming those mechanisms comply with financial institution security protocols as outlined herein.

FIG. 20 illustrates an exemplary screen shot of a graphical user interface (GUI) associated with a typical exemplary consumer financial institution portal 2000 prior to injection of one or more TMOs into the portal. Through this portal, consumers 103 are able to view and manage their financial institution accounts, review prior transactions and purchases 2009, and carry out other banking-related functions. As will be understood and appreciated, the GUI shown in FIG. 20 is presented for illustrative purposes only, and the actual format and display of each GUI varies depending on the particular financial institution 205.

As shown, the exemplary portal display 2000 includes account management tabs 2001, an account number display 2003, a transactions details section 2005, and a transactions summary section 2007 for displaying previous transactions 2009 completed during a given time period. The foregoing display is an example of an account history page, discussed above. The representative consumer portal display 2000 also includes the representative offer-qualifying purchase (OQP) 115 made at Pizza King (discussed for exemplary purposes in other parts of this disclosure). Because the display 2000 shown in FIG. 20 is representative of a conventional and unmodified display from a financial institution 205, it does not include any TMOs.

FIG. 21 illustrates an exemplary screen shot of a GUI associated with a consumer financial institution portal or display 2100 with multiple exemplary targeted marketing offers (TMOs) 113 displayed therein according to an embodiment of the various inventions described herein. As shown, the portal display 2100 mirrors the display shown in FIG. 20, but with an associated offer 113a displayed in perceptible association with (i.e. close proximity to) its corresponding OQP 115. In the display shown, the representative Pizza Pub offer 113a is displayed immediately under the Pizza King OQP 115. Also shown in the portal display 2100 are several other TMOs 113b listed in a side-bar section of the display. According to one embodiment, these TMOs 113b are associated with an offer-triggering event (OTE) other than a specific transaction, and are displayed based on some criteria associated with the consumer's spending habits. Alternatively, the offers 113b may comprise TMOs specifically linked to specific, individual transactions of the consumer, but are merely displayed generally in the portal as opposed to in relative juxtaposition to the transactions themselves. As will be understood, however, embodiments of the present system 215 may display offers and advertisements according to various methods, such as directly under listed transactions, in banner advertisements, pop-up advertisements, etc., and such embodiments are not limited to the type of offer display shown in FIG. 21. As will also be understood, the offers shown in FIG. 21 are a result of the injection process 1900 described previously, in which matched offers are retrieved from the matched offer table 1800 and merged into existing financial institution portal displays to transform the portal displays.

As mentioned previously, the displayed TMOs 113 remain available for viewing as long as the consumer's OQP 115 is available for review, or as long as the OTE applies, or as long as dictated by the advertiser 213 when the offer or campaign was created. As will be appreciated, consumers may receive multiple offers within display 2100 if many of the consumer's transactions satisfy one or more TCS's within the system 215. Further, as will be understood, there are circumstances in which a given consumer fails to qualify to receive any offers because none of his or her transactions satisfy any offer segment dimensions. In these circumstances, the consumer's financial institution portal remains unchanged, such as that shown in FIG. 20. Additionally, as will be understood and appreciated, offers are displayed to consumers 103 via any viewable portal display, such as those on a mobile device (e.g., cell phone), laptop computer, desktop computer, or any other similar display.

According to another aspect of the disclosed system, targeted marketing offers (TMOs) may be determined in accordance with different dimensions of segmentation, and/or successive and dependent segmentation, with different conditions and rewards provided for different but related segments. In this regard, turn now to FIG. 22 for explanation of an exemplary successive segmentation example.

FIG. 22 is a block diagram illustrating the potential matching of three exemplary offers to consumers 103 associated with three unique targeted consumer segments (TCS's) based on predefined dimensions associated with the segments. As will be understood, FIG. 22 is presented for illustrative purposes only, and the specific segments, offers, and segmentation strategy shown are not intended to limit the scope of the present disclosure in any way. As shown, the exemplary advertiser 213 (i.e., Pizza Pub) has defined three distinct dimensions 2201, 2203, 2205 that, when processed according to advertiser specifications, define three distinct segments (and thus correspond to three separate potential offers 2207, 2209, 2211). In the location dimension 2201, the advertiser has indicated that in order to qualify for an offer associated with the given segment, the transaction must have occurred in California (or, depending on the embodiment, the consumer must live in California, etc.). In the merchant category/merchant name dimension 2203, the advertiser has indicated that a purchase must have been made with "Pizza King" in order to qualify to receive an offer. In the spend amount dimension 2205, the advertiser has specified a minimum spend amount of $25.

As shown, the advertiser 213 has constructed the campaign in such a way that, rather than requiring that all segment dimensions be satisfied, if a consumer 103 satisfies one of the defined dimensions 2201-2205, but not the others, then the consumer still receives a TMO associated with the particular dimension. For example, if a consumer makes a purchase in California, but the purchase is totally unrelated to Pizza King and was for less than $25, the consumer will still receive an offer 2207. As shown in this specific example, however, the offer 2207 is less lucrative than the other offers 2209, 2211 because the segment associated with the offer is less targeted. However, other offers created by other advertisers may have higher value if less targeted. As will be understood, the offer value is set by an advertiser as desired, and is in no way specifically tied to targeting. Additionally, in the example shown, if another consumer satisfies two dimensions, but not a third, then the consumer will also receive an offer 2209 (albeit a different offer from the first consumer), and so on.

As shown, if all three dimensions are satisfied (based on the Boolean construct "AND"), then the consumer will receive the most lucrative offer 2211. As will be understood and appreciated, advertisers 213 are free to organize and create campaigns, segments, and offers as they desire. For example, as opposed to the hierarchically segmented campaign represented in FIG. 22, an advertiser may define its segments in such a way that all segment dimensions must be satisfied by a consumer transaction before an offer is presented to the consumer. Generally, embodiments of the present system enable advertisers to construct campaigns according to various Boolean operators (i.e., AND, OR, If/Then, etc.), hierarchical dependencies, and other strategies as will occur to one of ordinary skill in the art.

As shown, in one embodiment, offers are different and generally become more lucrative as the segment narrows (i.e., as more segment dimensions are satisfied by a consumer transaction), as it is typically more valuable to obtain the business of consumers that have higher propensities to buy advertiser-related items (e.g., pizzas), especially if those consumers are customers of an advertiser competitor 101. For example, if a given consumer rarely or never buys pizzas (based on prior spending habits), then providing offers to these customers generally has little value to an advertiser 213 that sells pizzas. Further, another reason why offers generally become more valuable as the segment narrows is that providing valuable offers to large segments of consumers can become cost prohibitive to advertisers. However, as will be understood, advertisers are free to organize offers and segments as they see fit, and offers do not have to become more lucrative as a segment narrows. In fact, some advertisers may choose to deliver high value offers to large segments of consumers in the hopes of engendering a large volume of business.

Offer Realization/Redemption

FIG. 23 is a flowchart illustrating an embodiment of a computer-implemented redemption process 2300 within the OPS 207 for determining whether one or more offers have been redeemed by a consumer, according to one aspect of disclosure. The embodiment of the redemption process shown in FIG. 23 also includes the functions of crediting redemptions to each respective financial institution's consumers and providing reporting and billing functions related to redemptions for advertisers. The redemption process 2300 is typically carried out in a particular machine, in this case an OPS 207 associated with a particular financial institution that employs aspects of the disclosed system.

Starting at step 2301, an OPS 207 monitors for incoming de-identified consumer transaction data from its respective associated financial institution. If no data is received, then the process 2300 loops to step 2301, and the OPS again monitors for incoming data (step 2303). Just as with other recurring processes discussed herein, steps 2301, 2303 are repeated either continuously or on a recurring, periodic basis.

If de-identified consumer transaction data is received, then the data is stored within the de-identified consumer transaction table 1700 within the OPS database 307 (step 2305). If any of the merchant names in the de-identified consumer transaction data cannot be identified, the names are transmitted to the OMS for merchant identification (see FIG. 5 and associated discussion) before any redemptions are determined for the specific transactions. Next, the OPS accesses the matched offer table 1800 from within the OPS database 307, compares the de-identified consumer transaction data (using the validated merchant name(s)) to the data in the matched offer table, and determines whether one or more previously-placed TMOs have been redeemed by one or more consumers (steps 2307, 2309). In one embodiment, step 2309 is performed by a predetermined algorithm that compares each transaction received from the financial institution (for example, a list of transactions such as those shown in table 1700) for a particular consumer with that consumer's previously-placed offer(s) in the matched offer table 1800 to determine if any of the offer criteria of the offers displayed to the consumer have been satisfied. As described elsewhere herein, each offer generally defines one or more offer criteria necessary to redeem the offer, such as "$10 off any purchases of $25 or more made at a Pizza Pub in June". Thus, if one of the transactions received from the financial institution meets the defined criteria of an offer associated with the given consumer's account, then the offer is defined as redeemed. In one embodiment, each consumer's matched offers are stored in a separate matched offer table or file 1800 to simplify the comparison process of step 2309 (as well as the previously-discussed injection process 1900).

If no offers are determined redeemed (based on the results of step 2309), then the redemption process 2300 for the particular set of de-identified consumer transaction data is ended (step 2311). If, however, an offer is determined redeemed, then OPS utilizes a pre-determined conversion algorithm to automatically convert the redemption value, as stipulated by the originally-presented TMO 113, into the appropriate rewards type (if different from cash) for the account associated with the RQP 117 in which the offer was redeemed (step 2313). For example, a financial institution 205 may dictate that $1.00 in offer value is equivalent to 3 airline miles. Thus, if an offer value of $10.00 was redeemed, the consumer account will receive 30 airline miles. Once the reward value has been converted (if necessary), the redemption is recorded by the OPS 207 in an offer redemption table 2500 (see FIG. 25 and its associated discussion) (step 2315) in the OPS database 307. Depending on the particular embodiment, details associated with the RQP are recorded, such as the time and/or date of the RQP, the specific advertiser location at which the RQP occurred, and other similar data (see exemplary data structure 2500). In one embodiment, the OPS will provide its associated financial institution(s) with a report or notification of all RQPs having occurred within a defined period of time, which the financial institution will in turn utilize to issue offer redemption payment(s) to the appropriate consumer account(s) (step 2317).

In general, the financial institution 205 is directly reimbursed for the value of each reward paid to a consumer by the TMS, which in turn receives payment from advertisers for all redeemed offers. Additionally, in one embodiment, an operator of the TMS charges advertisers a fee to create and execute targeted marketing campaigns. When a consumer 103 subsequently logs in to his or her financial institution portal 2100 to view his or her account activity, the OPS 207 performs a process similar to the injection process 1900 shown in FIG. 19, although rather than merging matched offers into the portal display, the OPS injects a notice or icon 119 indicating that the consumer has received an ORP 225 (see FIG. 27 and associated discussion).

As will be understood and appreciated by one having ordinary skill in the art, in order to redeem offers according to discussed embodiments of the present system 215, a consumer 103 is not required to cut out and use any coupons, print out any advertisements, enter in any promotion codes, etc. (although, an advertiser can mandate such coupon usage, if desired). Generally, all that is required is for a consumer to make a RQP 117 using a payment mechanism associated with the account in which the original OQP 115 was made. Once a consumer makes such a RQP, the associated redemption payment is automatically issued to the consumer's account, as described herein.

FIG. 24 is an exemplary offer impression table 2400 illustrating recorded offers that have been viewed by consumers 103 based on consumer log-ins to financial institution portals. FIG. 25 is an exemplary offer redemption table 2500 illustrating offers that have been redeemed by consumers based on redemption-qualifying purchases 117. As will be understood, tables 2400, 2500 are presented for illustrative purposes only, and embodiments of the present system 215 are not limited to use of the specific data tables shown. Each of the tables 2400, 2500 comprises a plurality of entries representing offer impressions and offer redemptions, respectively, each entry comprising a plurality of data categories or fields.

As shown, the each entry in the tables 2400, 2500 includes four data categories or fields: offer identifier (ID) 2401, 2501, account global unique identifier (GUID) 2403, 2503, date (either of impression or redemption) 2405, 2505, and time (either of impression or redemption) 2407, 2507. As will be understood, however, the data categories or files are not limited to the fields shown, and other embodiments include additional fields as will occur to one of ordinary skill in the art. Additionally, in one embodiment, not all data shown in tables 2400, 2500 is recorded (e.g., time of impression or redemption is not necessarily recorded). As will also be understood, although only five data entries are shown in table 2400 (i.e., entries corresponding to GUIDs 12932, 49830, etc.), and three data entries are shown in table 2500 (i.e., entries corresponding to GUIDs 12932, 80204, etc.), actual data tables constructed in accordance with aspects of the present system may include a virtually unlimited number of entries corresponding to a plurality of impressions and/or redemptions recorded by embodiments of the present TMS 215.

As shown, the offer ID fields 2401, 2501 and account GUID fields 2403, 2503 correspond to similar fields and data entries shown and discussed previously in conjunction with FIGS. 13, 16-18, etc. These fields identify the particular TMOs that are either viewed or redeemed by consumers, as well as the corresponding consumer accounts associated with the offers. The date fields 2405, 2505 and time fields 2407, 2507 indicate the specific dates and times that offers are viewed and/or redeemed, respectively. Again, the data fields referred to herein are not limited by the specific fields shown in FIGS. 24 and 25, and other data items are contemplated, such as the number of times each offer is viewed (i.e., number of impressions), specific advertiser location at which an offer is redeemed, the spend amount associated with each redemption, and other similar data fields. Generally, the data shown in tables 2400, 2500 is utilized for purposes of issuing redemptions to consumers. Further, according to one embodiment, the data shown in tables 2400, 2500 is aggregated (i.e., see campaign results table 2600), and used for reporting campaign performance to advertisers. Additionally, as shown, the representative impression and redemption 2409, 2509 correspond to the Pizza Pub/Pizza King example referenced in other parts of this disclosure.

FIG. 26 is an exemplary campaign results table 2600 illustrating aggregated offer performance data (i.e., offer impressions and redemptions). The aggregated offer performance data comprises a plurality of individual entries of results for a targeted marketing offer, each entry including a plurality of data fields. As shown, each entry in the table 2600 includes three data categories or fields: offer identifier (ID) 2601, offer impressions 2603, and offer redemptions 2605. These fields thus relate specific results of offer impressions and offer redemptions with a particular identified targeted marketing offer, within a campaign as delimited by means not shown, such as a particular reporting period, or for a particular advertiser, etc. As will be understood, however, the data categories or files are not limited to the fields shown, and other embodiments include additional fields as will occur to one of ordinary skill in the art. As will also be understood, although only three data entries are shown in table 2600 (i.e., entries corresponding to offer IDs 99999, 40568, etc.), actual data tables constructed in accordance with aspects of the present system may include a virtually unlimited number of entries corresponding to campaign results data 301 recorded by embodiments of the present TMS 215.

As shown, offer impressions field 2603 illustrates exemplary, aggregated offer impressions associated with specific offers. Offer redemptions field 2605 illustrates exemplary, aggregated offer redemptions associated with specific offers. According to one embodiment, this data is aggregated within each OPS 207 and transmitted to the OMS 211 for reporting to advertisers 213. As will be understood, various other types of data is included in the campaign results table 2600 according to various embodiments, including the number of times an offer is "clicked" (i.e., accessed with a mouse or cursor) for additional information by a consumer within a financial institution portal, information entered by a consumer into a data entry field associated with an offer, etc. Additionally, as shown, the representative results entry 2607 corresponds to the Pizza Pub/Pizza King example referenced in other parts of this disclosure.

FIG. 27 illustrates an exemplary screen shot of a GUI associated with a consumer financial institution portal 2700 with targeted marketing offers (TMOs) 113, a redemption-qualifying purchase (RQP) 117, and a RQP icon 119 displayed therein according to an embodiment of the present TMS 215. As shown, the portal display 2700 mirrors the display shown in FIG. 21, but with the associated RQP and RQP icon indicated accordingly. The exemplary RQP 117 satisfies the criteria defined in the original exemplary TMO 113a (i.e., purchase made at a Pizza Pub, in June, for more than $25), and thus the representative consumer account shown is credited the $10 dictated in the offer (see FIG. 28 for exemplary rewards page) as constituting an offer redemption payment (ORP) 225.

As mentioned previously, because the RQP is carried out using a payment mechanism associated with the account with which the original OQP was made (as evidenced by the fact that the RQP is listed on the same account summary web page as the OQP), the OPS 207 automatically recognizes the RQP and instructs the financial institution 205 to pay an associated redemption payment or reward to the consumer 103. According to one embodiment of the present system 215, rewards (i.e., ORPs 225) are indicated on a separate rewards page (e.g., FIG. 28). In other embodiments, however, ORPs are indicated in the amount column 2701 of a transaction summary 1707 (e.g., the amount for the representative RQP 117 would read $18.93 instead of $28.93), or listed underneath the RQP itself, or indicated via some other similar display mechanism.

As shown in FIG. 27, a RQP icon 119 is provided in relative juxtaposition with the RQP 117, thus indicating that the given transaction is in fact a RQP, and that an associated ORP 225 has been or will be issued to the particular consumer's account. The exemplary RQP icon is shown in FIG. 27 as a circle with a dollar sign contained therein, but other types of icons and icon images are contemplated according to various embodiments of the present system, and can be configured uniquely for each financial institution. Accordingly, aspects of the present system are not limited by the specific example icon or display format shown. Further, in the embodiment shown, when a consumer 103 hovers a cursor over the RQP icon 119, or clicks or otherwise interacts with the icon via the financial institution portal 2700, a pop-up redemption message 2703 is displayed to the consumer thanking the consumer for the purchase 117 and describing the savings or reward that was issued to the consumer. As will be understood and appreciated, the icon 119 and redemption message 2703 are presented for illustrative purposes only, and the formats and overall use of these elements may vary according to various embodiments of the present system. Further, some embodiments do not use a RQP icon 119 or a redemption message 2703, and merely issue automatic redemptions or rewards to consumers' accounts. Additionally, for TMOs that do not present possible redemptions, and are merely advertisements for a particular advertiser, no ORP is issued and no RQP icon is shown, as there is no potential redemption available with the TMO.

FIG. 28 illustrates an exemplary screen shot of a GUI associated with a consumer financial institution portal displaying a representative rewards page 2800 according to an embodiment of the present TMS 215. As will be understood and appreciated, the rewards page 2800 may be incorporated into a financial institution's existing, conventional account rewards page, or may comprise a separate page only displaying rewards associated with embodiments of the TMS 215. As will also be understood, regardless of the format of the rewards page, or any other exemplary screen shot or web page discussed herein, each page integrates seamlessly and adapts to the particular online format of each respective financial institution 205.

As shown, rewards tab 2001 is selected, indicating a rewards display page 2800 within the consumer financial institution portal. The rewards page 2800 includes a rewards summary section 2801 listing recent ORPs 225 issued to the particular consumer 103. Exemplary reward 2803 indicates the $10 cash back received in association with the Pizza Pub transaction (shown and discussed previously). Although the redeemed rewards 225 are shown in FIG. 28 as credits or cash back, other aspects of the present system incorporate other forms of rewards, such as airline miles, points, etc. (discussed previously). In one embodiment, the consumer 103 has the option of redeeming the displayed rewards (i.e., receiving a paper check or a credit to one of the consumer's accounts). In another embodiment, the rewards are automatically issued to the consumer's account in the form of a credit or otherwise. Typically, the rewards associated with TMOs according to embodiments of the present TMS 215 are handled in a similar manner as conventional rewards programs run by financial institutions, and, generally, each financial institution has discretion as to how rewards are issued.

Similar to the rewards page 2800 shown in FIG. 28, some embodiments of the present system 215 incorporate an offer(s) detail page (not shown) that lists or displays all pending and/or past offers presented to a given consumer 103, as well as the status of those offers (i.e., available, redeemed, expired, etc.). In the offer(s) detail page, a consumer has the ability to view his or her TMOs 113 collectively in a centralized location and across many accounts rather than separately under each account page and OQP 115. An offer(s) detail page is especially useful in circumstances in which a consumer has many transactions associated with a given account, or has many accounts with one financial institution 205. By collecting the offers on one page, the consumer is able to conveniently and quickly review all available offers associated with his or her financial institution accounts, as well as keep track of prior redemptions.

As mentioned previously, as consumers 103 view and/or redeem offers, these offer impressions and/or redemptions are recorded by each OPS 207, aggregated, and subsequently transmitted to the OMS 211 for reporting and billing purposes. Advertisers 213 are able to view such campaign results data 301 and assess the overall success (i.e., performance) of their advertising campaigns. Through this data, advertisers are able to determine which aspects of campaigns and offers generate high response rates and consumer interaction, and which do not. This information is utilized to shape future campaigns and offers in highly targeted ways to produce maximum consumer response. Again, this highly valuable form of marketing is based on consumer spending habits, yet also accomplished without disclosure of confidential or private consumer information to any outside parties.

FIG. 29 illustrates an exemplary OMS hardware architecture 2900 upon which an embodiment of the OMS may be implemented as herein described. FIG. 30 illustrates an exemplary OPS hardware architecture 3000 upon which an embodiment of the OPS may be implemented as herein described. As shown in FIGS. 29-30 and described previously herein, the hardware components of the OMS 211 and OPS 207 are specifically designed to carry out the particular functions and processes of the TMS 215 (i.e., they are particular machines). As will be understood and appreciated, the hardware representations 2900, 3000 are shown for illustrative purposes only, and other hardware variations will occur to those of ordinary skill in the art. Further, the hardware implementations shown in FIGS. 29-30 do not necessarily include representations of detailed hardware connections via firewall(s) 330, reverse proxies 217, and other system architecture components shown and described previously herein.

As shown, both the OMS and OPS include a bus 2901, 3001 or other communication mechanism for communicating information, and one or more processors 2903, 3003 coupled with the bus for processing information. The OMS and OPS each also include a main memory 2905, 3005, such as a random access memory (RAM) or other similar dynamic storage device, coupled to the bus 2901, 3001 for storing instructions and information to be executed by the processor(s) 2903, 3003. In addition, main memory 2905, 3005 may be used for storing temporary variables or other intermediate information during execution of instructions to be executed by the processor(s). As shown, the OMS and OPS both include a read only memory (ROM) 2907, 3007 or other similar static storage device coupled to the bus for storing static information and instructions for the processor(s). Also included within the OMS and OPS are OMS database 305 and OPS database 307, respectively, which are coupled to their respective buses and used for storage and retrieval of various types of system data as previously described. In one embodiment, as shown previously in FIG. 3, the OPS database 307 (and database server) reside separate and apart from an OPS web server, such that the OPS database resides behind one or more additional financial institution firewalls 330.

The OMS and OPS hardware systems 2900, 3000, respectively, both include a communication interface 2909, 3009, coupled to the communication bus 2901, 3001, which provide two-way data communication coupling to a network link 2911, 3011 that is connected to a local area network (LAN) 2913, 3013. The communication interface 2909, 3009 generally comprises an Ethernet or similar network interface card, a digital subscriber line (DSL), or other similar interface. The network link 2911, 3011 may comprise a wireless link, hardwired link, or other similar link. Additionally, for ease of reference, firewall(s), reverse proxies 217, DMZ(s), and other ancillary components are not shown in FIGS. 29-30, but it will be understood that these components comprise a part of the overall hardware architecture of embodiments of the present system.

For the embodiment of the OMS 211 shown in FIG. 29, the network link provides data communication through the LAN 2913 to the OMS advertiser portal 900 and each OPS 207 (via the Internet 209), and the system operator management portal 2915. Thus, all information transmitted to and from the OPS, or advertisers via the OMS advertiser portal, or system operators, is transmitted via the communication link 2911. The system operator management portal 2915 provides access by a system operator or manager to the overall targeted marketing system (TMS) 215. According to various embodiments and as will be understood, the system operator manages system performance, predefines system parameters, updates system software, and provides a host of other system management functions. For the embodiment of the OPS 207 shown in FIG. 30, the network link 3011 provides data communication through the LAN 3013 to the OMS 211 (via the Internet 209) and a respective financial institution web server 219 (and further to a financial institution transaction processor 220, not shown). Again, the hardware components and connections illustrated in FIGS. 29-30 are presented for illustrative purposes only, and other system configurations are possible according to various embodiments of the present inventions.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A targeted marketing offer placement computer system operative in conjunction with a computer system of a financial institution to provide a targeted marketing offer from an advertiser for display on an electronic display of a client machine operated by a particular consumer that is identified as belonging to a predetermined market segment as indicated by a particular transaction of the particular consumer through the financial institution, wherein the electronic display is generated by the computer system of the financial institution, comprising:

a processor coupled for secure data communications with the financial institution computer system and with a second computer system, the processor operatively coupled to a non-transient electronic storage;

the non-transient electronic storage comprising a database for storing data, program modules that execute on the processor, and a matched offer table;

the database storing campaign data and de-identified transaction data associated with consumers, the campaign data including one or more targeted marketing offers from the advertiser for delivery to consumers who are identified as belonging to the predetermined market segment;

the processor operative for receiving campaign data associated with the advertiser from the second computer system and storing the campaign data in the database;

the processor further operative for receiving de-identified transaction data provided by the financial institution computer system that was derived from financial transaction data of the financial institution including a plurality of predetermined financial transactions of the particular consumer and storing the de-identified transaction data in the database;

the processor further operative to process the de-identified transaction data and the campaign data to determine a set of matches comprising at least one identified particular transaction of the particular consumer that is in the predetermined market segment as reflected in the de-identified transaction data and storing the at least one identified particular transaction in the matched offer table;

in response to receipt of a call for display of a targeted marketing offer at the processor, the processor operative to transmit a computer-executable DOM injection script to the financial institution computer system for execution upon the electronic display of the client machine;

the processor further operative to receive information relating to the particular consumer and the particular consumer's currently displayed financial transactions that is generated upon execution of the DOM injection script upon the electronic display of the client machine operated by the particular consumer; and the processor further operative, in response to receipt of the information relating to the particular consumer and the particular consumer's currently displayed transactions, to deliver information corresponding to the predetermined targeted marketing offer from the campaign data for the particular consumer to the financial institution computer system for delivery of the predetermined targeted marketing offer to the consumer.

2. The system of claim 1, wherein the call for display of the targeted marketing offer occurs in response to an offer triggering event by the consumer, and wherein the offer triggering event is an offer qualifying transaction conducted by the particular consumer, as reflected in transaction data maintained by the financial institution computer system.

3. The system of claim 2, wherein the campaign data includes information corresponding to an offer qualifying transaction, and wherein the offer placement computer system is operative to compare the offer qualifying transaction information in the campaign data to transaction data of the financial institution corresponding to transactions conducted by the particular consumer to identify a particular offer qualifying transaction conducted by the particular consumer.

4. The system of claim 3, wherein the offer placement computer system is operative to display selected targeted marketing offer information to the particular consumer in association with the display of information corresponding to the particular offer qualifying transaction provided by the online banking portal.

5. The system of claim 2, wherein the delivery of information corresponding to the targeted marketing offer comprises the display of predetermined offer display information in association with display of information corresponding to the offer qualifying transaction.

6. The system of claim 5, wherein the predetermined offer display information comprises one or more of the following data items: offer text information, offer image information, reward amount, reward type, date(s) of offer.

7. The system of claim 5, wherein the predetermined offer display information is displayed adjacent to information corresponding to the offer qualifying transaction.

8. The system of claim 7, wherein the predetermined offer display information is displayed immediately below the offer qualifying transaction on a list of the particular consumer's transactions.

9. The system of claim 7, wherein the predetermined offer display information is displayed in a field a predetermined distance on the display from the offer qualifying transaction on a list of the particular consumer's transactions.

10. The system of claim 2, wherein the offer triggering event is a group of transactions conducted by the particular consumer that collectively satisfy predetermined criteria defined by the advertiser for delivery of the targeted marketing offer to the consumer.

11. The system of claim 2, wherein the offer triggering event comprises satisfaction of segment criteria associated with a predetermined market segment based on one or more transactions conducted by the particular consumer.

12. The system of claim 2, wherein the offer triggering event is an online session by the particular consumer for viewing the particular consumer's financial transactions at the financial institution.

13. The system of claim 12, wherein the offer placement computer system is operative to select predetermined targeted marketing offer information for the consumer, and to display the predetermined targeted marketing offer information to the consumer in a predetermined placement in an online banking portal operated by the financial institution computer system.

14. The system of claim 1, wherein the campaign data comprises information corresponding to a campaign identifier (ID), an advertiser identifier (ID) associated with an advertiser providing the targeted marketing offer, and campaign delimiting information.

15. The system of claim 14, wherein the campaign delimiting information comprises one or more of the following data items: a campaign start date, a campaign end date.

16. The system of claim 1, wherein the campaign data comprises segment data and offer data.

17. The system of claim 16, wherein the segment data comprises information corresponding to a segment identifier (ID) and segment delimiting information.

18. The system of claim 17, wherein the segment delimiting information comprises one or more of the following data items: location information for the market segment, merchant identifying information, a spend amount.

19. The system of claim 16, wherein the offer data comprises an offer identifier (ID), offer defining information, and offer display information.

20. The system of claim 19, wherein the offer defining information comprises one of more of the following data items: an offer amount, an offer start date, an offer end date.

21. The system of claim 19, wherein the offer display information comprises one or more of the following data items: offer text information, offer image information, offer amount information, offer type information, offer date information.

22. The system of claim 1, wherein the second computer system is an offer management computer system remotely located from the offer placement computer system, and wherein the campaign data is generated and provided by the offer management computer system.

23. The system of claim 22, wherein the campaign data is provided electronically from the offer management computer system.

24. The system of claim 23, wherein the campaign data originates at the remotely-located offer management system and provided to the offer placement system.

25. The system of claim 1, wherein the system is physically co-located with the financial institution computer system and utilizes network security protections of the financial institution computer system.

26. The system of claim 1, wherein the de-identified transaction data comprises de-identified transaction data records from which personal information of the particular consumer has been removed.

27. The system of claim 26, wherein the de-identified transaction records include one or more of the following data items: an account global identifier (GUID) associated with the particular consumer, a transaction identifier (ID), location information, merchant information, a transaction amount, a rewards type.

28. The system of claim 1, wherein the processor is further operative for matching the de-identified transaction data in the database with the campaign data to identify the particular transaction of the particular consumer and for storing information associated with the particular transaction as matched offer data in the matched offer table.

29. The system of claim 28, wherein matched offer data includes one of more of the following data items: one or more transaction identifiers (ID) associated with one or more transactions of the particular consumer associated with the offer triggering event, an offer identifier (ID), an account global identifier (GUID) associated with the particular consumer.

30. The system of claim 28, wherein the offer identifier is used to retrieve information for display to the particular consumer corresponding to a specific offer applicable to the particular transaction from the campaign data.

31. The system of claim 1, wherein the database stores offer impression data corresponding to information indicating that a predetermined targeted marketing offer has been displayed to the particular consumer, for use in determining the number of occurrences of the predetermined marketing offer to consumers.

32. The system of claim 1, wherein the database stores offer redemption data corresponding to information indicating that the particular consumer has engaged in a redemption qualifying transaction that qualifies for a reward associated with the targeted marketing offer displayed to the consumer.

33. The system of claim 32, wherein the redemption data includes one or more of the following data items: an offer identifier (ID) associated with a particular targeted marketing offer displayed to the particular consumer, an account global identifier (GUID) associated with the particular consumer, a date, a time, a reward type, a reward amount.

34. The system of claim 1, wherein the targeted marketing offer includes information indicating promised delivery of a predetermined reward in response to the particular consumer engaging in a redemption qualifying transaction having predetermined conditions, and wherein the processor is further operative to deliver information corresponding to the predetermined reward to the financial institution computer system for delivery to the consumer in response to a determination, by processing of subsequent transaction data records, that a transaction conducted by the consumer satisfies the predetermined conditions of the redemption qualifying transaction.

35. The system of claim 1, wherein the financial institution computer system comprises an online banking portal and a financial institution transaction processing system.

36. A computer-implemented method for providing information corresponding to a targeted marketing offer from an advertiser to an electronic display of a client machine operated by a particular consumer that is identified as belonging to a predetermined market segment as indicated by a particular transaction of the consumer through a financial institution computer system, wherein the electronic display is generated by the financial institution computer system, comprising the steps of:

receiving at an offer placement computer system (OPS) campaign data from a second computer system associated with a targeted marketing campaign of the advertiser, the campaign data including targeted marketing offer information for delivery to consumers who are identified as belonging to the predetermined market segment;

receiving at the OPS de-identified transaction data associated with consumers from the financial institution computer system, the de-identified transaction data derived from financial transaction data of the financial institution including a plurality of predetermined financial transactions of the consumer;

at the OPS, processing the de-identified transaction data and the campaign data to determine a set of matches comprising at least one identified particular transaction of the particular consumer that is in the predetermined market segment as reflected in the de-identified transaction data and storing the at least one identified particular transaction in a matched offer table;

in response to receipt of a call from the financial institution computer system, transmitting via the offer placement system a computer-executable DOM injection script to the financial institution computer system for execution upon the electronic display of the client machine;

receiving information at the OPS relating to the particular consumer and the particular consumer's currently displayed financial transactions that is generated upon execution of the DOM injection script upon the electronic display of the client machine operated by the particular consumer; and in response to receipt of the information relating to the particular consumer and the particular consumer's currently displayed financial transactions, delivering information from the campaign data corresponding to the targeted marketing offer from the OPS to the financial institution computer system for delivery of the predetermined marketing offer to the consumer.

37. The method of claim 36, wherein the call for display of the targeted marketing offer occurs in response to an offer triggering event by the particular consumer, and wherein the offer triggering event is an offer qualifying transaction conducted by the particular consumer, as reflected in transaction data maintained by the financial institution computer system.

38. The method of claim 37, wherein the campaign data includes information corresponding to an offer qualifying transaction, and further comprising the step of comparing the offer qualifying transaction information in the campaign data to transaction data of the financial institution corresponding to transactions conducted by the particular consumer to identify a particular offer qualifying transaction conducted by the particular consumer.

39. The method of claim 38, further comprising the step of displaying the targeted marketing offer information to the particular consumer in association with the display of information corresponding to the offer qualifying transaction provided by the online portal.

40. The method of claim 37, wherein the delivery of information corresponding to the targeted marketing offer comprises the display of predetermined offer display information in association with the display of information corresponding to the offer qualifying transaction.

41. The method of claim 40, wherein the predetermined offer display information comprises one or more of the following data items: offer text information, offer image information, reward amount, reward type, date(s) of offer.

42. The method of claim 40, wherein the predetermined offer display information is displayed adjacent to information corresponding to the offer qualifying transaction.

43. The method of claim 42, wherein the predetermined offer display information is displayed immediately below the offer qualifying transaction on a list of the particular consumer's transactions.

44. The method of claim 42, wherein the predetermined offer display information is displayed in a field a predetermined distance on the display from the offer qualifying transaction on a list of the particular consumer's transactions.

45. The system of claim 37, wherein the offer triggering event is a group of transactions conducted by the particular consumer that collectively satisfy predetermined criteria defined by the advertiser for delivery of the targeted marketing offer to the consumer.

46. The system of claim 37, wherein the offer triggering event comprises satisfaction of segment criteria associated with a predetermined market segment based on one or more transactions conducted by the particular consumer.

47. The system of claim 37, wherein the offer triggering event is an online session by the particular consumer for viewing the particular consumer's financial transactions at the financial institution.

48. The method of claim 47, further comprising the step of selecting predetermined targeted marketing offer information for the particular consumer; and displaying the predetermined targeted marketing offer information to the particular consumer in a predetermined placement in an online portal operated by the financial institution computer system.

49. The method of claim 36, wherein the campaign data comprises information corresponding to a campaign identifier (ID), an advertiser identifier (ID) associated with an advertiser providing the targeted marketing offer, and campaign delimiting information.

50. The method of claim 49, wherein the campaign delimiting information comprises one or more of the following data items: a campaign start date, a campaign end date.

51. The method of claim 36, wherein the campaign data comprises segment data and offer data.

52. The method of claim 51, wherein the segment data comprises information corresponding to a segment identifier (ID) and segment delimiting information.

53. The method of claim 52, wherein the segment delimiting information comprises one or more of the following data items: location information for the market segment, merchant identifying information, a spend amount.

54. The method of claim 51, wherein the offer data comprises an offer identifier (ID), offer defining information, and offer display information.

55. The method of claim 54, wherein the offer defining information comprises one of more of the following data items: an offer amount, an offer start date, an offer end date.

56. The method of claim 54, wherein the offer display information comprises one or more of the following data items: offer text information, offer image information, offer amount information, offer type information, offer date information.

57. The method of claim 36, wherein the second computer system is an offer management computer system remotely located from the offer placement computer system, and wherein the campaign data is generated by the offer management computer system.

58. The method of claim 57, wherein the campaign data is provided electronically from the offer management computer system.

59. The method of claim 58, wherein the campaign data originates at the offer management computer system and is provided to the offer placement computer system.

60. The method of claim 36, wherein the de-identified transaction data comprises de-identified transaction data records from which personal information of the particular consumer has been removed.

61. The method of claim 60, wherein the de-identified transaction records include one or more of the following data items: an account global identifier (GUID) associated with the particular consumer, a transaction identifier (ID), location information, merchant information, a transaction amount, a rewards type.

62. The method of claim 36, wherein the step of determining a set of matches comprises matching the de-identified transaction data received from the financial institution computer system with the campaign data to identify the particular transaction of the particular consumer and for storing information associated with the particular transaction as matched offer data in the matched offer table.

63. The method of claim 62, wherein the matched offer data includes one of more of the following data items: one or more transaction identifiers (ID) associated with one or more transactions of the particular consumer associated with the offer triggering event, an offer identifier (ID), an account global identifier (GUID) associated with the particular consumer.

64. The method of claim 63, wherein the offer identifier is used to retrieve information for display to the particular consumer corresponding to a specific offer applicable to the particular transaction from the campaign data.

65. The method of claim 36, wherein the method is carried out in an offer placement system that is physically co-located with the financial institution computer system and which utilizes network security protections of the financial institution computer system.

66. The method of claim 36, further comprising the step of storing offer impression data corresponding to information indicating that a predetermined targeted marketing offer has been displayed to the particular consumer during an online session of an online banking portal associated with the financial institution, for use in determining the number of occurrences of the predetermined marketing offer to consumers.

67. The method of claim 36, further comprising the step of storing offer redemption data corresponding to information indicating that the particular consumer has engaged in a redemption qualifying transaction that qualifies for a reward associated with the targeted marketing offer delivered to the consumer.

68. The method of claim 67, wherein the offer redemption data includes one or more of the following data items: an offer identifier (ID) associated with a particular targeted marketing offer displayed to the particular consumer, an account global identifier (GUID) associated with the particular consumer, a date, a time, a reward type, a reward amount.

69. The method of claim 36, wherein the targeted marketing offer includes information indicating promised delivery of a predetermined reward in response to the particular consumer engaging in a redemption qualifying transaction having predetermined conditions, and further comprising the step of delivering information corresponding to the predetermined reward to the financial institution computer system for delivery to the particular consumer in response to a determination, by processing of subsequent transaction data records, that a transaction conducted by the particular consumer satisfies the predetermined conditions of the redemption qualifying transaction.

70. The method of claim 36, wherein the computer system of the financial institution comprises an online banking portal and a financial institution transaction processing system.

* * * * *